United States Patent
Yoshizumi

(10) Patent No.: US 8,594,390 B2
(45) Date of Patent: Nov. 26, 2013

(54) COMPOSITION DETERMINATION DEVICE, COMPOSITION DETERMINATION METHOD, AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 984 days.

(21) Appl. No.: 12/423,150

(22) Filed: Apr. 14, 2009

(65) Prior Publication Data

US 2009/0268943 A1 Oct. 29, 2009

(30) Foreign Application Priority Data

Apr. 25, 2008 (JP) .................................. 2008-115298

(51) Int. Cl.
*G06K 9/00* (2006.01)
(52) U.S. Cl.
USPC ........... 382/118; 382/115; 382/116; 382/117; 382/103
(58) Field of Classification Search
USPC ....... 382/103, 115–118; 348/222.1, E05.031, 348/240.3
See application file for complete search history.

(56) References Cited

U.S. PATENT DOCUMENTS

| | | |
|---|---|---|
| 2003/0234869 A1 | 12/2003 | Chen et al. |
| 2005/0012833 A1 | 1/2005 | Yokota et al. |
| 2005/0117033 A1 | 6/2005 | Matsui |
| 2005/0219393 A1 | 10/2005 | Sugimoto |
| 2007/0286590 A1 | 12/2007 | Terashima |

FOREIGN PATENT DOCUMENTS

| | | |
|---|---|---|
| EP | 1 653 279 A1 | 5/2006 |
| JP | 59-208983 | 11/1984 |
| JP | 2001-268425 | 9/2001 |
| JP | 2003-179811 | 6/2003 |
| JP | 2007-282118 | 10/2007 |
| JP | 2004-320287 | 6/2012 |
| JP | 2006-253805 | 6/2012 |
| JP | 2007-259035 | 6/2012 |
| JP | 2008-011264 | 6/2012 |

OTHER PUBLICATIONS

Office Action issued Oct. 26, 2010, in Chinese Patent Application No. 200910136919.2 with English translation.
Office Action issued Apr. 8, 2011, in Chinese Patent Application No. 200910136919.2 with English translation.
U.S. Appl. No. 13/383,450, filed Jan. 11, 2012, Yoshizumi.
U.S. Appl. No. 13/384,898, filed Jan. 19, 2012, Yoshizumi.
U.S. Appl. No. 13/384,686, filed Jan. 18, 2012, Yoshizumi.
European Office Action issued Jul. 12, 2011, in Patent Application No. 09 158 642.0.
Dan Witzner Hansen, et al., "Improving Face Detection with TOF Cameras", Signals, Circuits and Systems, XP 31128577, Jul. 1, 2007, pp. 1-4.

(Continued)

*Primary Examiner* — Ruiping Li
(74) *Attorney, Agent, or Firm* — Oblon, Spivak, McClelland, Maier & Neustadt, L.L.P.

(57) ABSTRACT

A composition determination device includes: a subject detection unit configured to detect a subject in an image based on acquired image data; an actual subject size detection unit configured to detect the actual size which can be viewed as being equivalent to actual measurements, for each subject detected by the subject detection unit; a subject distinguishing unit configured to distinguish relevant subjects from subjects detected by the subject detection unit, based on determination regarding whether or not the actual size detected by the actual subject size detection unit is an appropriate value corresponding to a relevant subject; and a composition determination unit configured to determine a composition with only relevant subjects, distinguished by the subject distinguishing unit, as objects.

10 Claims, 43 Drawing Sheets

(56) References Cited

OTHER PUBLICATIONS

Bing Liu, et al., "Robust Real-Time Multiple Object Tracking in Traffic Scenes Using an Optical Matrix Range Sensor", Proceedings of the 2007 IEEE Intelligent Transportation Systems Conference, XP 31151453, Sep. 30-Oct. 3, 2007, pp. 742-747.

European Search Report issued Dec. 15, 2010 in EP 09 15 8642.

Zachary Byers, et al., "An Autonomous Robot Photographer", Proceedings of the 2003 IEEE/RSJ International Conference on Intelligent Robots and Systems, vol. 3, XP010675487, Oct. 27, 2010, pp. 2636-2641.

Japanese Office Action dated Jun. 26, 2012.

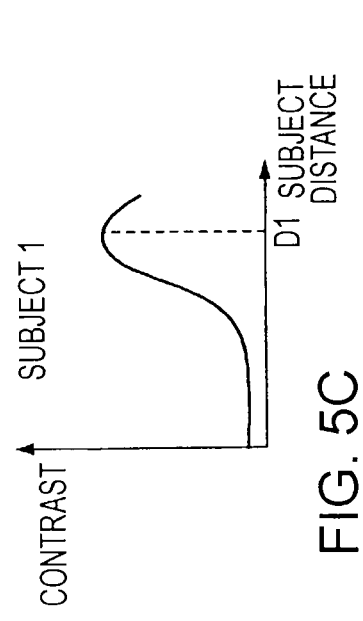
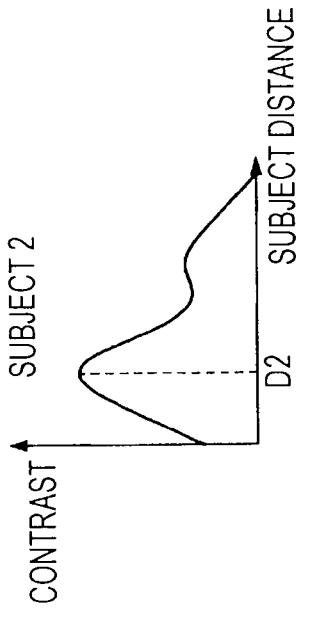
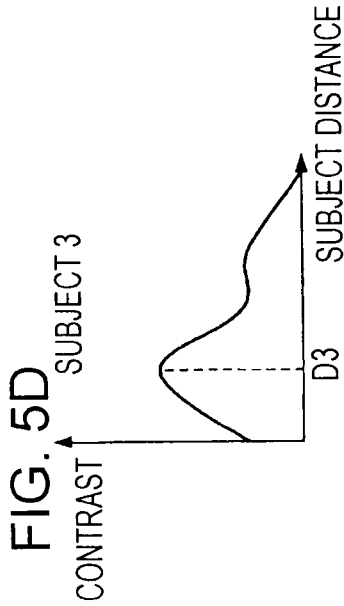
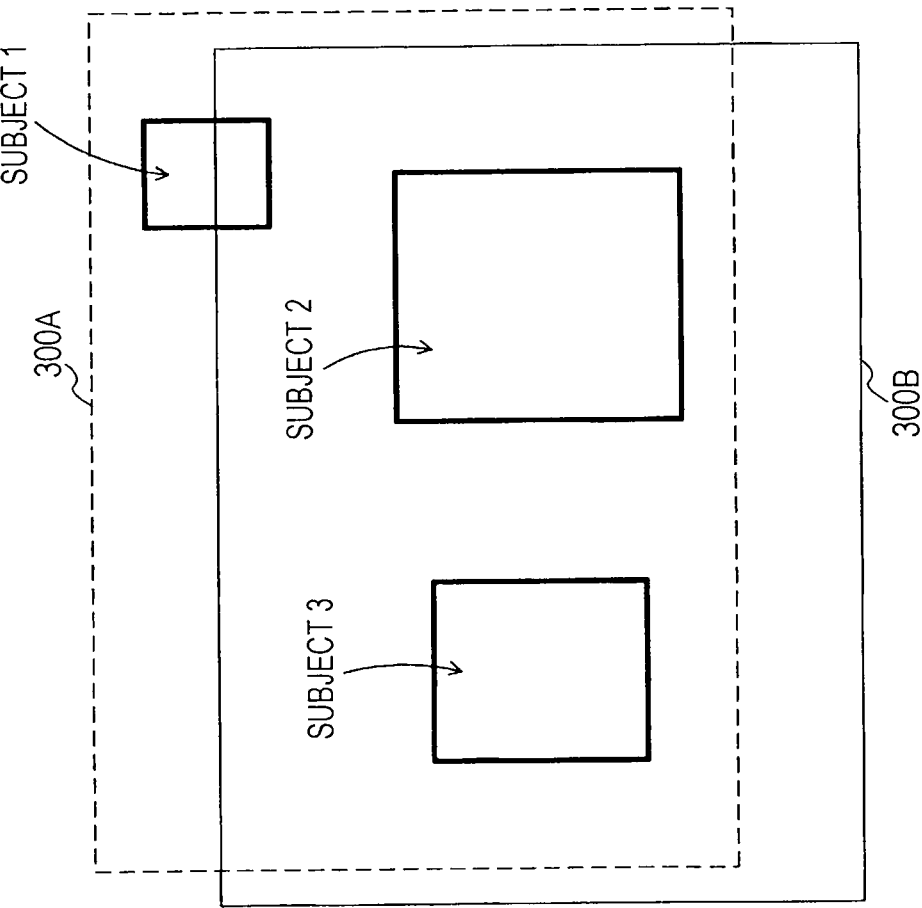

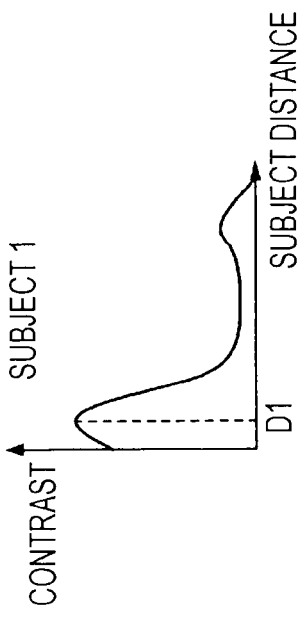
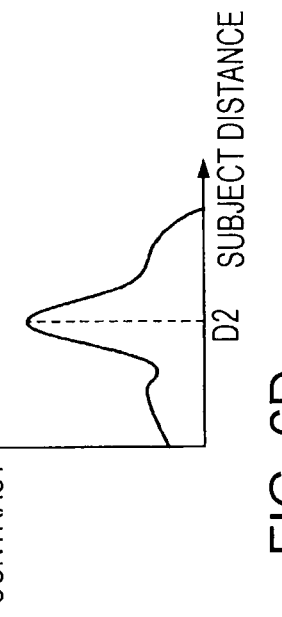
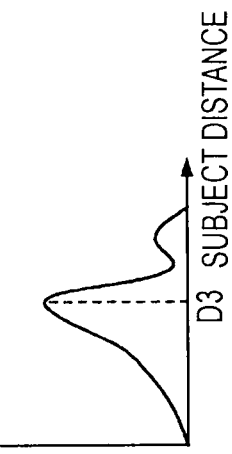
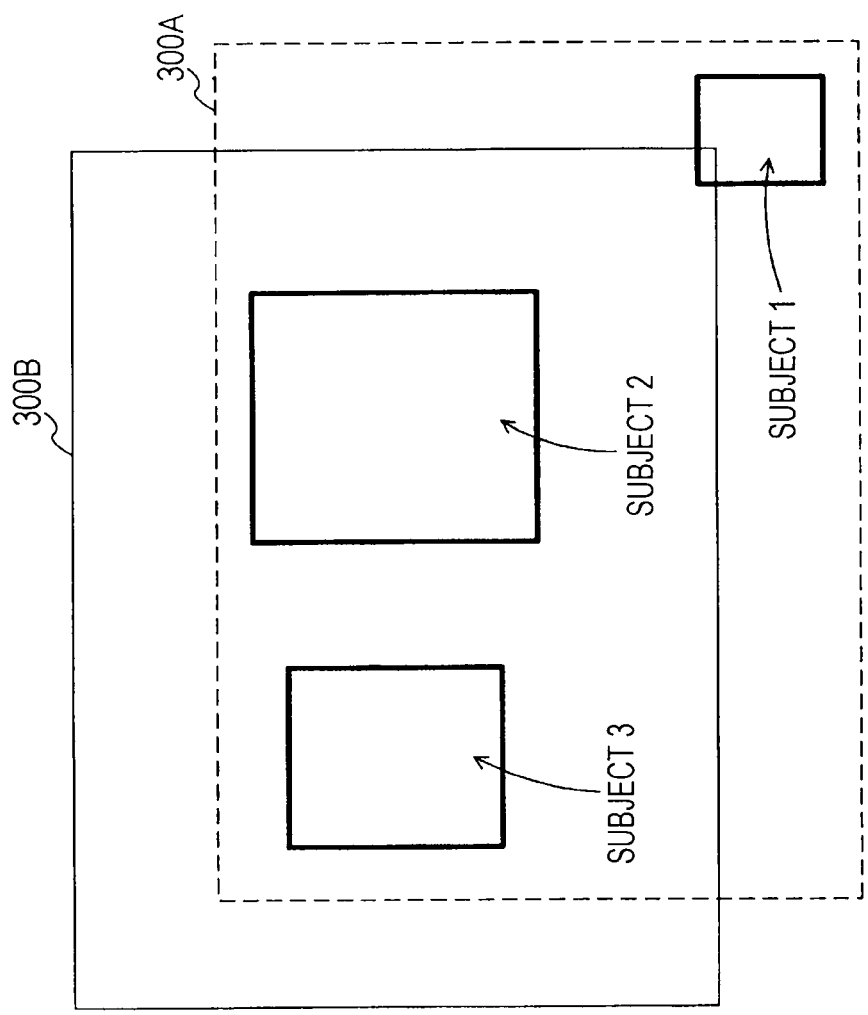

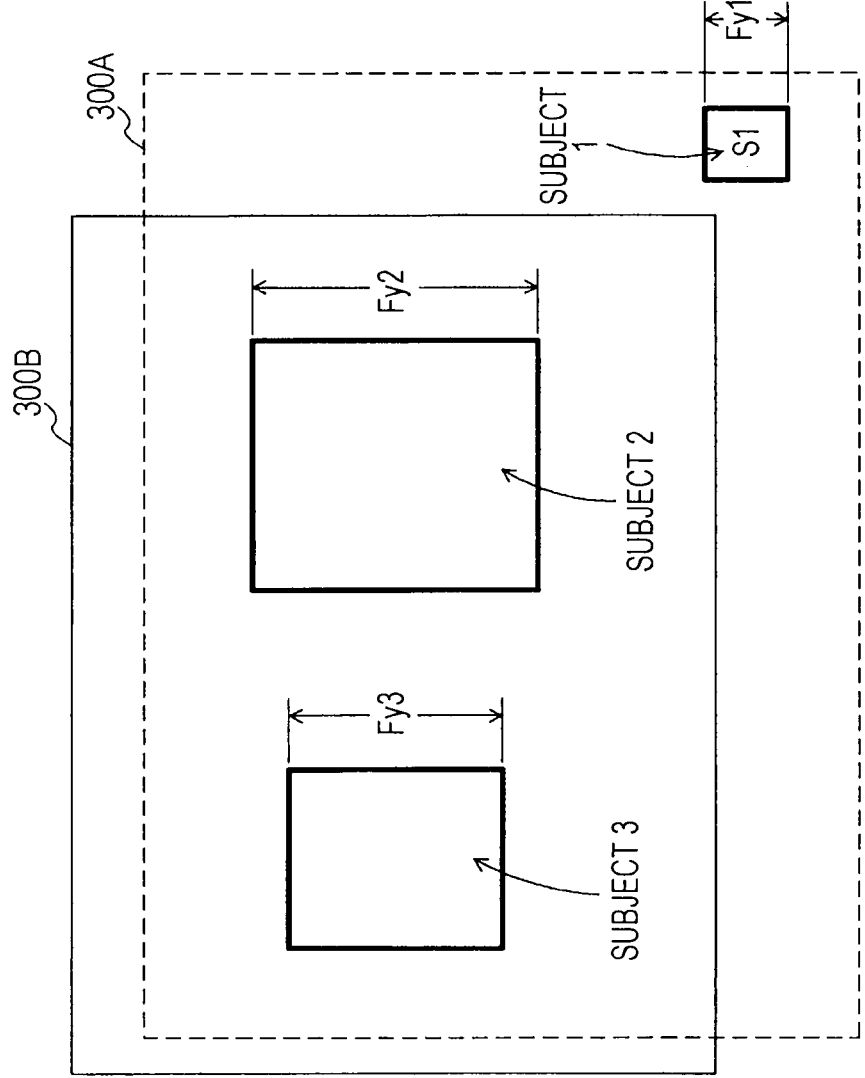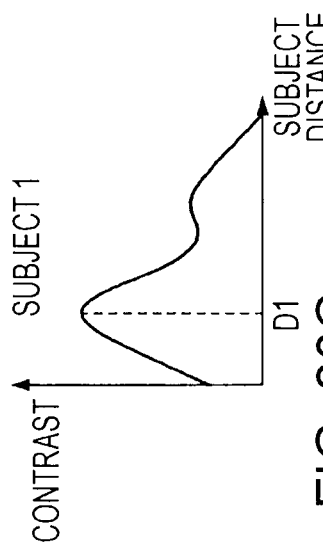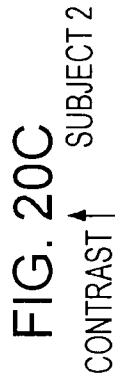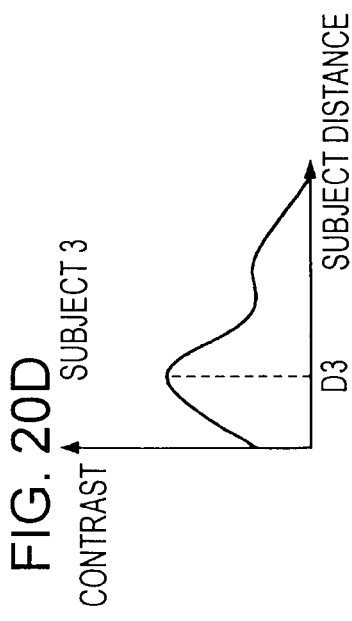

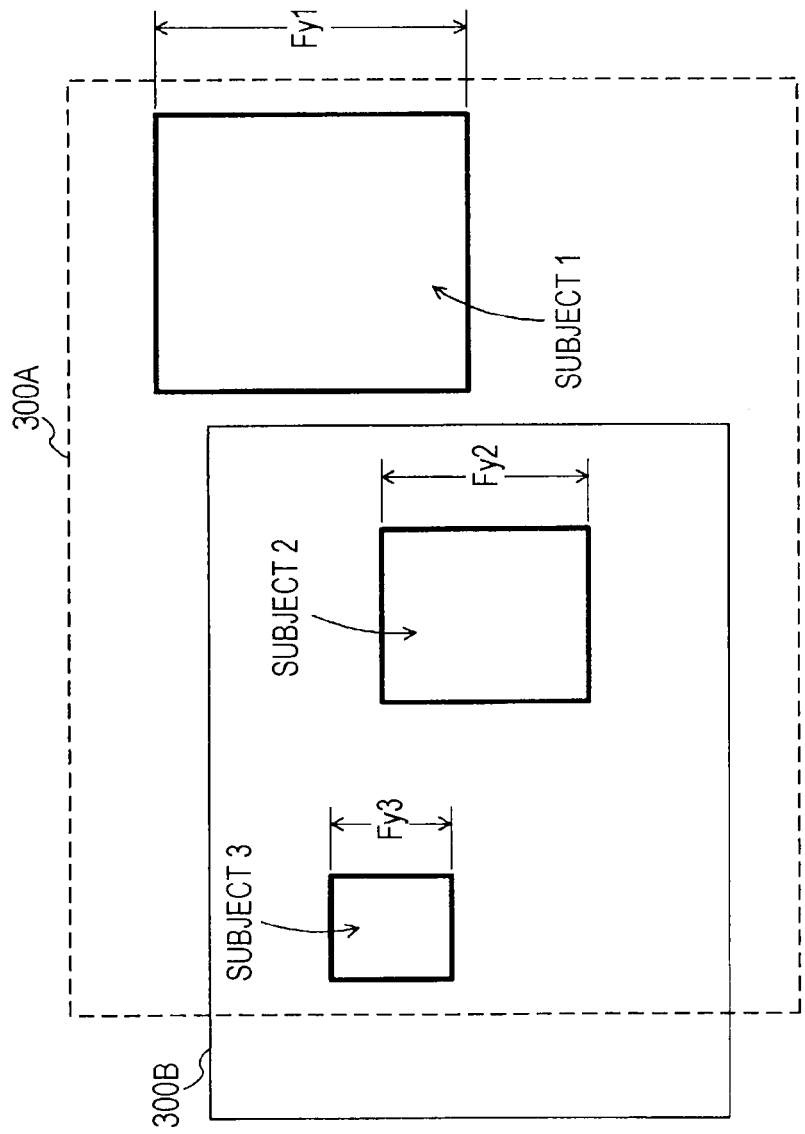
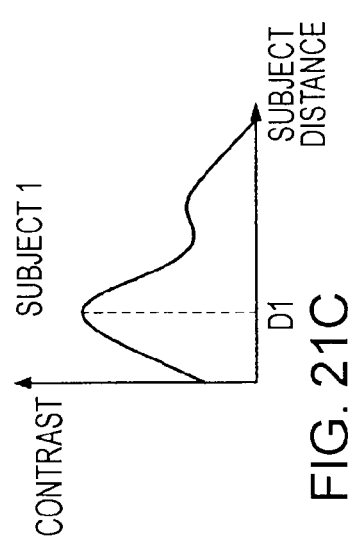
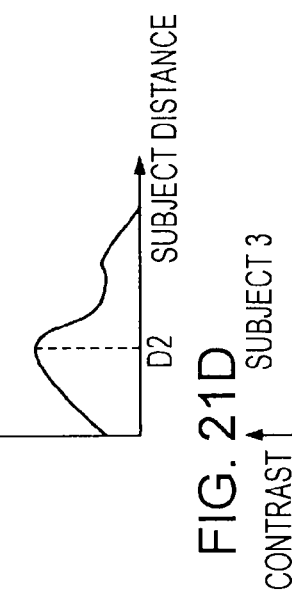
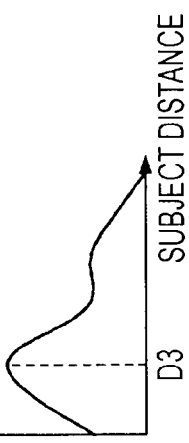

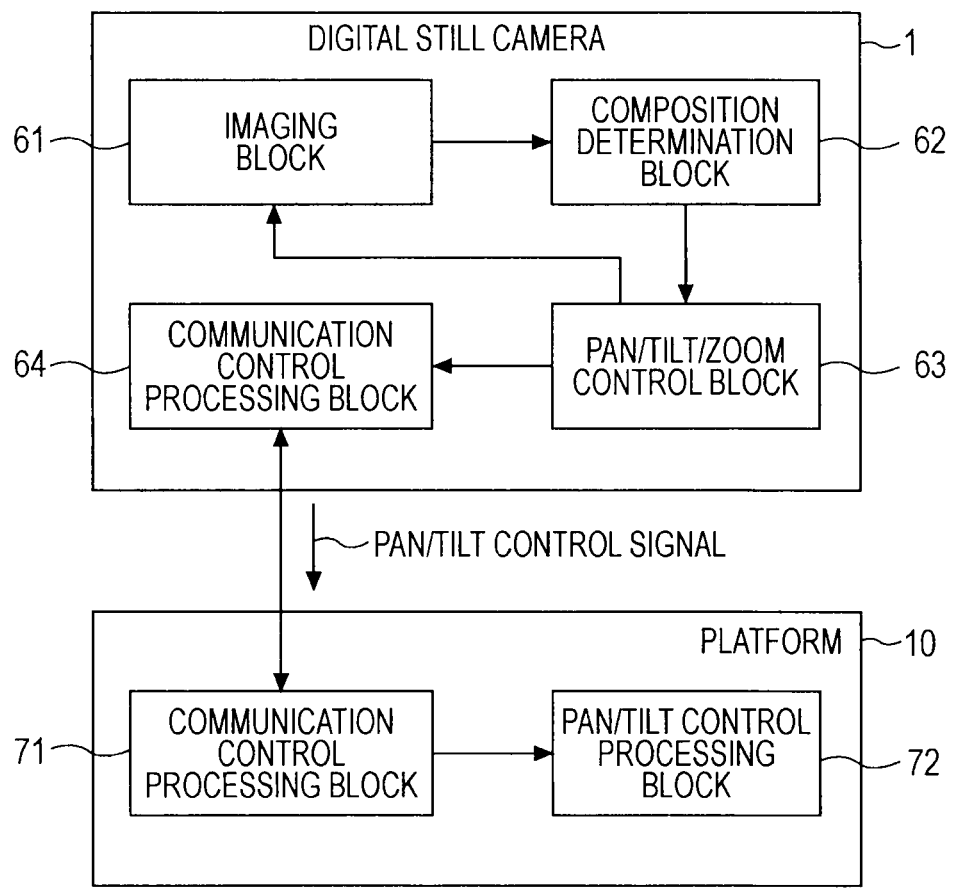

COMPOSITION DETERMINATION DEVICE, COMPOSITION DETERMINATION METHOD, AND PROGRAM

BACKGROUND OF THE INVENTION

1. Field of the Invention

The present invention relates to a composition determination device which is a device configured to make determination regarding a composition which image contents of image data have, and to a method thereof, and to a program which the device executes.

2. Description of the Related Art

One example of an element regarding techniques for shooting a photograph which has a good impression on viewers is composition settings. The term "composition" as used here is also called "framing", and refers to the state of placement of a subject or subjects within an image frame making up a photograph, for example.

While there are several basic techniques generally available for good composition, shooting a photograph with a good composition is no easy feat for a general camera user unless the user has sufficient knowledge and skills regarding photography. Accordingly, there is demand for a technology which will enable users to shoot photographs with good composition in an easy and simple manner.

For example, Japanese Unexamined Patent Application Publication No. 59-208983 discloses a technology regarding an automatic tracking device, wherein the difference between images separated by a predetermined time interval is determined, the center of gravity of the difference between the images is calculated, the amount and direction of motion of the center of gravity is used to detect the amount and direction of motion of a subject image as to the imaging screen, and the imaging apparatus is controlled, thereby setting the subject image within a reference region of the imaging screen.

Also, Japanese Unexamined Patent Application Publication No. 2001-268425 discloses a technology regarding an automatic tracking device, wherein, at the time of automatic tracking of a person, tracking is performed such that the face of the person is at the center of the screen and also the area of the face is the upper 20% of the entire area of the subject image on the screen, thereby shooting the face of the person in a sure manner while tracking.

From the perspective of deciding composition, these technical configurations enable a subject, which is a person, to be automatically searched, and situated in an imaging screen with a certain set composition.

Also, Japanese Unexamined Patent Application Publication No. 2007-282118 discloses a configuration for specifying a subject of a subject distance contained within a tolerance range as to a reference subject distance for subjects to be recognized, as a primary subject along with the subject to be recognized, and a configuration for specifying a subject of which a detected face region size is of a threshold value or greater, as a primary subject along with the subject to be recognized.

SUMMARY OF THE INVENTION

There has been realized demand to enable, in a case of performing composition determination regarding a certain subject, composition determination to be performed only regarding intended relevant subjects, while appropriately eliminating subjects which should be handled as being irrelevant for composition determination so as not to be included as an object.

According to an embodiment of the present invention, a composition determination device includes: a subject detection unit configured to detect a subject in an image based on acquired image data; an actual subject size detection unit configured to detect the actual size which can be viewed as being equivalent to actual measurements, for each subject detected by the subject detection unit; a subject distinguishing unit configured to distinguish relevant subjects from subjects detected by the subject detection unit, based on determination regarding whether or not the actual size detected by the actual subject size detection unit is an appropriate value corresponding to a relevant subject; and a composition determination unit configured to determine a composition with only relevant subjects, distinguished by the subject distinguishing unit, as objects.

According to an embodiment of the present invention, a composition determination device includes: a subject detection unit configured to detect a subject in an image based on acquired image data; a subject size detection unit configured to detect the in-image size for each subject detected by the subject detection unit; a subject distinguishing unit configured to distinguish relevant subjects from subjects detected by the subject detection unit, based on determination regarding whether or not the in-image size detected by the subject size detection unit is an appropriate value corresponding to a relevant subject; and a composition determination unit configured to determine a composition with only relevant subjects, distinguished by the subject distinguishing unit, as objects.

According to an embodiment of the present invention, a composition determination device includes: a subject detection unit configured to detect a subject in an image based on acquired image data; a subject distance detection unit configured to detect a subject distance for each subject detected by the subject detection unit; a subject distinguishing unit configured to distinguish relevant subjects from subjects detected by the subject detection unit, based on determination regarding whether or not the subject distance detected by the subject distance detection unit is an appropriate value corresponding to a relevant subject; and a composition determination unit configured to determine a composition with only relevant subjects, distinguished by the subject distinguishing unit, as objects.

According to the above configurations, distinguishing parameters (actual size, in-image size, or subject distance) are detected for each subject detected from image data, and determination is made regarding whether or not the distinguishing parameters are appropriate values corresponding to a relevant subject. Based on the determination results, relevant subjects are distinguished from the subjects detected by the subject detection unit, and composition determination is performed only with the distinguished relevant subjects as objects. Thus, with the present invention, composition determination processing is performed only with detected subjects judged to be relevant subjects, and with those judged to not be relevant subjects excluded.

Thus, with the present invention, accurate composition determination is can be performed for relevant subjects alone, while appropriately eliminating subjects which are irrelevant for composition determination.

BRIEF DESCRIPTION OF THE DRAWINGS

FIGS. 5A through 5D are diagrams schematically illustrating an actual example regarding composition determination in accordance with an algorithm for subject distinguishing, as the first embodiment;

FIGS. 6A through 6D are diagrams schematically illustrating another actual example regarding composition determination in accordance with an algorithm for subject distinguishing, as the first embodiment;

FIGS. 20A through 20D are diagrams schematically illustrating an actual example regarding composition determination in accordance with an algorithm for subject distinguishing, as the third embodiment;

FIGS. 21A through 21D are diagrams schematically illustrating an actual example regarding composition determination in accordance with an algorithm for subject distinguishing, as the third embodiment;

FIG. 26 is a block diagram illustrating an internal system configuration example regarding the imaging system according to an embodiment;

DESCRIPTION OF THE PREFERRED EMBODIMENTS

Figure 1:
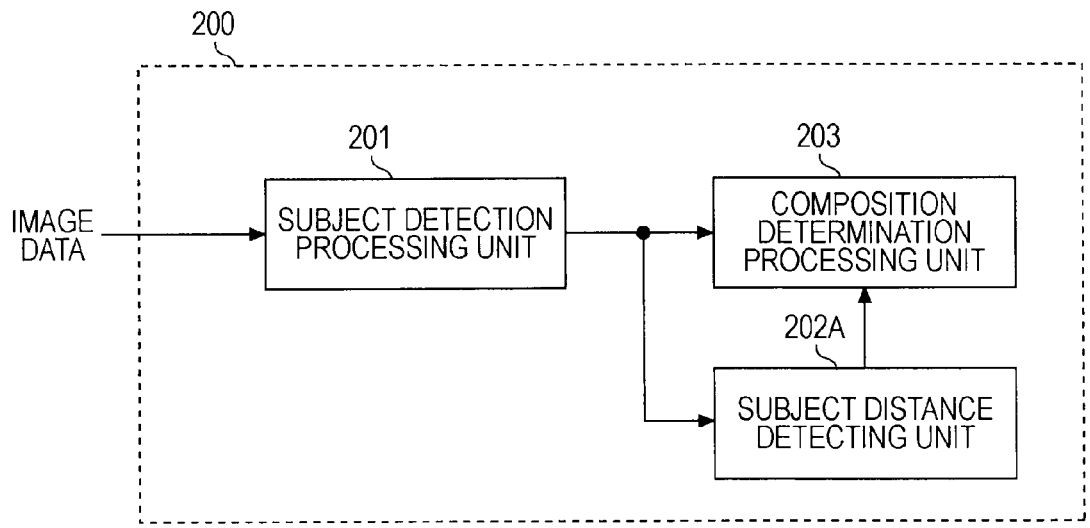
FIG. 1 is a block diagram illustrating a basic configuration example of composition determination corresponding to a first embodiment of the present invention.

Preferred embodiments of the present invention will now be described with reference to the drawings. In the following description, the terms of "composition", "image frame", "field angle", and "imaging view angle" will be used. "Composition" is also called framing, and refers to the state of placement of a subject or subjects within an image frame. "Image frame" is the range of a region equivalent to one screen, with an image appearing to have been fit therein, for example, and is generally a vertically or horizontally elongated rectangle. "Field angle" is also called zoom angle, and refers to the range which fits into the image frame as determined by the position of the zoom lens in the optical system of the imaging apparatus, expressed in terms of angle. Generally, this is determined by the focal distance of the imaging optical system and the size of the imaging face (imaging sensor or film), but here, elements capable of changing corresponding to focal distance are called angle of field. "Imaging view angle" deals with a range of an image which fits into the image frame, obtained by imaging with an imaging apparatus set at a predetermined position, and is determined by, in addition to the above "angle of field", the pan angle in the panning (horizontal) direction, and the angle in the tilting (vertical) direction (elevation angle and depression angle). For example, the composition of an image refers to the state of placement of a subject or subjects within an image frame as determined by the image view angle.

The present embodiment relates to a device or system configured so as to perform composition determination.

Before describing the configuration of the embodiment, let us consider performing automatic composition adjustment for a subject obtained by imaging, for example. Note that the subject is a person. For example, let us say that subjects, which are a certain number of people, are detected from an image obtained by imaging. Thereupon, in the composition determination processing, an optimal configuration is determined such that the placement of these subjects is appropriate within the image frame, with all of the detected subjects fitting into the image frame.

With the above composition determination processing, face detection technology for example, can be applied for subject detection of people. However, just using face detection technology results in the following problem. For example, let us consider a case wherein, in an image frame of an image obtained by imaging, here exist not only subjects which are real people, but also face photographs and the like positioned nearby. In this case, just performing subject detection by face detection alone will result in detecting not only real people but also the portion of the face photograph as a subject to be the object of composition determination.

In this case, the optimal composition determination intended is that which takes consideration such that the face photograph is excluded and only subjects which are real people suitably fit within the image frame. However, in reality, composition determination results are obtained which take into consideration fitting both the face photograph and real people suitably within the image frame.

Also, let us consider a case of performing composition determination regarding two people sitting at a certain table in a restaurant, as subjects. In this case, unrelated people nearby such as people sitting at other tables, employees standing in the restaurant and so on, for example, should be eliminated from being an object of composition determination, even though they are real people. However, just performing subject detection by face detection will result in these nearby unrelated people being detected as subjects to be the object of composition determination, and consequently, an intended composition may not be obtained.

Accordingly, with the present embodiment described below, a technical configuration is proposed such that even in a state wherein subjects irrelevant for composition determination and subjects that are relevant coexist, accurate composition determination can be performed with only relevant subjects as the object.

FIG. 1 is a diagram illustrating a basic configuration example regarding composition determination as a first embodiment. This diagram illustrates a composition determination block 200 as a portion for executing the composition determination. The composition determination block 200 acquires image data and performs composition determination, and includes a subject detection processing unit 201, a subject distance detection unit 202A, and a composition determination processing unit 203, such as shown in the drawing.

The subject detection processing unit 201 is a member which uses the acquired image data and executes subject detection processing. The subject detection processing as used here is processing for first distinguishing subjects which are people from the image contents of the image data, with the information obtained as detection results here (detected individual subject information) being the number of subjects which are people, position information within the image frame regarding each subject (individual subject), which can be expressed by x-coordinates and y-coordinates in the matrix of pixels for positions within the image frame for example, the size (space occupied) in the image (image frame) of each individual subject, and so forth.

Face detection technology can be used as a specific technique for the subject detection processing. While there are several face detection methods and techniques according to the related art, the present embodiment is not restricted to employing any method or technique in particular, and an appropriate method can be selected taking into consideration detection precision, design difficulty, and so forth.

The subject detection processing unit 201 in this case outputs information made up of a collection of the detected individual subject detection information as detected subject information. Also, the subject detection processing which the subject detection processing unit 201 performs can be realized by image signal processing. In the event of a configuration wherein the image signal processing is executed by a DSP (Digital Signal Processor) for example, the subject detection processing can be realized by programs and instructions provided to the DSP.

The subject distance detecting unit 202A is a member which detects the subject distance for each individual subject (detected individual subject) detected by the subject detection processing unit 201, and outputs detection information thereof (subject distance information).

Subject distance is used here means a straight-line distance from a position at which imaging light is input to the optical system of the imaging apparatus, to the subject, at the time that an image input to the subject detection processing unit 201 is imaged and obtained by the imaging apparatus. More precisely, this can be viewed as being the straight-line distance from the front principal point of the optical system (lens) of the imaging apparatus, for example.

In practice, a configuration of automatic focus adjustment control (autofocus control) with the imaging apparatus for example can be used for the subject distance detecting unit 202A.

Incidentally, there are a contrast method and distance measurement method for autofocus control according to the related art. The contract method involves moving the position of the focus lens for example, and finding a position of the focus lens where the luminosity level difference (contrast) of a subject portion region in the image obtained by imaging at that time reaches a peak. The found focus lens position corresponds to a focal state. The subject distance with the present embodiment can be obtained from the position of the focus lens.

Also, there are an active method and passive method for the distance measurement method according to the related art.

With the active method, light is projected from the measurement device side to the subject side and the incident position of the reflected light obtained thereby is detected, and the distance to the subject is measured based on this detection information. Note that as for light irradiated on the subject side, infrared rays can be used besides visible light. Also, ultrasound, radio waves, and so forth can be used besides light.

Also, as for the passive method, a phase difference detection method for example involves using multiple optical systems to form an image of a subject a mutually different horizontal positions. Line sensors are disposed at each of the positions where the subject image is formed, and signals corresponding to the image formation light are obtained form the line sensors. Accordingly, these line sensors are also disposed following the same horizontal axis. The line sensors detect image formation light for one horizontal line of a certain height within the field of view for example, and output detection signals. The mutual phase difference of the images corresponding to each optical system is detected based on the signals obtained from the line sensors. The phase difference detection is subjected to predetermined computation (correlation computation) using the signals obtained from the line sensors. The distance to the subject is thus measured based on the detection results.

With the present embodiment, any of the methods described above can be used for configuring the subject distance detecting unit 202A in actual practice.

As one example, if based on the contrast method, the subject distance detecting unit 202A will be configured having a mechanism unit and signal processing unit for autofocus control based on the contrast method. That is to say, it will be configured having a focus lens in the imaging apparatus and a driving mechanism unit for driving this, a signal processing function for detecting contrast with regarding to image data obtained by imaging with the imaging apparatus (imaged image data), and a control function capable of performing control with regard to the driving mechanism unit for driving the focus lens in accordance with the detected results, for example.

Thereupon, the image data input to the subject detection processing unit 201 is taken as imaged image data obtained by imaging with the imaging apparatus at that time, and the subject distance detecting unit 202A inputs the imaged image data along with the detected subject information from the subject detection processing unit 201.

The subject distance detecting unit 202A first identifies a portion image region corresponding to the position for each detected individual subject which the input detected image information indicates. Driving is performed so as to move the focus lens to a predetermined range at an appropriate timing, while detecting contrast at each partial image region obtained at that time, and information of a focus lens position where the detected contrast is peak is obtained for each partial image region. Subject distance is obtained for each focus lens position thus obtained. Note that the subject distance can be unambiguously obtained from the focus lens position. Thus, the subject detection processing unit 201 can obtain information of subject distance for each detected individual subject.

The composition determination processing unit 203 in this case acquires and inputs detected subject information output from the subject detection processing unit 201, and information of subject distance for each detected individual subject (subject distance information) output from the subject distance detecting unit 202A. These information are used, and ultimately composition determination is executed wherein an optimal composition is determined with only subjects intended as relevant for composition determination (relevant subjects) as the object of determination.

Note that the composition determination processing performed by the composition determination processing unit 203 can be realized by a CPU (Central Processing Unit) for example executing a program, i.e., by software. Another example of a configuration which can be employed here is tandem use of image signal processing, realized by software and/or hardware, as appropriate.

Figure 2:
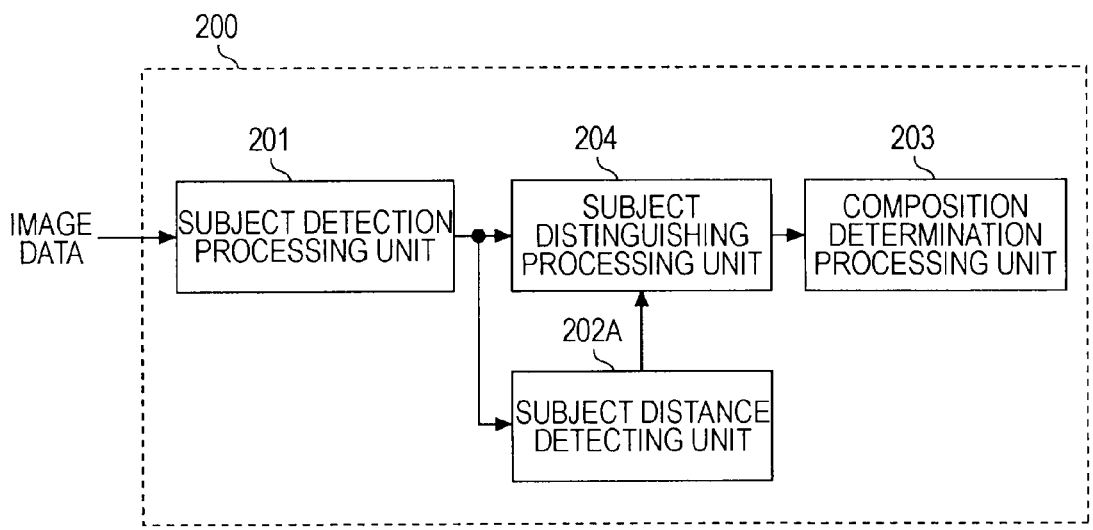
FIG. 2 is a block diagram illustrating another basic configuration example of composition determination corresponding to the first embodiment.

FIG. 2 illustrates a basic configuration example of the composition determination block 200 as a first embodiment. The configuration shown in this diagram can be viewed as based on the configuration of the first example shown in FIG. 1, with the processing of distinguishing relevant subjects to be performed by the composition determination processing unit 203 in FIG. 1 being extracted as a subject distinguishing processing unit 204.

That is to say, in this case, as with the case in FIG. 1, first the subject detection processing unit 201 performs subject detection processing based on the image data that has been input and outputs detected subject information, and the subject distance detection unit 202A also performs detection of subject distance for each individual subject (detected individual subject) detected by the subject detection processing unit 201, and outputs subject distance detection information.

Thereupon, in this case, the detected subject information and subject distance detection information is input to the subject distinguishing processing unit 204. The subject distinguishing processing unit 204 uses the detected subject information and subject distance detection information, to exclude subjects irrelevant for composition determination (irrelevant subjects) from the individual subjects detected by the subject detection processing unit 201 and execute processing for distinguishing relevant subjects (distinguishing processing). The subject distinguishing processing unit 204 then outputs detected individual subject information for each individual subject distributes as being a relevant subject by this subject distinguishing processing, to the composition determination processing unit 203.

The composition determination processing unit 203 executes composition determination processing based on the detected individual subject information regarding each individual subject distinguished as being a relevant subject, output from the subject distinguishing processing unit 204. That is to say, as a result, composition determination processing is performed only with relevant subjects as the object.

Figure 3:
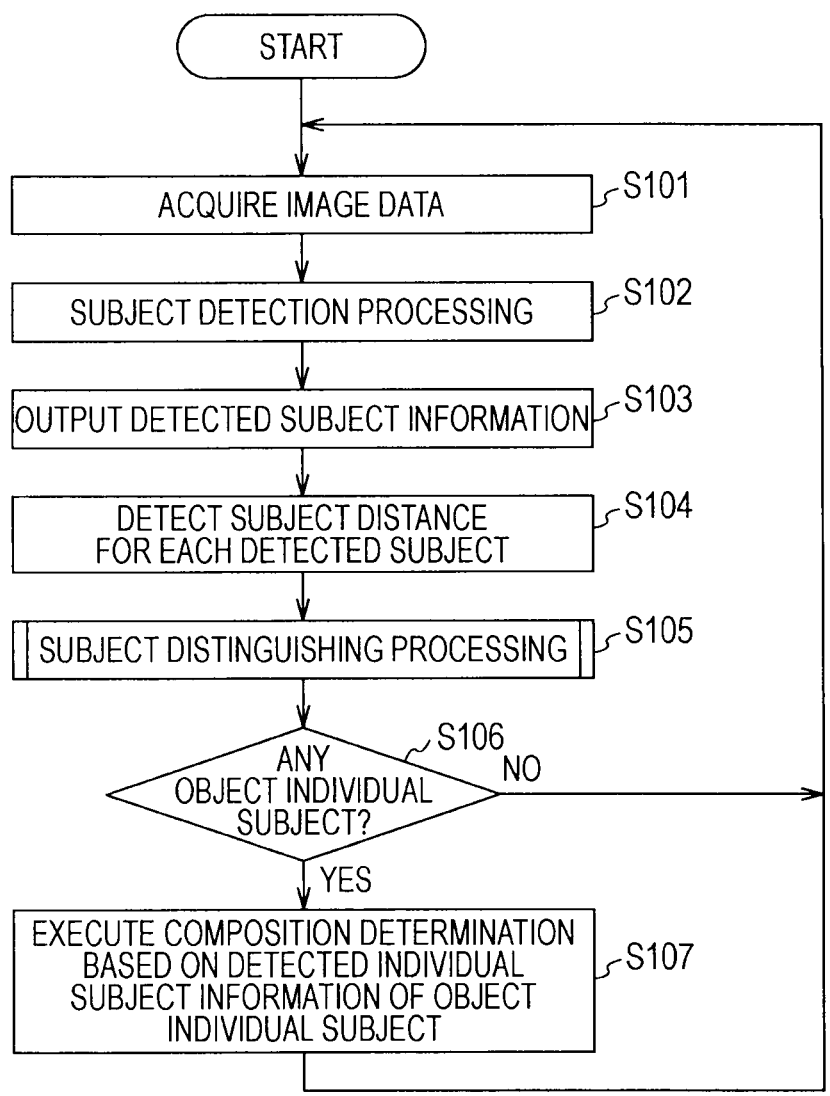
FIG. 3 is a flowchart illustrating a processing procedure example executed by a composition determination block according to the first embodiment.
Figure 4:
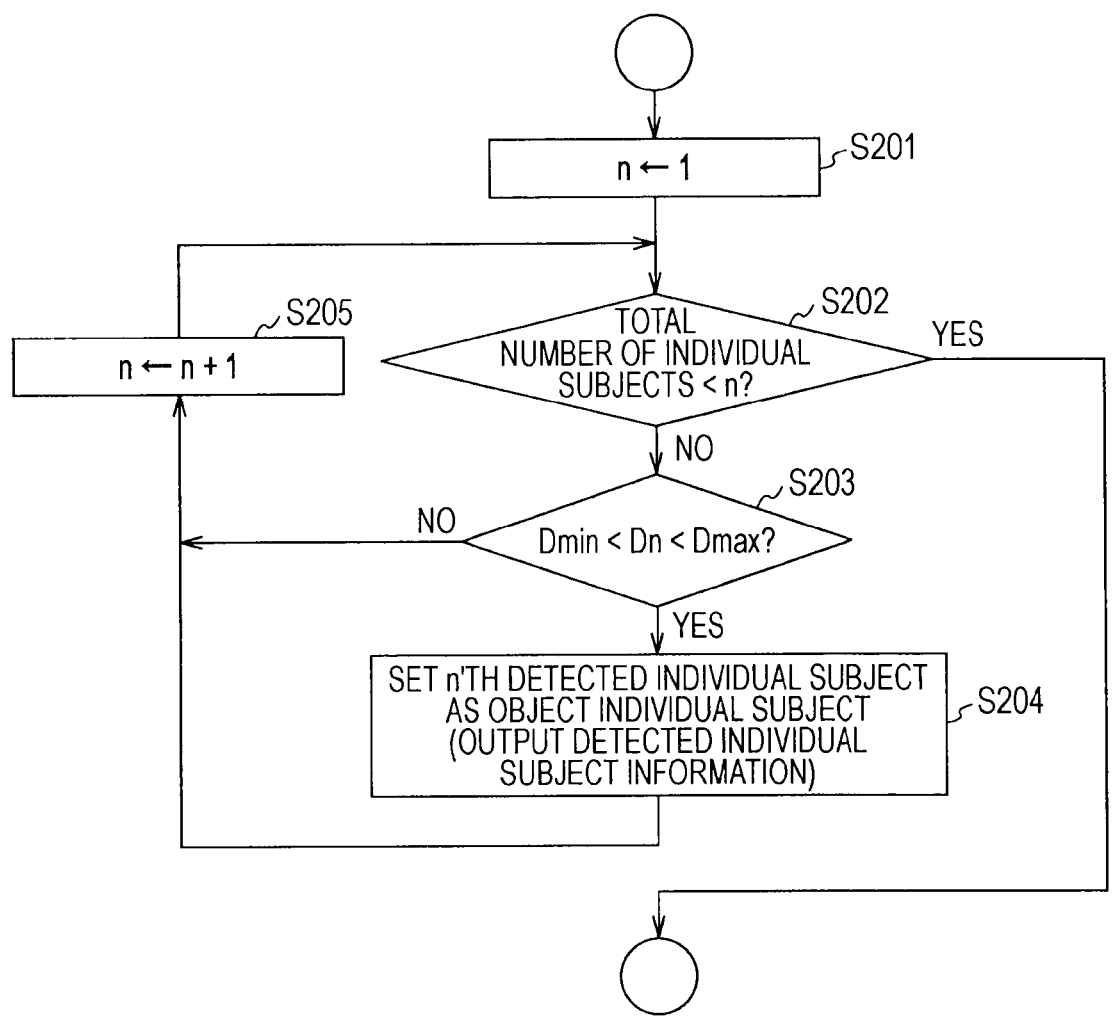
FIG. 4 is a flowchart illustrating a procedure example of subject distinguishing processing in FIG. 3.

The flowchart shown in FIG. 3 illustrates an example of the procedures for the processing executed by the composition determination block 200 shown in FIGS. 1 and 2 described above. It should be noted that the example of processing procedures shown in this drawing is only one example, and that the processing procedures executed by the composition determination block 200 shown in FIG. 4 is by no way restricted to this. The configuration shown in FIG. 4 has realized its intended function as long as the composition determination processing unit 203 ultimately determines an optimal composition with only relevant subjects as the object, based on the detected subject information from the subject detection processing unit 201 and the subject detection information (information of distinguishing parameters) from the subject distance detection unit 202A (detection unit for distinguishing parameters). This holds true for the later-described second embodiment and third embodiment as well.

Also, the correlation between the block configuration shown in FIGS. 1 and 2 and the steps in the flowchart in FIG. 3 is but one straightforwardly conceived example, and other correlations can be conceived and employed. This point also holds true for the later-described correlations between corresponding block diagrams and flowcharts.

First, in step S101, the subject detection processing unit 201 acquires (input) the image data.

Steps S102 and S103 are procedures executed by the subject detection processing unit 201.

The subject detection processing unit 201 executes the above-described subject detection processing in step S102, and in step S103 outputs detected subject information which is the detection result thereof.

Step S104 is processing wherein the subject distance detection unit 202A detects the subject distance for each individual subject (detected individual subject) detected by the subject detection processing unit 201, and outputs the subject distance detection information. A configuration example for detecting the subject distance for each detected individual subject is as described above.

In step S105, subject distinguishing processing, i.e., processing for distinguishing relevant subjects from the detected individual subjects, is performed. This subject distinguishing processing is executed by the composition determination processing unit 203 in a configuration corresponding to FIG. 1, and by the subject distinguishing processing unit 204 in a configuration corresponding to FIG. 2.

FIG. 4 illustrates a procedures example for subject distinguishing processing in the above step S105.

In step S201, first, 1 is substituted into a variable n indicating the order of the detected individual subject to be taken as an object of distinguishing, as an initial value.

In step S202, determination is made regarding whether or not the current variable n has exceeded the total number of individual subjects. Now, the total number of individual subjects is the total number of individual subjects (detected individual subjects) detected by the subject detection processing unit 201, and can be told from detected subject information input from the subject detection processing unit 201.

In the event that a negative determination result is obtained in step S202, this means that there is still a detected individual subject remaining regarding which distinguishing has not been performed. In this case, the flow proceeds to step S203.

In step S203, determination is made regarding whether or not the condition (conditional expression) of $Dmin < Dn < Dmax$ holds regarding the subject distance Dn detected regarding the n'th individual subject, and preset lower threshold Dmin and upper threshold Dmax.

Now, in the event that a positive determination result is obtained in step S203, this means that the n'th detected individual subject is in a distance range suitable for being imaged as a valid subject as a principal entity for determining the composition, not being too close to or too far from the position being imaged by the imaging apparatus (imaging position). Here, we will handle detected individual subjects in such a suitable subject distance range as being a relevant subject. That is to say, a detected individual subject satisfying the condition of $Dmin < Dn < Dmax$ is judged to be a relevant subject.

In the event that a positive determination result is obtained in step S203, the flow proceeds to step S204, and the n'th detected individual subject is set as a relevant subject, i.e., an object individual subject to be the object of composition determination. In practice, this processing is performed by outputting detected individual subject information regarding this n'th detected individual subject, for composition determination processing performed by the composition determination processing unit 203.

Subsequently, in step S205 the variable n is incremented and the flow proceeds to step S202.

Also, in the event that a negative determination result is obtained in step S203, this means that the n'th detected individual subject is at a distance farther than a certain distance from the imaging apparatus ($Dn \geq Dmax$), or is within a certain close distance ($Dmin \geq Dn$).

The subject being at a distance farther than a certain distance from the imaging apparatus means that the subject distance is too far to be handled as a subject serving as a principal entity in the composition.

As for a specific example, in a restaurant or the like, in the event that diners sitting at other tables from the table at which the intended subjects are sitting as diners, employees standing behind, or the like, are detected as individual subjects, these individual subjects are determined to be at a distance farther than a certain distance from the imaging position.

Also, the subject being within a certain close distance from the imaging position means that the subject distance is too close to be handled as a subject serving as a principal entity in the composition.

A situation for this that can be given as an example is wherein here is a face photograph for example, at a position much closer in the imaging field of view than the intended subject. In this case, the individual subject detected corresponding to the face photograph is determined to be within a certain close distance from the imaging position.

In the event that a negative determination result is obtained in this way, the flow skips step S204 and advances to step S205. Accordingly, the n'th detected individual subject this time is not set as a relevant subject (object individual subject). That is to say, the detected individual subject information thereof is not output to the composition determination processing unit 203 for composition determination processing. In step S205 the variable n is incremented, and the flow returns to step S202.

Thus, with the subject distinguishing processing shown in FIG. 4, determination is made regarding whether each detected individual subject has a subject distance within an appropriate range, and those within the appropriate range are set (distinguished) as relevant subjects, i.e., as object individual subjects.

Upon distinguishing processing with all detected individual subjects as the object being ended, in step S202 a positive determination result is obtained, the processing shown in this drawing is exited, and the flow proceeds to step S105 in FIG. 3. Note that there are cases where not a single individual subject is detected as the detection result of the subject detection processing unit 201. In this case, a positive determination result is obtained in step S202 the first time, and the flow proceeds to step S105 in FIG. 3. At this time, the set number of object individual subjects is 0 as a result.

Description will now return to FIG. 3. After performing the subject distinguishing processing as step S105, the procedures of step S106 and on are performed. The procedures of step S106 and step S107 can be viewed as being executed by the composition determination processing unit 203 here.

In step S106, determination is made regarding whether the number of object individual subjects set as the result of subject distinguishing processing is one or more, based on the detected individual subject information output from the individual distinguishing processing.

In the event that a negative determination result is objected here, this means that there was no individual subject to be the object of composition determination, so the flow returns to step S101.

On the other hand, in the event that a positive determination result is obtained, this means that there is an individual subject to be the object of composition determination, so the flow proceeds to step S107.

Next, the composition determination processing unit 203 executes the processing of step S107. In step S107, processing for composition determination is executed with a predetermined algorithm, using the detected subject information of the object individual subjects set in step S106 as described above. Examples of composition determination algorithms, usage examples of composition determination results, and so forth, will be described later.

A practical example of composition determination in accordance with a subject distinguishing algorithm as the first embodiment is schematically shown in FIGS. 5A through 6D.

First, FIGS. 5A through 5D illustrate a case wherein a subject, of subjects (individuals objects) detected by subject detection processing, exists at a distance farther than a certain distance from the imaging position.

Here, a detection frame 300A is indicated by dotted lines in FIG. 5A. This detection frame 300A is a frame corresponding to an image of image data output from the subject detection processing unit 201. Let us say that the subject detection processing unit 201 has detected subjects (individual subjects) 1, 2, and 3, within this detection frame 300A, as shown in the drawing. Note that here, these subjects are indicated by rectangular-shaped frames corresponding to a detection frame obtained based on face detection, for example.

Also, respective subject distances D1, D2, and D3, of the subjects 1, 2, and 3, detected based on the contrast method, as shown in FIGS. 5B through 5D, respectively. These drawings illustrate change in contrast, detected by moving the focus lens, for each partial image region where the subjects 1, 2, and 3, were detected, as the vertical axis. The horizontal axis represents the subject distance determined in accordance with the position of the focus lens.

Now, with FIGS. 5A through 5D, let us say that the subject distance D1 of the subject 1 is at or greater than the upper threshold Dmax and the subject distances D2 and D3 of the subjects 2 and 3 are within a suitable range above the lower threshold Dmin but below the upper threshold.

In this case, the subjects 2 and 3 are distinguished as object individual subjects (relevant subjects) by the subject distinguishing processing.

In the subsequent composition determination processing, composition determination is performed with only the subjects 2 and 3 as the object, with the subject 1 excluded. For example, in FIG. 5A, the results of composition determination are shown by the relation between a determined composition image frame 300B and the subjects 1, 2, and 3. The determined composition image frame 300B is an image frame obtained as a result of composition determination.

In this determined composition image frame 300B, the subjects 2 and 3 are disposed so as to be approximately at the middle, meaning that composition determination has been made handling the subjects 2 and 3 as the object. On the other hand, in this drawing for example, only a part of the subject 1 is overlapping on the determined composition image frame 300B, meaning that the subject 1 has been eliminated as the object of composition determination.

Next, FIGS. 6A through 6D illustrate a case wherein a subject is within a certain close distance from the imaging position. As shown in FIG. 6A, subjects 1, 2, and 3, have been detected within this detection frame 300A, here as well. Also, respective subject distances D1, D2, and D3, of the subjects 1, 2, and 3, detected based on the contrast method, as shown in FIGS. 6B through 6D, respectively.

In this case now, let us say that the subject distance D1 of the subject 1 is at or below than the lower threshold Dmin and the subject distances D2 and D3 of the subjects 2 and 3 are within a suitable range above the lower threshold Dmin but below the upper threshold. In this case as well, the subjects 2 and 3 are distinguished as object individual subjects (relevant subjects) by the subject distinguishing processing, and the composition determination processing is performed with the subject 1 excluded and the subjects 2 and 3 alone as the object.

The results of composition determination are shown by the relation between the determined composition image frame 300B and the subjects 1, 2, and 3 in FIG. 6A. In this case as well, with the determined composition image frame 300B, the subjects 2 and 3 are disposed so as to be approximately at the middle. On the other hand, the subject 1 is mostly off of the determined composition image frame 300B.

Note that the placement, size, and so forth of subjects in the image frame (determined composition image frame 300B) following composition determination in these FIGS. 5A through 6D only illustrate that composition determination is performed with subjects distinguished as composition determination objects. Specific composition determination algorithms and so forth will be described later.

Also, while only one example, as actual values taking practical use into consideration, an arrangement wherein the lower threshold Dmin is around 30 cm, and the upper threshold Dmax is around 5 m, can be conceived.

Figure 7:
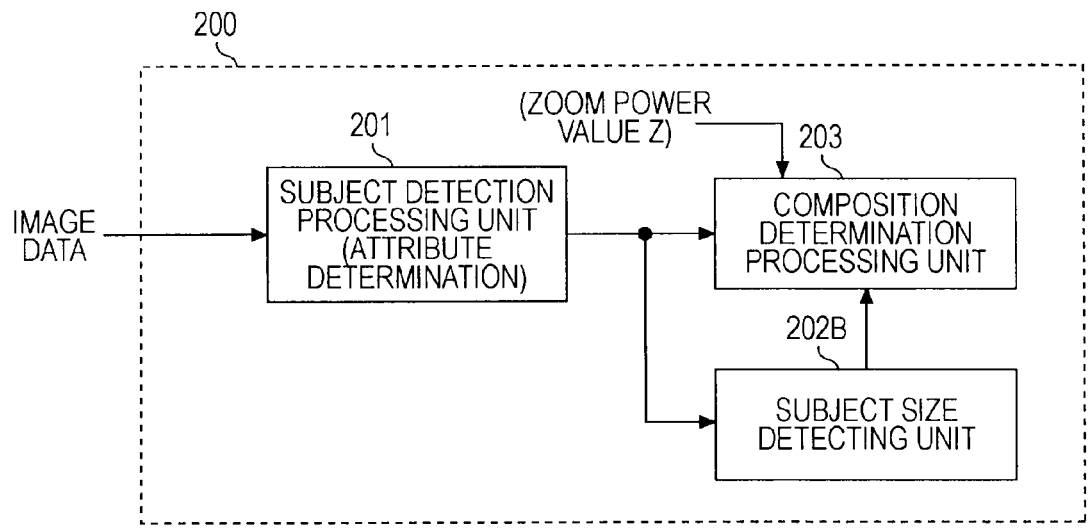
FIG. 7 is a block diagram illustrating a basic configuration example of composition determination corresponding to a second embodiment.

FIG. 7 illustrates a basic configuration example for composition determination as a second embodiment. The composition determination block 200 in this drawing is configured of the subject detection processing unit 201, a subject size detection unit 202B, and the composition determination processing unit 203. This configuration can be viewed as the subject distance detection unit 202A in FIG. 1 corresponding to the first embodiment for example, having been replaced with the subject size detection unit 202B.

In this configuration as well, the subject detection processing unit 201 uses acquired image data to perform image detection processing, and outputs detected subject information, in the same way as with the first embodiment.

The subject size detection unit 202B reads in detected subject information from the subject detection processing unit 201, and detects the size in the image of each detected individual subject.

Note that, as described earlier, in the event that the subject detection processing by the subject detection processing unit 201 is such as based on face detection, the size in the image for each detected individual subject can be obtained at the state of subject detection processing. In this case, the subject size detection unit 202B can be considered to be included in the subject detection processing unit 201. Alternatively, a configuration may be conceived wherein the subject size detection unit 202B extracts and obtains size information for each detected individual subject, from detected subject information input from the subject detection processing unit 201.

Of course, in the event of an algorithm for subject detection processing where the size in the image of the detected individual subject cannot be obtained for example, a configuration will be made wherein the subject size detection unit 202B inputs image data for example, and detects the size of each detected individual subject here. At this time, if there is a position regarding which information has to be externally obtained for each detected individual subject at the time of size detection by the subject size detection unit 202B, the position information for each detected individual subject in the detected subject information can be used.

In any case, the subject size detection unit 202B obtains size information in the screen for each individual subject detected by the subject detection processing unit 201 (subject size information), and outputs this to the composition determination processing unit 203.

In this case, the composition determination processing unit 203 acquires and inputs the detected subject information from the subject detection processing unit 201 and subject size information from the subject size detection unit 202B, and uses these information to ultimately execute composition determination processing with only object individual subjects (relevant subjects) as the object of determination.

Figure 8:
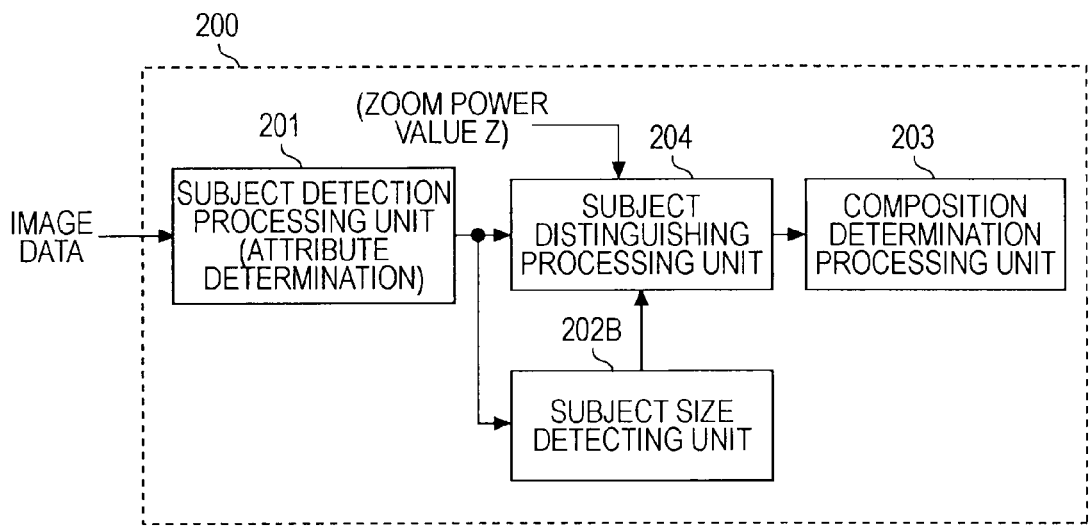
FIG. 8 is a block diagram illustrating another basic configuration example of composition determination corresponding to the first embodiment.

FIG. 8 illustrates another basic configuration example regarding the composition determination block 200 as the second embodiment. The configuration shown in this drawing can be viewed as processing for distinguishing relevant subjects, which the composition determination processing unit 203 performs in FIG. 7 above, as having been extracted as a subject distinguishing processing unit 204.

The subject distinguishing processing unit 204 in this case inputs the detected subject information from the subject detection processing unit 201 and the subject size information from the subject size detection unit 202B. Object individual subjects corresponding to relevant subjects are distinguished from the detected individual subjects, and detected individual subject information corresponding to each of these object individuals subjects is output to the composition determination processing unit 203.

The composition determination processing unit 203 then performs composition determination processing taking only object individual subjects (relevant subjects) as the objects, based on the detected individual subject information for each object individual subject output from the subject distinguishing processing unit 204.

Figure 9:
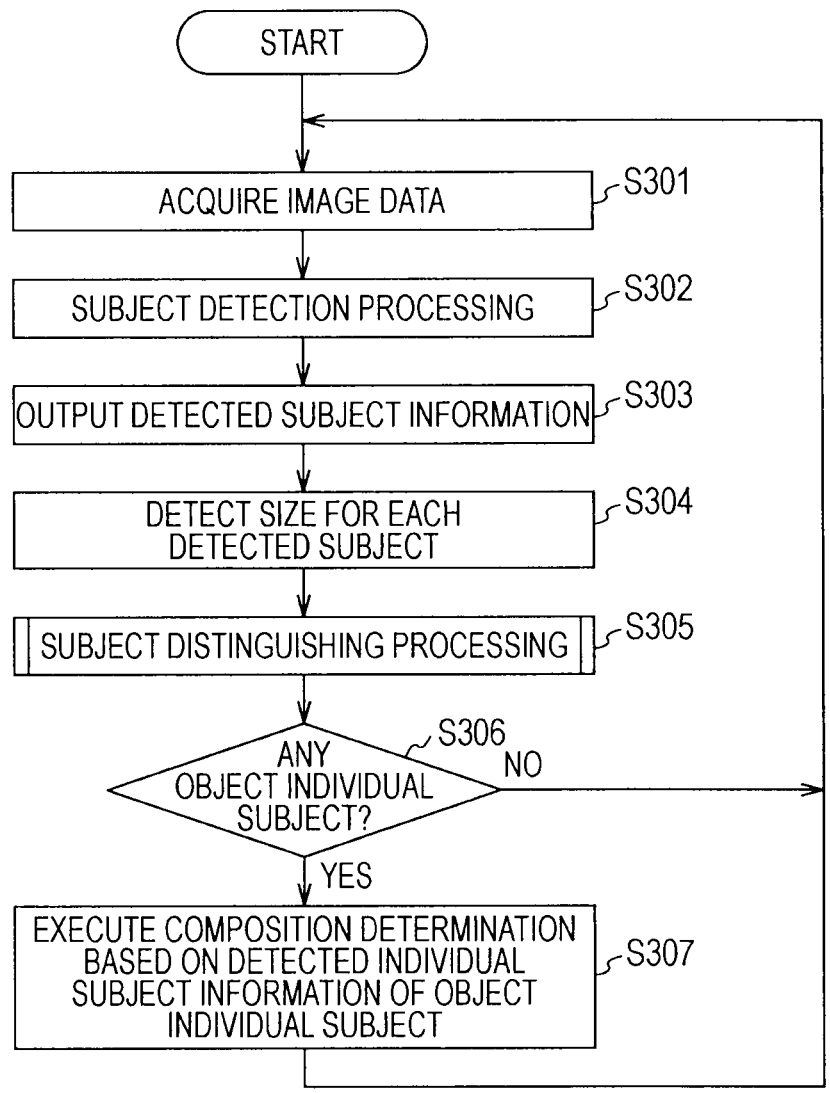
FIG. 9 is a flowchart illustrating a processing procedure example executed by a composition determination block according to the second embodiment.

The flowchart in FIG. 9 illustrates an example of procedures for processing which the composition determination block 200 corresponding to the second embodiment shown in FIG. 7 or FIG. 8 above.

In steps S301 through S303, the subject detection processing unit 201 acquires image data and performs subject detection processing, and outputs detected subject information, in the same way as with steps S101 through S103 in FIG. 3.

Step S304 is processing wherein size information within the image for each detected individual subject is obtained and subject size information is output by the subject size detection unit 202B, as described earlier.

In step S305, subject distinguishing processing is performed. This subject distinguishing processing is also performed by the composition determination processing unit 203 in correspondence with FIG. 7 and by the subject distinguishing processing unit 204 in correspondence with FIG. 8.

Figure 10:
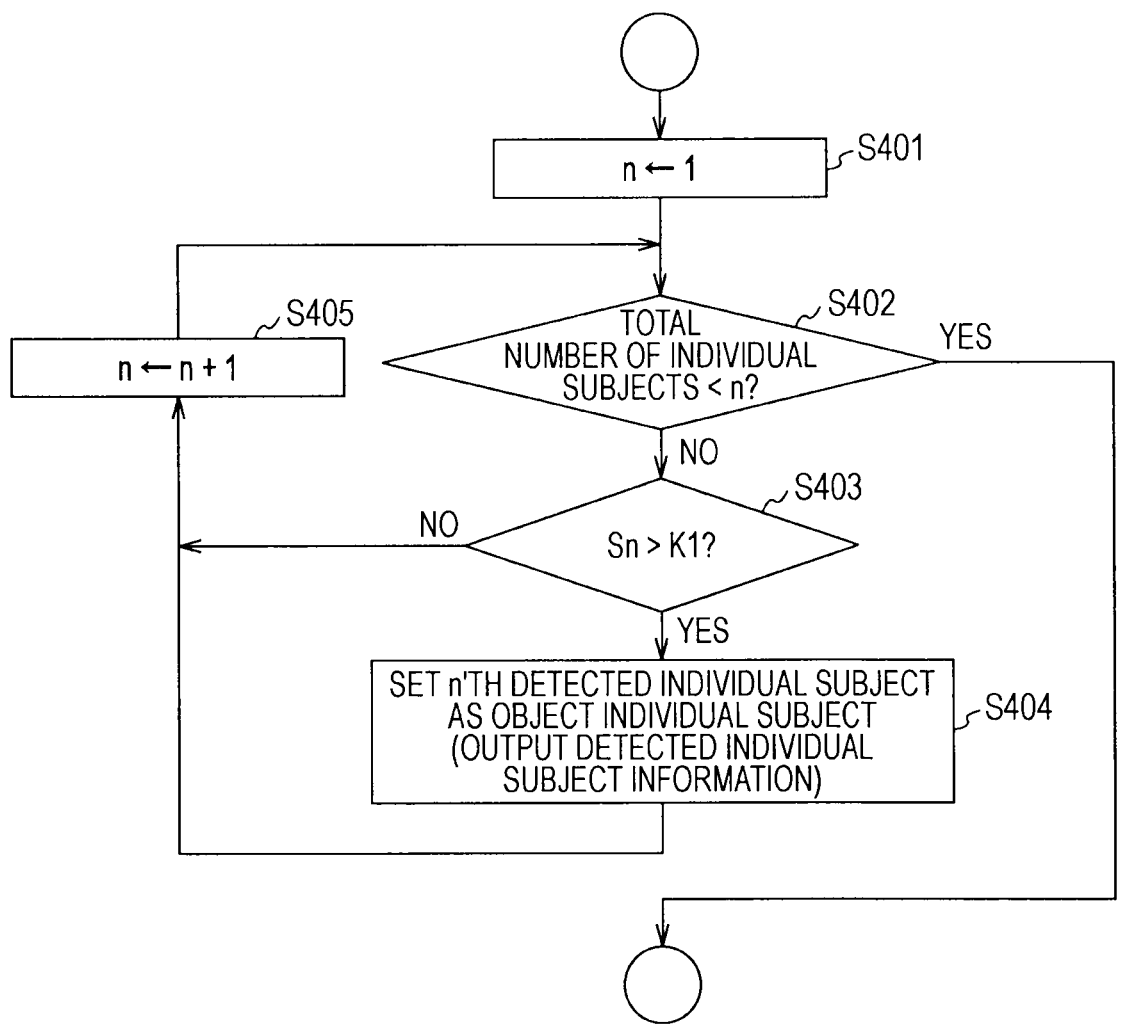
FIG. 10 is a flowchart illustrating a procedure example of subject distinguishing processing in FIG. 9.

FIG. 10 illustrates a procedures example for subject distinguishing processing in the above step S305.

Step S401 is a procedure for 1 being substituted into a variable n indicating the order of the detected individual subject to be taken as an object of distinguishing, in the same way as with step S201 in FIG. 4 earlier. Step S402 is processing for determination being made regarding whether or not the current variable n has exceeded the total number of individual subjects. In the event that a negative determination result is obtained here, the flow proceeds to step S403.

In step S403, determination is made regarding whether or not the condition (conditional expression) of Sn>K1 holds regarding the size Sn detected regarding the n'th detected individual subject, and a lower threshold K1.

Here, the lower threshold K1 is determined based on a subject size which is to small to be judged to be a relevant subject. Accordingly, in the event that the conditional expression of Sn>K1 holds and a positive determination result is obtained, this means that the n'th individual subject has a size of an order which can be handled as a relevant subject. Accordingly, in this case, the flow proceeds to step S404, and the n'th detected individual subject is set as an object individual subject (relevant subject), and the detected individual subject information thereof is output for composition determination. After step S404, in step S405 the variable n is incremented and the flow returns to step S402.

Also, in the event that a negative determination result is obtained in step S403, this means that the n'th detected individual subject is not of a size of an order which can be handled as a relevant subject. In this case, the flow skips step S404 and advances to step S405, and then returns to step S402. Upon a positive determination result being obtained in step S402, the processing shown in the drawing is exited.

With the subject distinguishing processing shown in FIG. 10, the in-image size of each detected individual subject is determined, and determination is made regarding whether each detected individual subject has an in-image size of an order which can be handled as a relevant subject, and those are set (distinguished) as relevant subjects, i.e., as object individual subjects.

Description will now return to FIG. 9. After performing the subject distinguishing processing as step S305, the procedures of step S306, and in some cases step S307, are performed. The procedures of step S306 and step S307 are executed by the composition determination processing unit 203 in the same way as with steps S106 and S107 in FIG. 3.

Figure 12:
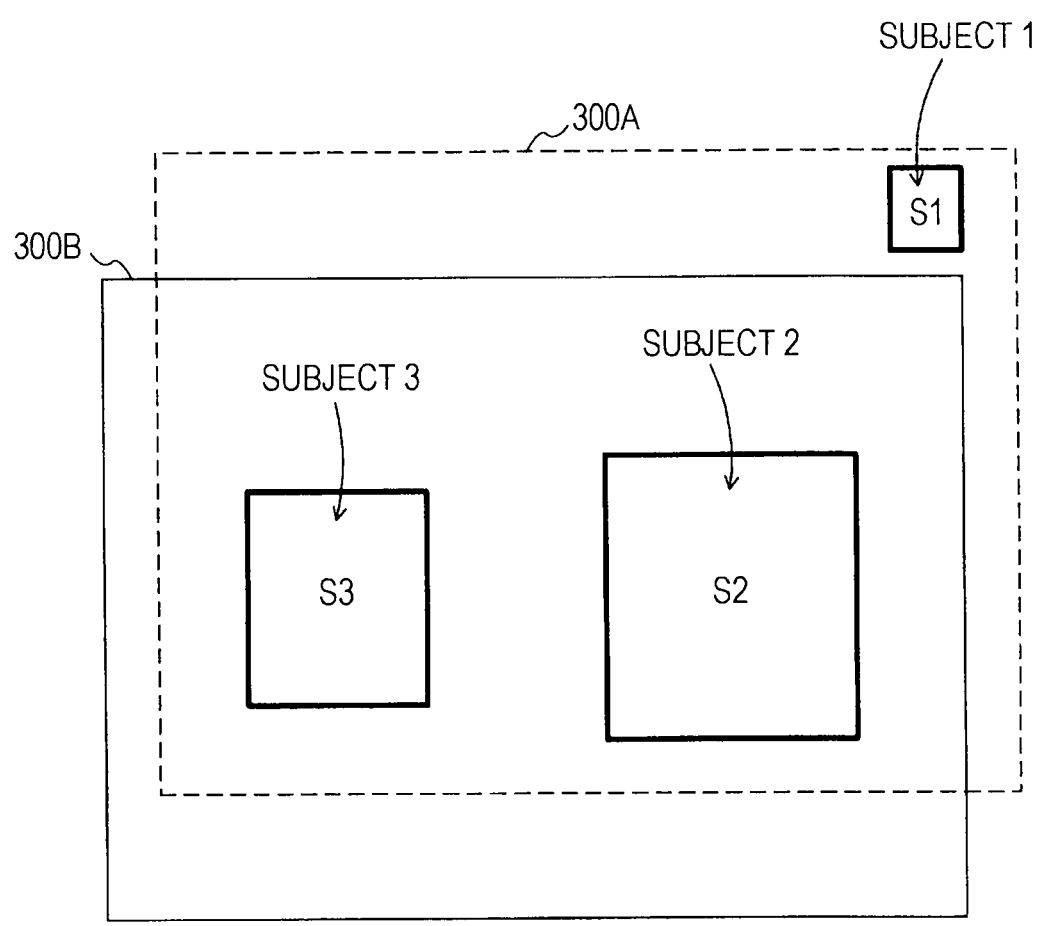
FIG. 12 is a diagram schematically illustrating an actual example regarding composition determination in accordance with an algorithm for subject distinguishing, as the second embodiment.

FIG. 12 schematically illustrates an actual example of composition determination in accordance with a subject distinguishing algorithm as the above-described second embodiment.

As shown in FIG. 12, we will say that three subjects 1, 2, and 3 have been detected by the subject detection processing in the detection image frame 300A. Also, the sizes in the image of the subjects 1, 2, and 3 detected for each are shown as S1, S2, and S3, respectively. Here, we will say that while the size S1 of the subject 1 is at or smaller than the lower threshold K1, the sizes S2 and S3 of the subjects 2 and 3 exceed the lower threshold K1.

In this case, only the subjects 2 and 3 are distinguished as object individual subjects (relevant subjects) by the subject distinguishing processing. The composition determination processing is performed only with the subjects 2 and 3 as the object, with the subject 1 excluded.

The results of composition determination are shown by the relation between the determined composition image frame 300B in FIG. 12 and the subjects 1, 2, and 3. In this determined composition image frame 300B, the subjects 2 and 3 are disposed so as to be approximately at the middle, while the subject 1 outside of the determined composition image frame 300B. That is to say, of the subjects 1, 2, and 3, composition determination has been made with the subjects 2 and 3 as the object.

Now, in the subject distinguishing processing shown in FIG. 10, the size Sn of the detected individual subject is compared only with the lower threshold K1, and not compared with an upper threshold. This is due to the idea that a large detected individual subject size is no problem, and accordingly should be handled as a relevant subject.

However, in some cases, there may be cases wherein in the event that a subject of a certain size or greater exists in the screen (image frame), it is preferable to eliminate such a subject from the relevant subjects instead. Accordingly, FIG. 11 illustrates a processing example configured so as to eliminate detected individual subjects of a certain size or greater from the relevant subjects instead, as the subject distinguishing processing in step S305.

Figure 11:
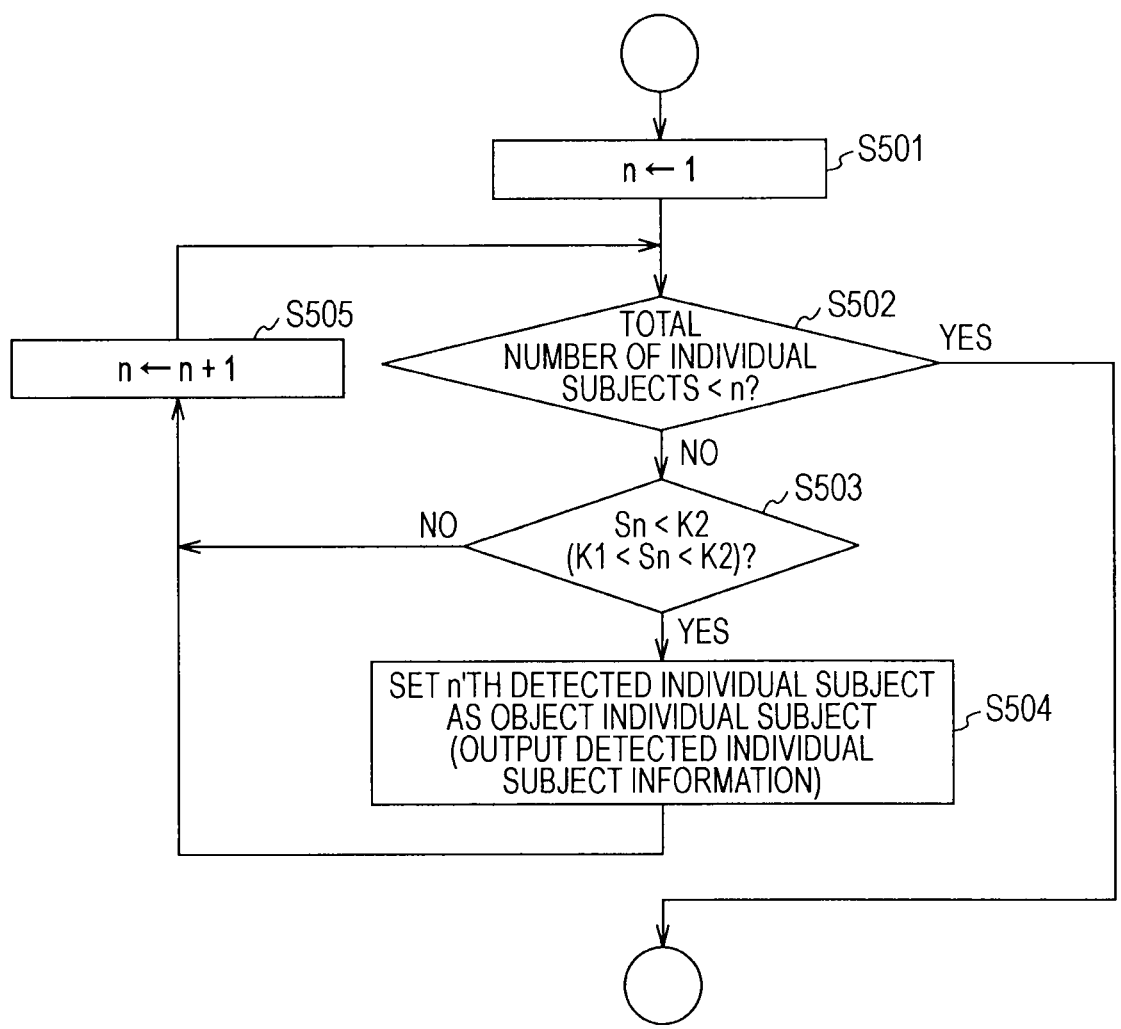
FIG. 11 is a flowchart illustrating another procedure example of subject distinguishing processing in FIG. 9.

Steps S501, S502, S504, and S505 in FIG. 11 are the same as steps S401, S402, S404, and S405 in FIG. 10.

In step S503, determination is made regarding the n'th detected individual subject size Sn and upper threshold K2 (K1<K2), whether or not the condition (conditional expression) of Sn<K2 holds. The upper threshold K2 is set based on a subject size too large to be handled (judged) as a relevant subject.

Now, in the event that a positive determination result is obtained that the above Sn<K2 holds, the n'th detected individual subject size Sn is an appropriate size within a certain size that can be judged to be a relevant subject, so the flow proceeds to step S504. Conversely, in the event that a negative determination result is obtained here, step S504 is skipped regarding the n'th detected individual subject, and the flow proceeds to step S505.

Figure 13:
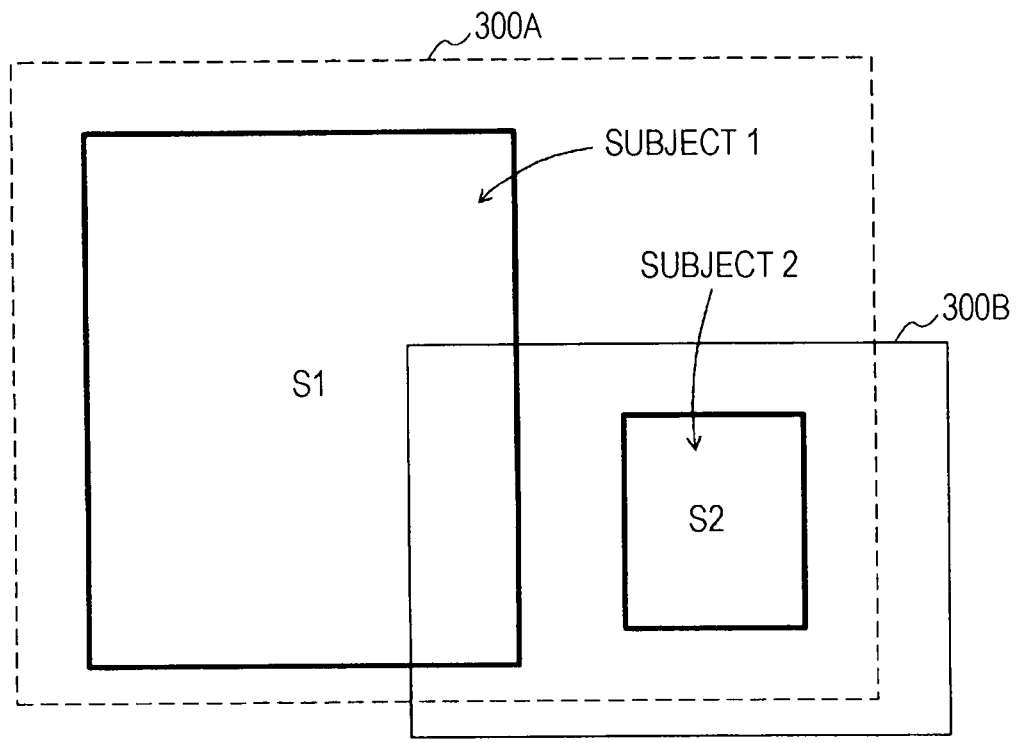
FIG. 13 is a diagram schematically illustrating another actual example regarding composition determination in accordance with an algorithm for subject distinguishing, as the second embodiment.

FIG. 13 schematically illustrates an actual example of composition determination in accordance with the subject distinguishing algorithm shown in FIG. 11 above. In FIG. 13, we will say that two subjects 1 and 2 have been detected in the detection image frame 300A by the subject detection processing. The sizes in the image of the subjects 1 and 2 are shown as S1 and S2, respectively.

Here, we will say that while the size S1 of the subject 1 is at or greater than the upper threshold K2, the size S2 is below the upper threshold K2. In this case, with the subject distinguishing processing, only the subject 2 is distinguished as an object individual subject, and the composition determination processing is performed only with the subject 2 as the object, with the subject 1 excluded.

The results of composition determination are shown by the relation between the determined composition image frame 300B in FIG. 13 and the subjects 1 and 2. In this determined composition image frame 300B, the subject 2 is disposed so as to be approximately at the middle. On the other hand, the subject 1 is outside of the determined composition image frame 300B. That is to say, of the subjects 1 and 2, composition determination has been made with only the subject 2 as a relevant subject.

It should be noted that in FIG. 13, the size of the detection image frame 300A and the determined composition image frame 300B differ. This means that the field angle has been narrowed (the zoom power raised) as compared to when imaging the detection image frame 300A.

Also, a configuration may be made wherein subjects smaller than the lower threshold K1 and subjects greater than the upper threshold K2 are both eliminated from relevant subjects, as subject distinguishing processing based on subject size. That is to say, as shown in the parentheses ( ) in step S503 in FIG. 11 for example, an arrangement may be made wherein determination is made regarding whether or not the condition of $$K1<Sn<K2$$

holds regarding the n'th detected individual subject size, lower threshold K1, and upper threshold K2, and in the event that a positive determination result is obtained, the flow proceeds to step S504, while in the event that a negative determination result is obtained, step S504 is skipped and the flow proceeds to step S505. With such distinguishing processing both those too small and too large for being judged as subjects can be eliminated at the time of distinguishing relevant subjects from detected individual subject.

Also, an actual imaging apparatus would usually have a zoom lens for changing the field angle (zoom power). Changing the field angle will also change the size of the subjects within the image frame of the image obtained by imaging. Accordingly, an arrangement can be conceived wherein the lower threshold K1 and upper threshold K2 are changed in accordance with the changed field angle in steps S403 and S503 in FIGS. 10 and 11, for example.

As one specific example, at the time of the determination processing in steps S403 and S503, the lower threshold K1 and upper threshold K2 are set corresponding to a reference field angle (zoom power value=1). Information of the field angle obtained by zoom control is acquired by conversion into a zoom power value Z, determination is made in step S403 regarding whether or not the conditional expression of Sn>K1·z holds, and determination is made in step S503 regarding whether or not the conditional expression of Sn>K2·z holds. Also, an arrangement may be made wherein the condition expression is Sn/Z>K1 in step S403, and wherein the condition expression is Sn/Z<K2 in step S503. As can be understood from this, these conditional expressions using the zoom power value Z can be viewed as performing correction regarding the in-image size Sn changing in accordance with zooming, such that comparison with the thresholds (lower threshold K1 and upper threshold K2) is appropriate.

Figure 14:
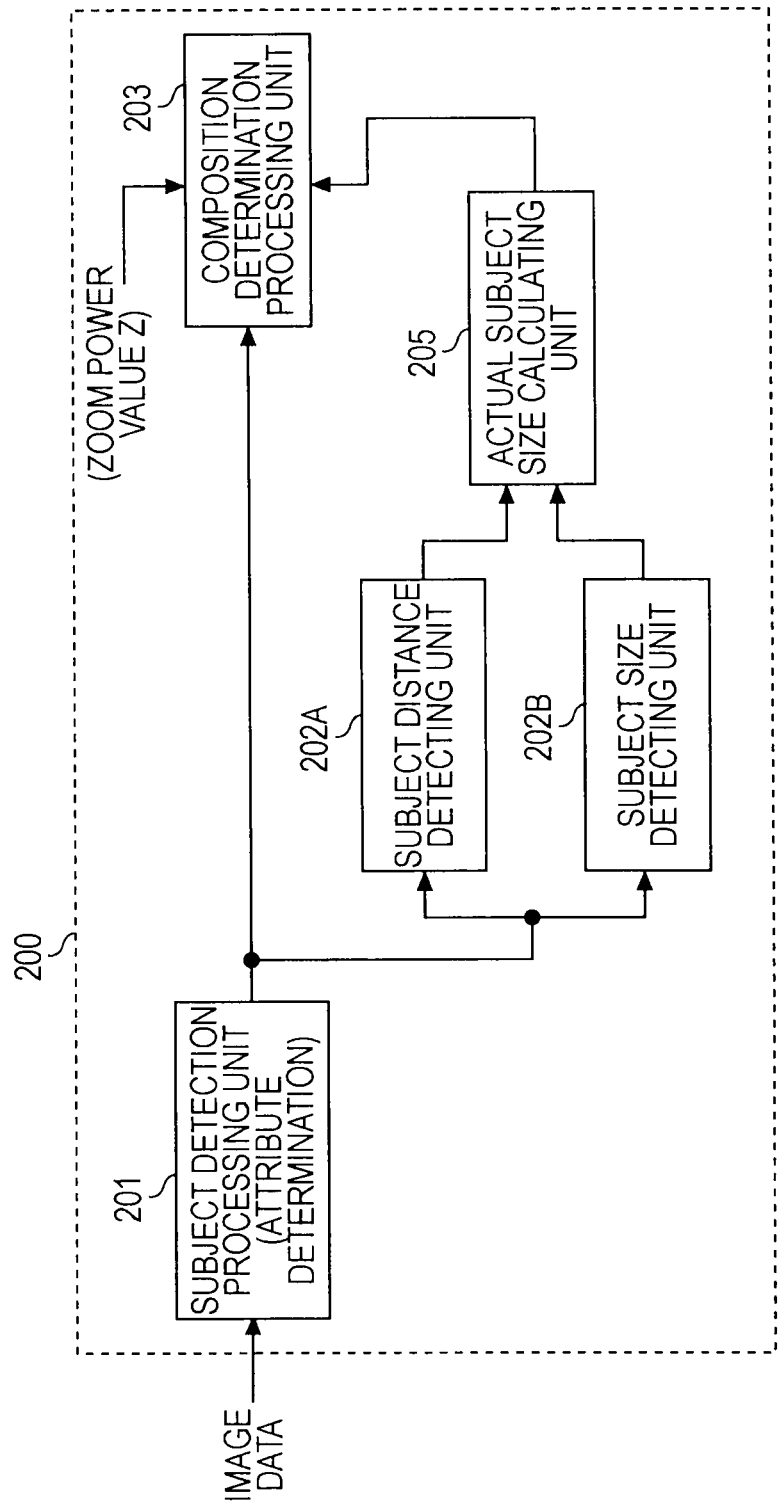
FIG. 14 is a block diagram illustrating a basic configuration example of composition determination corresponding to a third embodiment.

FIG. 14 illustrates a basic configuration example for composition determination as a third embodiment. The composition determination block 200 shown in this drawing is configured having the subject detection processing unit 201, subject distance detection unit 202A, subject size detection unit 202B, composition determination processing unit 203, and an actual subject size calculating unit 205.

At the subject detection processing unit 201, subject detection processing the same as with the embodiments above is executed, and detected subject information is output to each of the subject distance detection unit 202A, subject size detection unit 202B, and composition determination processing unit 203.

The subject distance detection unit 202A detects the subject distance for each detected individual subject and outputs subject distance information, in the same way as with the above-described first and second embodiments. Also, the subject size detection unit 202B detects the in-image size and outputs subject size information, in the same way as with the above-described first and second embodiments.

The actual subject size calculating unit 205 acquires the subject distance information and subject size information for each detected individual subject, output from the subject distance detection unit 202A and subject size detection unit 202B, obtains an "actual size" corresponding to each detected individual subject, and outputs actual size information for each detected individual subject (actual subject size information).

Now, while the actual subject size calculating unit 205 can also obtain an approximately accurate value for the actual measurement size which the detected individual subject actually has, as described later, a value which can be viewed as being equivalent to actual measurement but which can be handled easily, can be obtained based on the subject distance and size of the detected individual subject, for example.

The composition determination processing unit 203 in this case acquires and inputs detected subject information from the subject detection processing unit 201 and actual subject size information from the actual subject size calculating unit 205, and uses these information to ultimately execute composition determination processing taking only detected individual subjects (relevant subjects) as determination objects.

Figure 15:
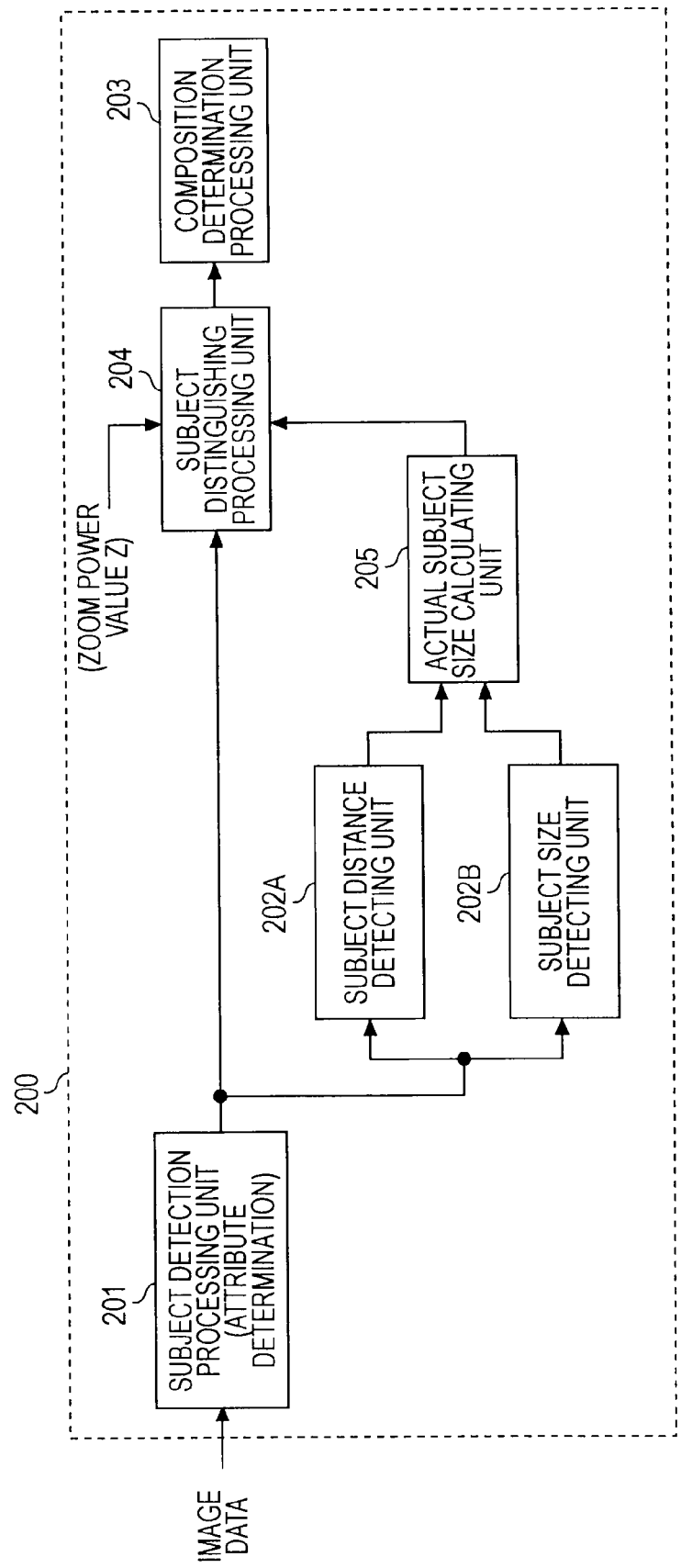
FIG. 15 is a block diagram illustrating another basic configuration example of composition determination corresponding to the third embodiment.

FIG. 15 illustrates another basic configuration example regarding the composition determination block 200 as the third embodiment, has a configuration where processing for distinguishing relevant subjects, which the composition determination processing unit 203 performs in FIG. 14 above, has been extracted as a subject distinguishing processing unit 204.

The subject distinguishing processing unit 204 in this case inputs detected subject information from the subject detection processing unit 201 and actual subject size information from the actual subject size calculating unit 205, uses these information to distinguish object individual subjects (relevant subjects) from the detected individual subject, and outputs detected individual subject information corresponding to each of these detected individual subjects to the composition determination processing unit 203. The composition determination processing unit 203 performs composition determination processing taking only detected individual subjects (relevant subjects) as determination objects, based on the detected individual subject information for each object individual subject from the subject distinguishing processing unit 204.

Figure 16:
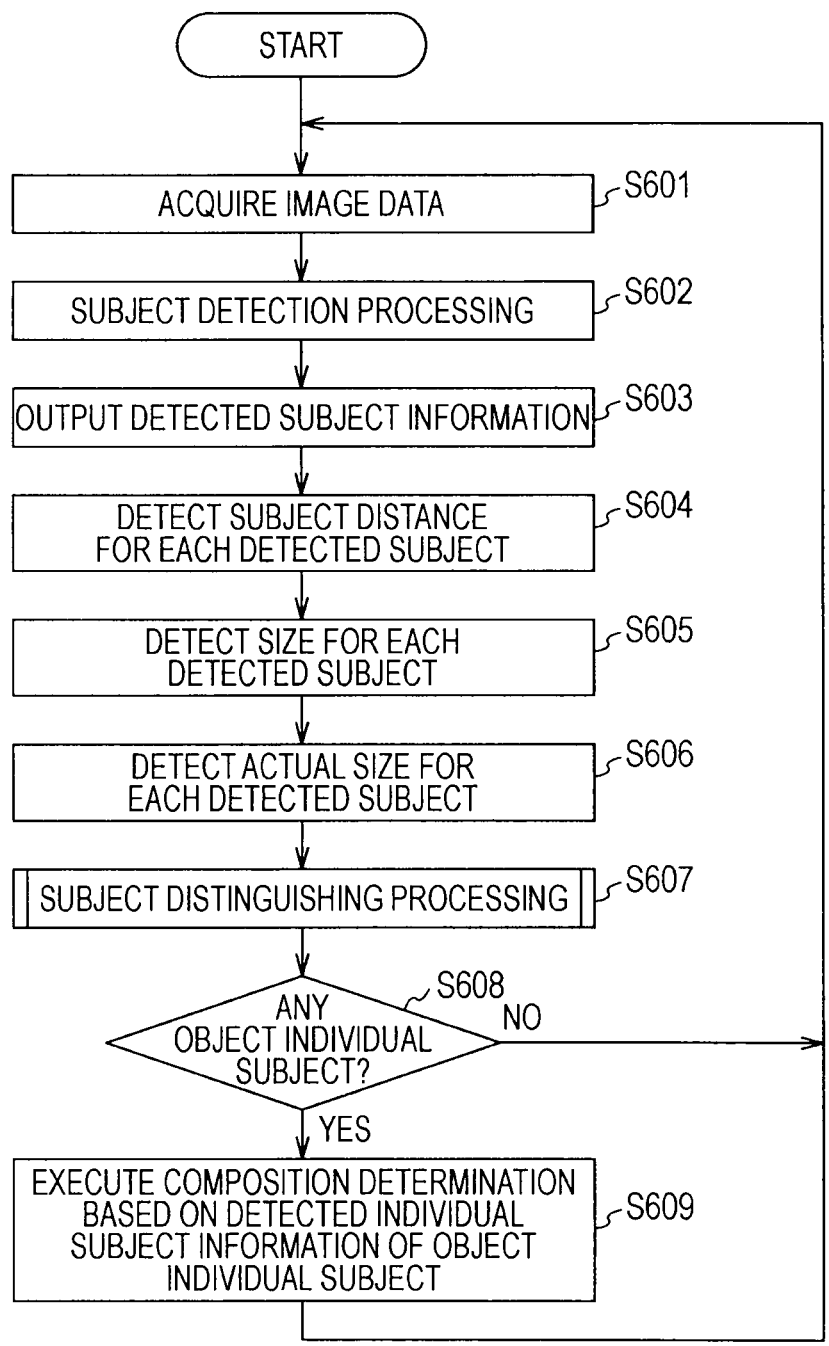
FIG. 16 is a flowchart illustrating a processing procedure example executed by a composition determination block according to the third embodiment.

The flowchart in FIG. 16 illustrates a procedure example of processing which the composition determination block 200, corresponding to the third embodiment shown in FIG. 14 or FIG. 15 above, executes.

In steps S601 through S603, the subject detection processing unit 201 acquires image data and performs subject detection processing, and outputs detected subject information, in the same way as with steps S101 through S103 in FIG. 3 and so forth, for example.

In step S604, the subject distance detection unit 202A detects the subject distance for each detected individual subject, and outputs subject distance information.

In step S605, the subject size detection unit 202B obtains the size of each detected individual subject in the image, and outputs as subject size information.

Note that while steps S604 and S605 are illustrated as sequential processing due to matters of notation in the flowchart, these can be considered to be processing to be executed simultaneously and in parallel as corresponding to FIGS. 14 and 15.

Step S606 is processing wherein the actual subject size calculating unit 205 calculates and obtains the actual size for each detected individual subject. As described above, a value which can be handled as being equivalent to actual measurement size (simple value) can be obtained as the actual size. An example of how to obtain the actual size as this simple value is as follows.

The actual subject size calculating unit 205 acquires the subject distance information obtained in step S604 and the subject size information obtained in step S605. The subject distance for each detected individual subject is indicated in the subject distance information, and the information of the size in the image for each detected individual subject is indicated in the subject size information. Also, the information of the size in the image here is in the number of vertical pixels in the partial image region where the detected individual subject has been detected. That is to say, the in-image size is not the area of the partial image region where the detected individual subject has been detected, but an amount equivalent to the length in a one-dimensional direction. Note that the number of horizontal pixels may be used instead of the number of vertical pixels.

Now, the actual subject size calculating unit 205 can obtain the actual size Srn of the n'th detected individual subject by $$Srn = Fn * Fyn \qquad \text{Expression (1)}$$

where Dn is the subject distance of the same n'th detected individual subject and Fyn is the size (number of vertical pixels).

The actual size Srn obtained from the above Expression (1) is a multiplication of the subject distance by the number of vertical pixels serving as the size, thereby obtaining a numerical value for Srn unambiguously corresponding to the actual measurement size of the real detected individual subject. That is to say, a value (simple value) which can be handled as being equivalent to the actual measurement size is obtained. Also, the actual size Srn obtained from the above Expression (1) can also be viewed as being a computation for unifying detected individual subjects obtained at the time of imaging at a subject distance set as a reference (e.g., 1 m) in terms of in-image size (number of vertical pixels).

Note that the actual size Srn can also be obtained by $$Srn = \text{sqrt}(Dn^2 * Sn) \qquad \text{Expression (2)}$$

where, Dn indicates the subject distance detected regarding the n'th detected individual subject, and Sn indicates the in-image size of the n'th detected individual subject detected as area. Also, sqrt indicates the square root, and ^ indicates the exponential.

Also, as described above, an actual size Srn approximately corresponding to the actual measurement size of the real detected individual subject can be obtained. For this, assuming that the field angle is fixed to simplify description, using the number of vertical pixels py of the imaged image, and actual size in the vertical direction of the image frame of the imaged image Sy corresponding to the subject distance sets as a reference (e.g., 1 m), as parameters along with the subject distance Dn (m), size (number of vertical pixels) Fyn, this can be obtained by the following computation, for example.

$$Srn = Sy \cdot \{(Dn \cdot Fyn)/py\} \qquad \text{Expression (3)}$$

Step S607 is subject distinguishing processing. This subject distinguishing processing is executed by the composition determination processing unit 203 in correspondence with FIG. 14, and is executed by the subject distinguishing processing unit 204 in correspondence with FIG. 15.

Figure 17:
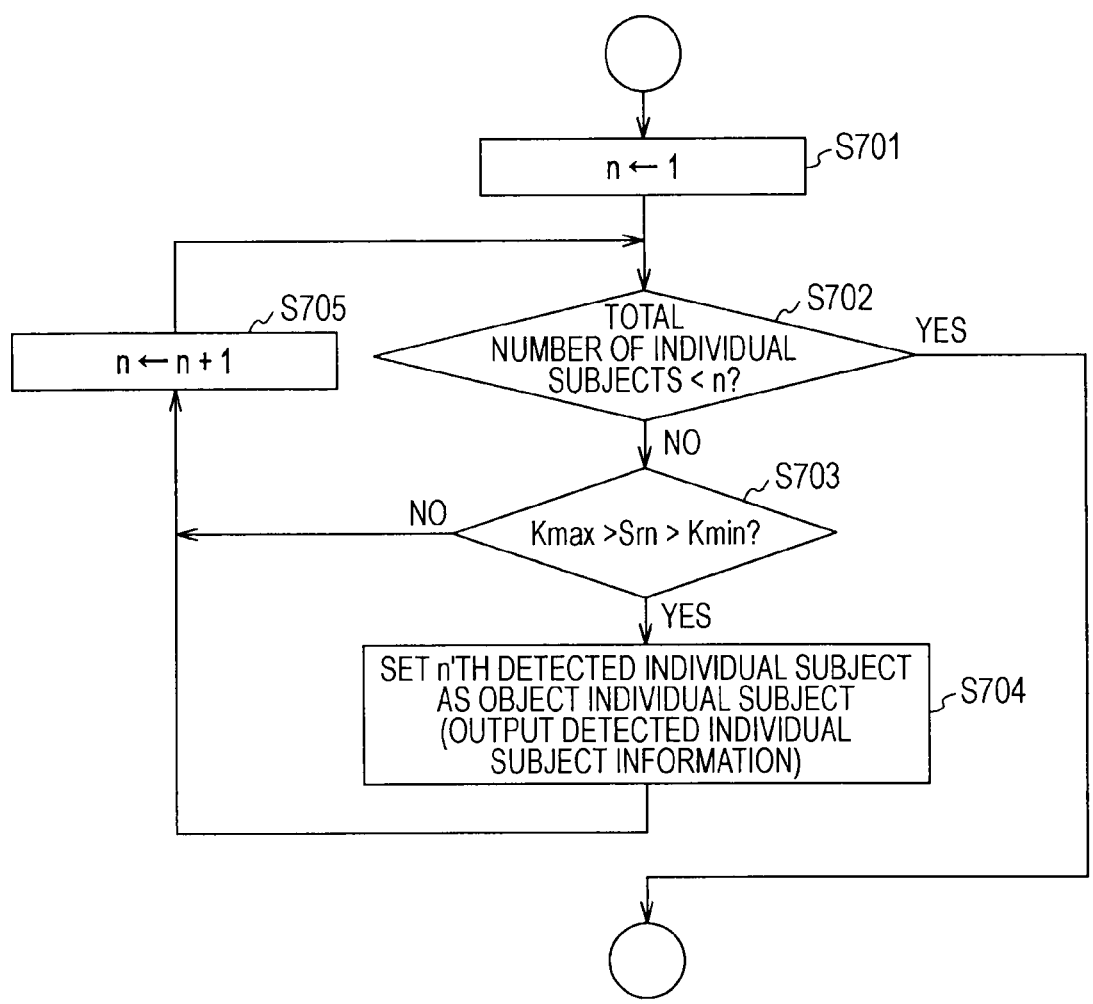
FIG. 17 is a flowchart illustrating a procedure example of subject distinguishing processing in FIG. 16.

FIG. 17 illustrates a procedure example of subject distinguishing processing as the above step S607. In this drawing, steps S701, S702, S704, and S705 are the same as steps S201, S202, S204, and S205 in FIG. 4 for example.

In step S703 whether or not the conditions of $$Kmax > Srn > Kmin$$

hold regarding the actual size Srn of the n'th detected individual subject obtained in step S606, upper threshold Kmax, and lower threshold Kmin, is distinguished.

Now, the upper threshold Kmax is set taking into consideration an actual size so great that it would be unrealistic with a normal subject, and the lower threshold Kmin is set taking into consideration an actual size so small that it would be unrealistic with a normal subject.

Accordingly, in the event that the actual size Srn satisfies the conditions of Kmax>Srn>Kmin, it can be said that the actual size Srn is within an appropriate range which can be conceived for a normal subject. This means that the detected individual subject corresponding to the actual size Srn can be judged to be a relevant subject.

Accordingly, with the present embodiment, in the event that a positive determination result is obtained in step S703, the n'th detected individual subject is set as an object individual subject in step S704.

On the other hand, in the event that the actual size Srn does not satisfy the conditions of Kmax>Srn>Kmin, this is a case wherein one of Srn≧Kmax or Srn≦Kmin holds. That is to say, the actual size Srn has a value smaller or greater than a range which can be assumed as being a normal subject. This means that the detected individual subject corresponding to that actual size Srn should not be judged to be a relevant subject.

Accordingly, in the event that a negative determination result is obtained in step S703, step S704 is skipped and the flow proceeds to step S705.

Thus, with the subject distinguishing processing shown in FIG. 17, each of the detected individual subjects which have an actual size within an appropriate range which can be judged as a relevant subject are set (distinguished) as an object individual subject (relevant subject).

After performing the subject distinguishing processing as step S607, the procedures of step S608, and in some cases step S609, are performed. The procedures of step S608 and step S609 are executed by the composition determination processing unit 203 in the same way as with steps S106 and S107 in FIG. 3.

FIGS. 20A through 21D schematically illustrate an actual example of composition determination in accordance with an algorithm for subject distinguishing shown in FIGS. 16 and 17 above.

First, FIGS. 20A through 20D illustrate an example performing composition determination excluding that of which the actual size is too small to be judged to be a relevant subject.

In FIG. 20A, we will say that the three subjects 1, 2, and 3 have been detected in the detection image frame 300A. We will also say that the in-image sizes detected for each of the subjects 1, 2, and 3 are represented by the number of vertical pixels in the rectangular detection frame corresponding to the subject detected based on face detection, for example. The size according to the number of vertical pixels is shown as Fy1 for the subject 1, Fy2 for the subject 2, and Fy3 for the subject 3. Also, respective subject distances D1, D2, and D3, of the subjects 1, 2, and 3, detected based on the contrast method, are shown in FIGS. 20B through 20D, respectively.

First, we will assume that the subject distances D1, D2, and D3, detected for each of the subjects 1, 2, and 3, are within a range of value which can be viewed as being around the same.

On the other hand, regarding the size, we will say that while the sizes Fy2 and Fy3 of the subjects 2 and 3 are appropriate sizes which can be judged as being a relevant subject in comparison with the subject distances D2 and D3 thereof, the size Fy1 of the subject 1 is a size which is too small to be judged as being a relevant subject in comparison with the subject distance D1 thereof.

We will then say that determining the actual sizes Sr1, Sr2, and Sr3, obtained for each subject 1, 2, and 3, as shown in FIGS. 20A through 20D following step S703 in FIG. 17, are such that Sr1≦Kmin holds for the actual size Sr1 and Kmax>Sr1>Kmin does not hold, so a negative determination result has been obtained. On the other hand, Kmax>Sr1>Kmin holds for the actual size Sr2, and Kmax>Sr1>Kmin holds for the actual size Sr3 as well. In this case, the subjects 2 and 3 are distinguished as being relevant subjects (object individual subjects), and the subject 1 is excluded, as the results of the subject distinguishing processing. The composition determination processing is performed with only the subjects 2 and 3 as the object, with the subject 1 excluded.

The results of composition determination are illustrated by the relation between the determined composition image frame 300B in FIG. 20A and the subjects 1, 2, and 3. The subjects 2 and 3 are situated around the middle of the determined composition image frame 300B. On the other hand, the subject 1 is off of the determined composition image frame 300B.

Also, FIGS. 21A through 21D illustrate an example performing composition determination excluding that of which the actual size is too great to be judged to be a relevant subject.

In FIG. 21A as well, we will say that the three subjects 1, 2, and 3 have been detected in the detection image frame 300A by the subject detection processing. Here also, the in-image sizes detected for each of the subjects 1, 2, and 3 are represented by the number of vertical pixels in the rectangular detection frame of the subject detected based on face detection, for example. The in-image size according to the number of vertical pixels is shown as Fy1 for the subject 1, Fy2 for the subject 2, and Fy3 for the subject 3. Also, respective subject distances D1, D2, and D3, of the subjects 1, 2, and 3, detected based on the contrast method, are shown in FIGS. 21B through 21D, respectively.

Here as well, first, we will assume that the subject distances D1, D2, and D3, detected for each of the subjects 1, 2, and 3, are within a range of value which can be viewed as being around the same.

Also, regarding the size, we will say that while the sizes Fy2 and Fy3 of the subjects 2 and 3 are appropriate sizes which can be judged as being a relevant subject in comparison with the subject distances D2 and D3 thereof, the size Fy1 of the subject 1 is a size which is too great to be judged as being a relevant subject in comparison with the subject distance D1 thereof.

We will then say that determining the actual sizes Sr1, Sr2, and Sr3, obtained for each subject 1, 2, and 3, as shown in FIGS. 21A through 21D following step S703 in FIG. 17, are such that Sr1≧Kmax holds for the actual size Sr1 and Kmax>Sr1>Kmin does not hold, so a negative determination result has been obtained. On the other hand, Kmax>Sr1>Kmin holds for the actual size Sr2, and Kmax>Sr1>Kmin holds for the actual size Sr3 as well. In this case, the subjects 2 and 3 are distinguished as being relevant subjects (object individual subjects), and the subject 1 is excluded, as the results of the subject distinguishing processing. The composition determination processing is performed with only the subjects 2 and 3 as the object, with the subject 1 excluded.

The results of composition determination are illustrated by the relation between the determined composition image frame 300B in FIG. 20A and the subjects 1, 2, and 3. The subjects 2 and 3 are situated around the middle of the determined composition image frame 300B. On the other hand, the subject 1 is off of the determined composition image frame 300B. It should also be noted that in this FIG. 21A as well, the size of the detection image frame 300A and the determined composition image frame 300B differ. This means that, as with FIG. 13, the field angle has been narrowed (the zoom power raised) as compared to when imaging the detection image frame 300A.

Now, specific examples of the upper threshold Kmax and lower threshold Kmin used in the processing in step S703 will be given. Note that the zoom power corresponding to the field angle will be assumed to be fixed, to facilitate simple and easy-to-understand description.

Figure 22:
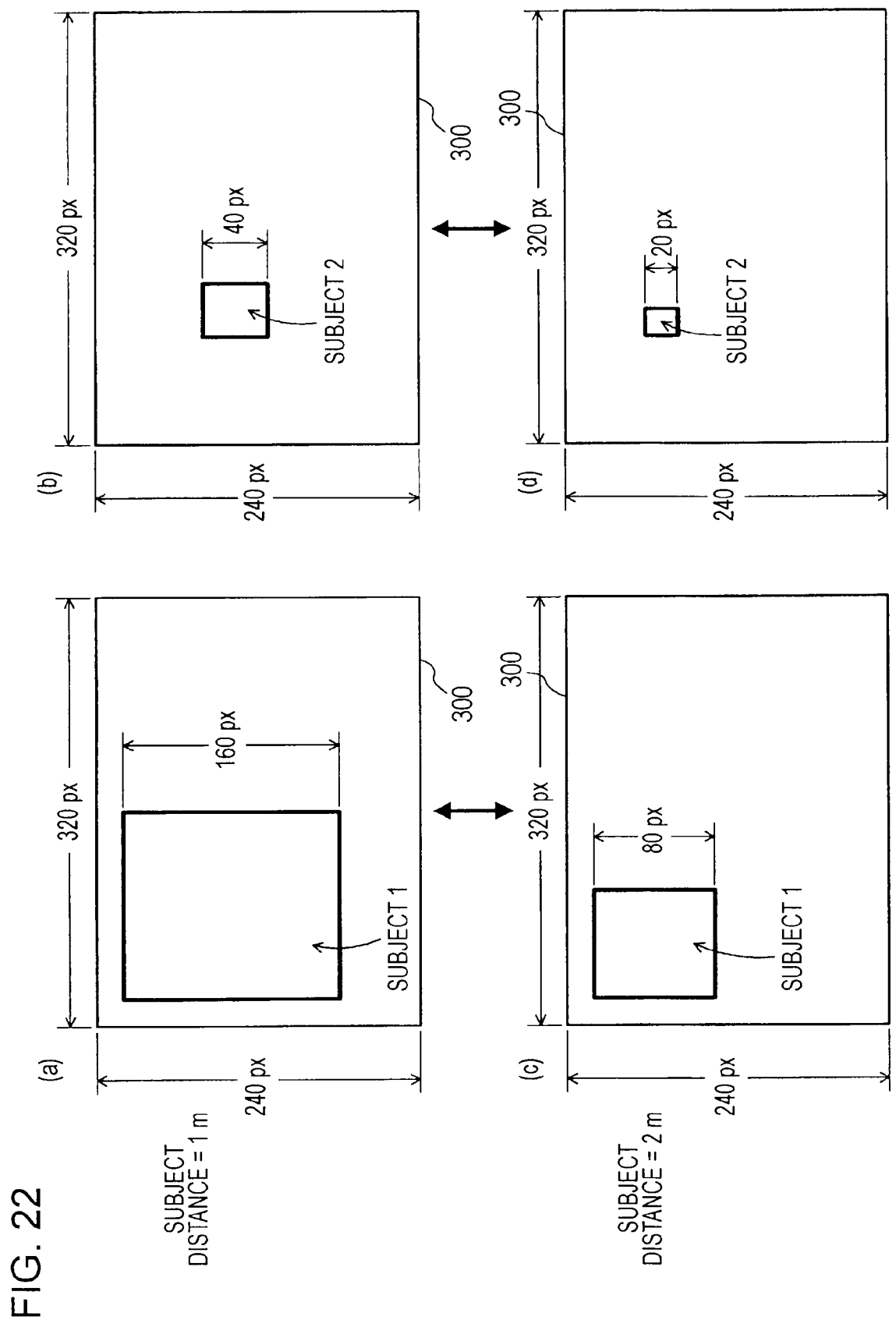
FIG. 22 is a diagram schematically illustrating a relation example between image frame size and subject in-image size, in accordance with an example of specific values for an upper threshold value Kmax and lower threshold value Kmin with the third embodiment.

We will say that (a) and (b) in FIG. 22 are both images obtained by imaging subjects 1 and 2 at a subject distance of 1 m. We will say that the image frame 300 of this image is 240 px in the vertical direction and 320 px in the horizontal direction. Comparing the in-image sizes (number of vertical pixels) of the subjects 1 and 2 in the image frame 300 shows that the subject 1 is large at 160 px, and the subject 2 is small at 40 px. Now, first, we will say that subject distance of 1 m is a reference. Thereupon, we will eliminate from relevant subjects with a subject in-image size of 160 px or greater and 40 px or smaller, imaged at the reference subject distance of 1 m.

These subjects are subjects wherein the size in the vertical direction in the image is ⅔ (i.e., 160/240) or greater, and subjects wherein the size in the vertical direction in the image is ⅙ (i.e., 40/240) or smaller, when imaged at the reference subject distance of 1 m. Such subjects fall out of the actual measurement size of an appropriate range of relevant subjects, and the probability that these are photographs, posters, or the like, is height, and are handled as that which should be excluded from relevant subjects.

In accordance with this, Kmax=160 and Kmin=40 are respectively set as specific values of the upper threshold Kmax and the lower threshold Kmin. In this case, in step S703 the conditional expression of Kmax>Srn>Kmin is actually 160>Srn>40.

As described earlier, the actual size Srn is expressed by a multiplication of, for example, subject distance Dn (m) and in-image size (number of vertical pixels) Fyn, which is (Dn·Fyn).

According to the above conditional expression, the actual size Sr1 of the subject 1 is D1·Fy1=1×160=160, so in step S703, a negative determination result is obtained. That is to say, this is excluded from relevant subjects. Also, the actual size Sr2 of the subject 2 is D2·Fy2=1×40=40, so in step S703, a negative determination result is obtained here as well, and this is excluded from relevant subjects.

Thus, by setting the upper threshold Kmax=160 and the lower threshold Kmax=40, the processing results of step S703 are obtained in accordance with the rule of "excluding from relevant subjects those with an in-image size of 160 px or greater and 40 px or smaller, imaged at the reference subject distance of 1 m".

Also, (c) in FIG. 22 illustrates an image obtained by imaging the subject 1 corresponding to the same upper threshold Kmax as with (a) in FIG. 22 at a subject distance=2 m. The subject distance in this case is twice that of the case of (a) in FIG. 22, so the in-image size (number of vertical pixels) of the subject 1 within the image frame 300 is 80 px which is ½ of the 160 px in (a) in FIG. 22.

Also, (d) in FIG. 22 illustrates an image obtained by imaging the subject 2 corresponding to the same lower threshold Kmin as with (b) in FIG. 22 at a subject distance=2 m. In this case as well, the in-image size (number of vertical pixels) of the subject 1 within the image frame 300 is 20 px which is ½ of the 40 px in (b) in FIG. 22.

Following the rule set here, the rule of "excluding from relevant subjects those with an in-image size of 160 px or greater and 40 px or smaller, imaged at the reference subject distance of 1 m", subjects with an in-image size of 80 px or greater as shown in (c) in FIGS. 22 and 20 px or smaller as shown in (d) in FIG. 22, imaged at the reference subject distance of 2 m, will be excluded from relevant subjects.

For example, in the event that determination is to be made in step S703 regarding the subject 1 shown in (c) in FIG. 22, regarding the actual size Sr1, Sr1=D1·Fy1=2×80=160 is obtained. Also, in the event that determination is to be made in step S703 regarding the subject 2 shown in (d) in FIG. 22, regarding the actual size Sr2, Sr2=D2·Fy2=2×20=40 is obtained.

As can be understood from the actual size Srn of the subjects 1 and 2 obtained by the above calculation, with the processing of step S703 in actual practice, a subject of a size greater than the subject 1 shown in (c) in FIG. 22 and a subject of a size greater than the subject 2 shown in (d) in FIG. 22 both yield a negative determination result, and accordingly are excluded from relevant subjects in accordance with the set rule.

Also, in this third embodiment as well, information of the in-image size is used regarding detected individual subjects at the time of subject distinguishing processing, as with the case of the second embodiment. Accordingly, a configuration can be conceived for an algorithm corresponding to change in the field angle (zoom power) of the imaging apparatus for imaging and obtaining image data input from the subject detection processing unit 201, for the subject distinguishing processing in the third embodiment as well.

Figure 18:
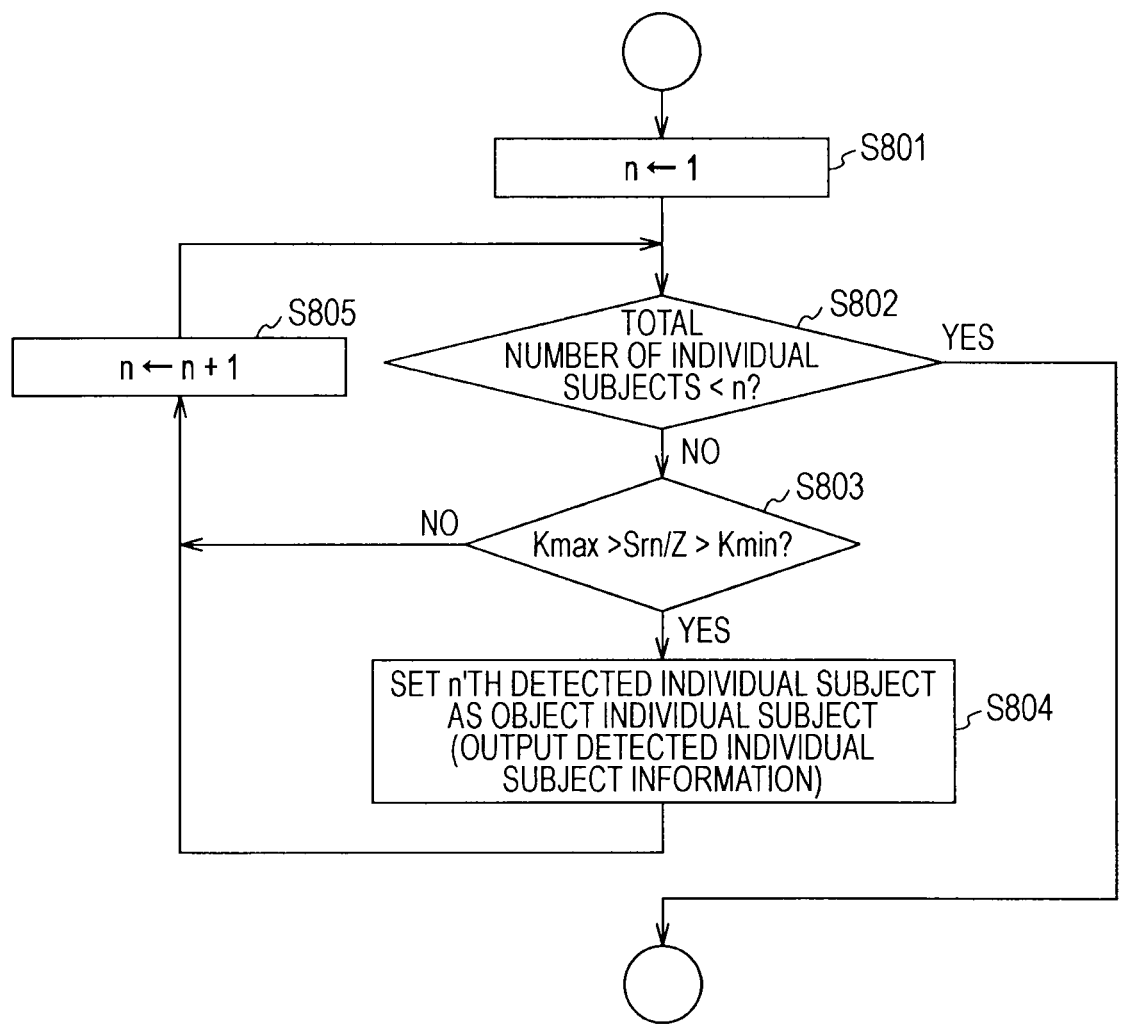
FIG. 18 is a flowchart illustrating another procedure example of subject distinguishing processing in FIG. 16.

Subject distinguishing processing corresponding to field angle (zoom power) of the imaging apparatus is shown in the flowchart in FIG. 18. The processing shown in this diagram is also executed as step S607 in FIG. 16, in the same way as with FIG. 17.

In FIG. 18, steps S801, S802, S804, and S805 are processing the same as steps S701, S702, S704, and S705.

In step S803, determination is made regarding whether the conditions of $$K\max > Srn/Z > K\min$$

hold, including the value of the zoom power Z obtained in accordance with the field angle set at the imaging apparatus at that time. Note that the upper threshold Kmax and lower threshold Kmin in this case are set corresponding to the zoom power of 1×, i.e., Z=1.

With this conditional expression, the actual size will be corrected to a value wherein the zoom power Z=1 regardless of change in zoom power, and comparison can be made properly with the upper threshold Kmax and lower threshold Kmin. Accordingly, composition determination using this subject distinguishing algorithm can also be applied to cases of using an imaging apparatus having a zoom (field angle changing) function.

Also note that the above conditional expression may be Kmax·Z>Srn>Kmin·Z.

Also, with the current state, advance in face recognition technology has already come to enable determination regarding whether a person, who is a subject, is an adult or child (or baby), with quite high precision, from information such a feature amount in the partial image region detected as a face.

Generally, the size of faces differs between adults and children. Even if at the same subject distance, the detected image size will be considerably different when taken as a subject. Accordingly, the precision of subject distinguishing can be raised even further by executing subject distinguishing taking into consideration determination results of adult/child, with regard to those including in-image size elements in distinguishing parameters as with the second embodiment or third embodiment.

Now, a configuration example of a case where a subject distinguishing algorithm applying adult/child determination results has been applied to the third embodiment will be described.

First, the subject detection processing unit 201 in FIG. 14 or FIG. 15 is configured so as to be perform determination regarding whether each detected individual subject is an adult or child, as an attribute thereof (attribute determination), with processing following an algorithm for performing predetermined adult/child determination at the time of performing subject detection. The subject detection processing unit 201 then provides the detected individual subject information for each detected individual subject with attribute information indicating whether an adult or child (adult/child attribute information), based on the adult/child determination results.

As for a block configuration form in FIGS. 14 and 15 corresponding to attribute determination, an arrangement may be made wherein a block for attribute determination (attribute determination processing unit) is provided separately from the subject detection processing unit 201, for example. In this case, for example, the attribute determination processing unit performs attribute determination processing on partial image regions where faces are detected in input image data, for each individual subject which the detected subject information from the subject detection processing unit 201 indicates, thereby recognizing whether adult or child, for example. A configuration can be conceived wherein attribute information is generated indicating whether an adult or child, in accordance with the recognition results, and this is added to the detected individual subject information in the detected subject information.

Figure 19:
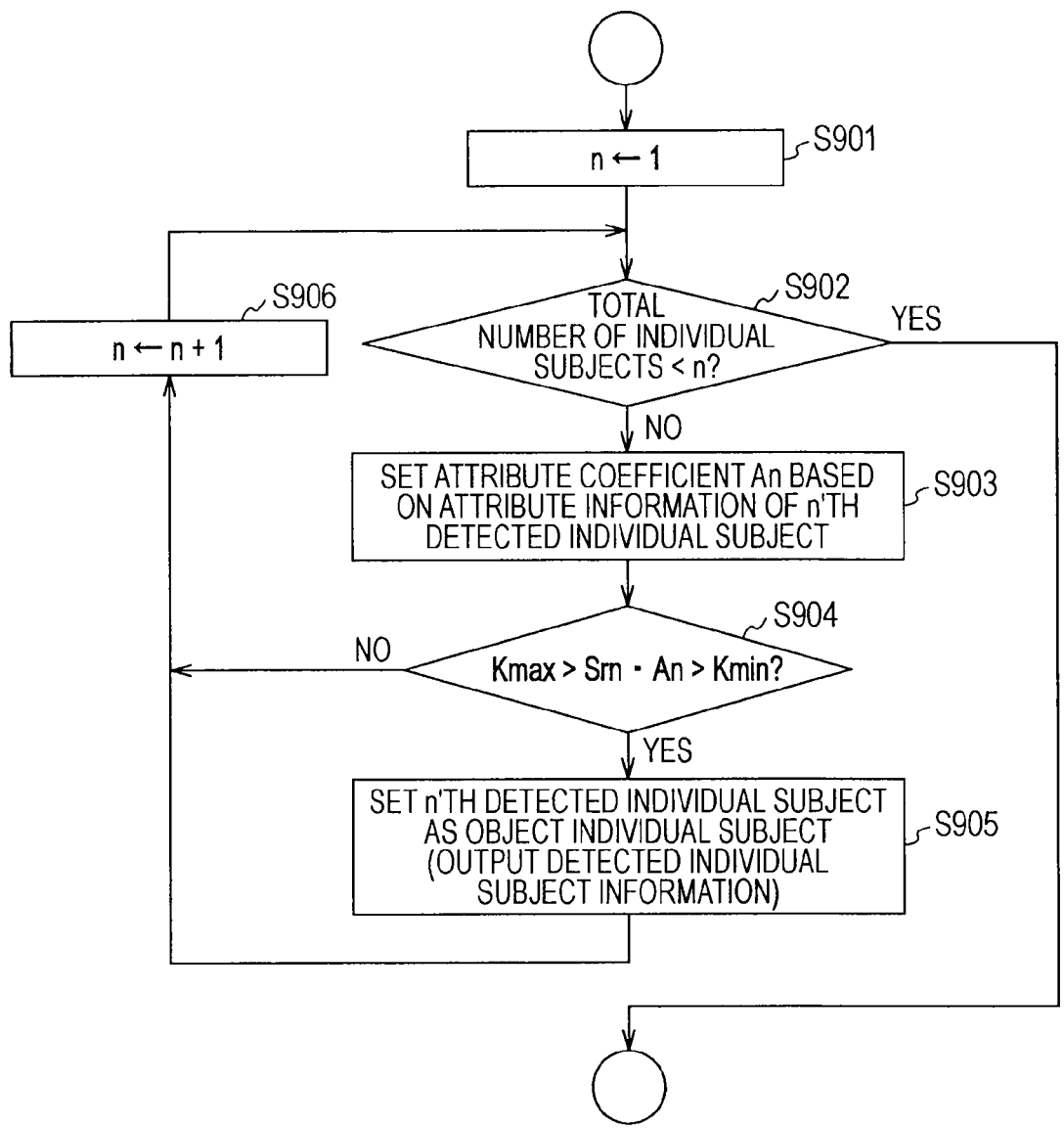
FIG. 19 is a flowchart illustrating yet another procedure example of subject distinguishing processing in FIG. 16.

Thereupon, the composition determination processing unit 203 in the composition determination block 200 serving as the third embodiment shown in FIGS. 14 and 15 executes the processing shown in the flowchart in FIG. 19, for example. In this drawing, steps S901, S902, S905, and S906 are the same as steps S701, S702, S705, and S706 in FIG. 17, for example.

In the event that a negative determination result is obtained in step S902 in this case, the procedure of step S903 is executed.

In step S903, the adult/child attribute information in the detected individual subject information corresponding to the n'th detected individual subject is referenced, to recognize whether an adult or child, and an attribute coefficient An is set based on the recognition result.

Note that the attribute coefficient An has different values set in accordance with whether an adult or child, beforehand. A greater values is set for the attribute coefficient An for a child as compared with the attribute coefficient An for an adult.

In the following step S904, the actual size Srn obtained in step S606 in FIG. 16 and the attribute coefficient An obtained in step S903 are used to determine whether or not the condition (conditional expression)

$$K\max > Srn \cdot An > K\min$$

holds, and in the event of holding the n'th detected individual subject is set as a relevant subject (object individual subject) in step S905, but in the event that a negative determination result is obtained the procedure of step S905 is skipped and the flow advances to step S906.

Now, as a most simple example, let us say that attribute coefficient An=1 corresponding to an adult, and attribute coefficient An=1.5 corresponding to a child. This assumes the grounds that on average, multiplying the upward (vertical) and sideways (horizontal) sizes of the detection frame of the face of a child by 1.5 each yields that equivalent to the size of a detection frame of the face of an adult.

In this case, the conditional expression of Kmax>Srn·An>Kmin becomes Kmax>Srn>Kmin for adults, and Kmax>1.5·Srn>Kmin for children. That is to say, the same upper threshold Kmax and lower threshold Kmin can be used by normalizing the term Srn·An in the configuration expression used in step S904 in this case by taking the actual size of the face of children and converting in to the actual size of the face of adults. Accordingly, the conditional expression (general expression) used in step S904 may be written as Kmax/An>Srn>Kmin/An.

As can be understood from the above description, the conditional expression in step S904 is the same as in FIG. 17 in the case of corresponding to adults, so description thereof will be omitted, and a case of corresponding to children will be described.

With the conditional expression being Kmax>1.5·Srn>Kmin corresponding to the n'th detected individual subject being a child, first, in the event that 1.5·Srn≥Kmax is obtained and a negative determination result is obtained, the actual size of the detected individual subject which is a child is larger than a normally-expected size. This can be conceived of being a case wherein a facial photograph or poster or the like which has been enlarged considerably has been detected as an individual subject, for example.

Also, in the event that 1.5·Srn≤Kmin is obtained and a negative determination result is obtained, the actual size of the detected individual subject which is a child is smaller than a normally-expected size. This can also be conceived of being a case wherein a very small facial photograph of a child has been detected as an individual subject, as with the case of an adult.

Thus, in step S904, even in a situation wherein children and adults of different sizes are detected as individual subjects coexisting, subject distinguishing processing is appropriately performed based on actual size corresponding thereto.

Figure 23:
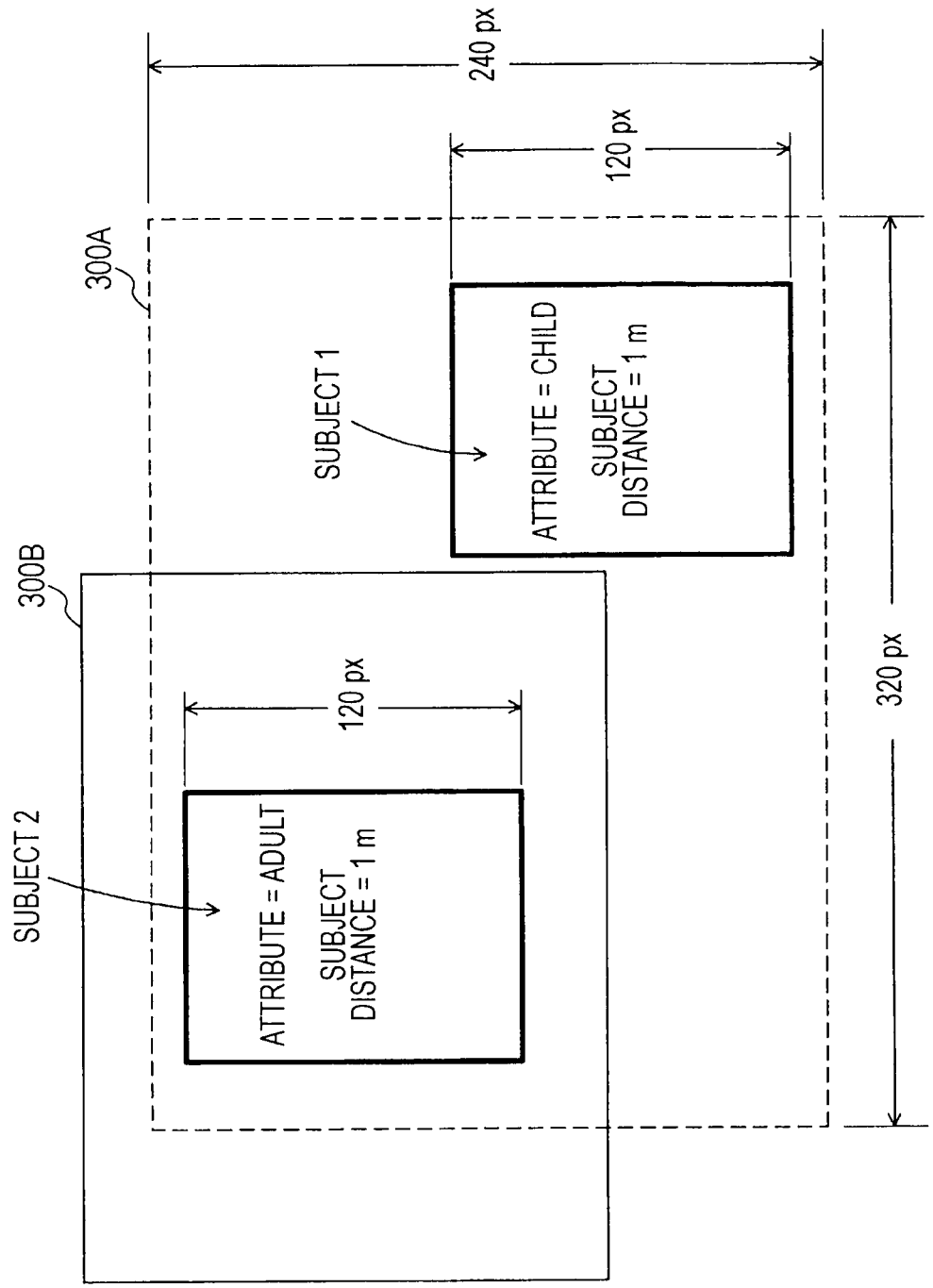
FIG. 23 is a diagram schematically illustrating a case of performing subject selecting processing reflecting results of adult/child determination in the third embodiment.

FIG. 23 illustrates a schematic example of subject distinguishing with the results of adult/child determination taken into consideration, and a corresponding composition determination, as the third embodiment. Note that in this description, the specific values of the upper threshold Kmax and lower threshold Kmin given above in FIG. 22 are used in this description. That is to say, upper threshold Kmax=160 and lower threshold Kmin=40 have been set. Also, the attribute coefficient An is set to 1 for adults and 1.5 for children, the same way as above. In this drawing, first, the two subjects of subjects 1 and 2 are detected in the detection image frame 300A. The detection image frame 300A in this case has horizontal/vertical sizes of 320 px and 240 px, respectively.

Let us say that the subject 1 is shown to be a child from the adult/child attribute information of the detected individual subject information. On the other hand, the subject 2 is shown to be an adult from the adult/child attribute information of the detected individual subject information.

Also, let us say that the subject distance detected for the subjects 1 and 2 is 1 m for both. Also, let us say that the in-image size (number of vertical pixels) is detected as 120 px for both the subjects 1 and 2.

In this case, both the subjects 1 and 2 are at the same subject distance, but are an adult and child, so the in-image size thereof should really be different in line with the actual size being different (both are real people) However, the detected in-image sizes are both 120 px, and are the same in-image size. Now, the size of 120 px which is ½ of the image frame vertical size of 240 px is obtained when imaging a general real measurement subject in the case of a real adult, for example. This means that the subject 1 which is a child, is extraordinarily large for a real person. Here we will say that this is due to the subject 1 being a photograph or the like which has been enlarged considerably, for example. Such a photograph subject should be excluded from being a relevant subject.

In such a case, first, at the time of determining the subject 1 in step S904, $$Sr1 \cdot An = D1 \cdot Fy1 \cdot An = 1 \times 120 \times 1.5 = 180$$

holds. This means that the term of 1.5·Srn has a value of 180, which is larger than the upper threshold value Kmax=160, and a negative determination result is obtained in step S904. That is to say, the subject 1 which is judged to be a photograph of a child or the like for example, is not set as a relevant subject (object individual subject) but is excluded.

Conversely, next, at the time of determining the subject 2 in step S904, $$Sr2 \cdot An = D2 \cdot Fy2 \cdot An = 1 \times 120 \times 1 = 120$$

holds, and Kmax>Srn·An>Kmin holds, so a positive determination result is obtained. Accordingly, thus adult subject 1 is set as a relevant subject (object individual subject) and used for composition determination processing.

The composition determination processing results at this time are shown by the positional relation between the determined composition image frame 300B and the subjects 1 and 2 in FIG. 23. As shown in the drawing, in the determined composition image frame 300B, the subject 2 which is an adult is positioned so as to be situated approximately at the center, due to being a suitable in-image size. On the other hand, the subject 1 which is a child is out of the determined composition image frame 300B due to having been excluded from the composition determination.

In this case as well, the zoom power has been set high to increase the in-image size of the subject 2, and accordingly, the determined composition image frame 300B in the drawing is shown as being relatively smaller than the detection image frame 300A.

Note that the sizes of the actual detection image frame 300A and the determined composition image frame 300B are both the same at 320 px×240 px. Also, the size (number of vertical pixels) of the subject 2 in the determined composition image frame 300B is a predetermined value greater than 120 px in accordance with the zoom power.

Also, while description by way of illustrating in flowcharts or the like will be omitted, subject distinguishing using the attribute coefficient An can also be applied to the subject distinguishing taking zoom power into consideration, which is shown in FIG. 18. In this case, a configuration may be made wherein the attribute coefficient An is set in accordance with adult/child determination results prior to the processing of step S803 in FIG. 18 for example, upon which determination is made in step S803 regarding whether or not Kmax>Srn·An/Z>Kmin (where Z is zoom power) holds.

Note that subject distinguishing processing taking into consideration adult/child determination results can be also applied to the second embodiment which uses only in-image sizes as distinguishing parameters.

That is to say, in this case as well, adult/child attribute determination is performed for each detected individual subject at the time of subject detection processing with the subject detection processing unit 201, and adult/child attribute information is included in each detected individual subject information. Also, the attribute coefficient An is obtained in accordance with adult/child determination results prior to the processing of step S403 in FIG. 10, for example. In step S403, determination is made regarding whether or not Sn>K1·An^2 (where ^ indicates an exponential) holds with regard to the size Sn represented in terms of area. Note that in the event that Fyn which is the number of pixels vertically (or horizontally) is to be used instead of size Sn according to area, determination is made regarding whether or not Fyn>K1·An holds. The case of step S503 in FIG. 11 also follows this.

While description has been made in the above example that determination is made from the two options of adult/child to simplify and facilitate understanding of the description, but currently, further options can be determines such as adults, children, and babies, for example. Accordingly, with the present embodiment, an arrangement may be made wherein determination is made from the two options of adults, children, and babies, for example, and three different attribute coefficients An are set in accordance with the determination results to execute subject distinguishing processing.

Also, in the above example, only people are taken as objects, but an arrangement may be made wherein, subjects are detected at the state of subject detection processing for example not only differentiating people but also animals such as dogs, cats, and so on, with distinguishing processing of relevant subjects being performed for each of people and animals using attribute coefficients An set for the people and animal types and so on in the subject detection processing. Accordingly, it can be said that the attributes of subjects determined in accordance with the attribute coefficient An is related to difference in size in actual measurement regarding the existence of the subjects.

With the configuration of the composition determination block 200 according to the first example through the third example described so far, that is to say, with the basic composition determination configuration according to the embodiment, relevant subject distinguishing is performed using one of subject distance, in-image size, and actual size, of detected individual subjects. Note that the subject distance, in-image size, and actual size, will also be collectively referred to as "distinguishing parameters".

Thus, distinguishing subjects based on the subject distance, in-image size, and actual size, which are distinguishing parameters, as described above, excludes subjects which are extremely near or far in subject distance, having in-image size exceeding a normal range, or great or small in actual size, for example. Accordingly, it can be said that subject distinguishing performed using distinguishing parameters is determining whether or not the values obtained as distinguishing parameters are within a value (range value) set as appropriate for relevant subjects.

With the above subject distinguishing processing, only subjects appropriate and suitable as relevant subjects are accurately distinguished, and consequently, a composition determination device for example, which excels over that of the related art in capability and ease of use, can be provided.

The configuration for composition determination according to the present embodiment described so far can be applied to a wide variety of devices, systems, and so forth. Accordingly, several devices examples and system configuration examples of application of the composition determination configuration according to the present embodiment will be described next.

First, description will be made regarding application of the composition determination according to the present embodiment to an imaging system made up of a digital still camera, and a platform to which the digital still camera is mounted. The imaging system corresponding to the preset embodiment enables still image imaging and recording to be performed in accordance with a composition determined by composition determination.

Figure 24:
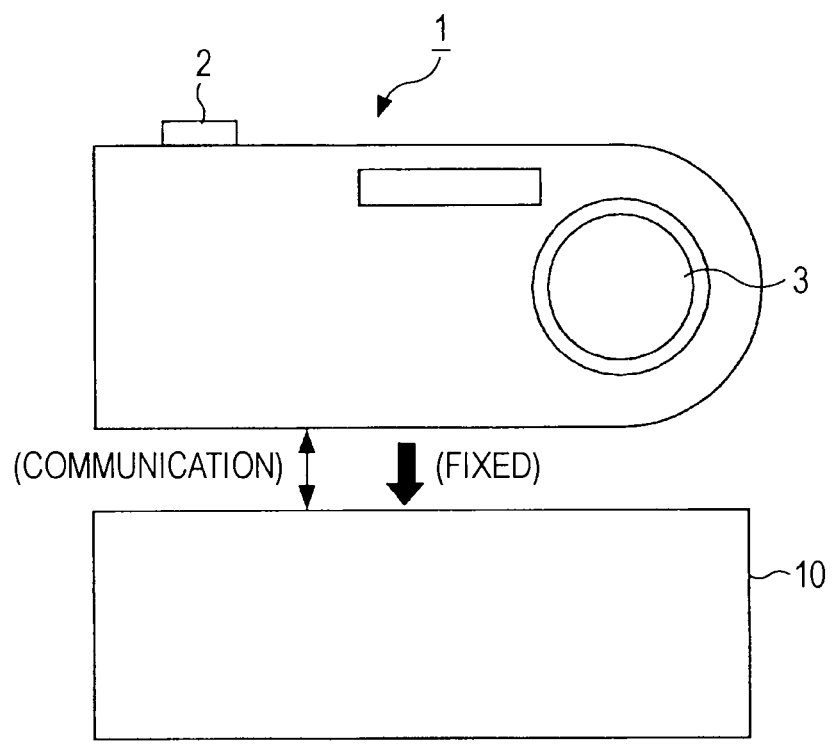
FIG. 24 is a diagram illustrating a digital still camera and a platform making up an imaging system according to an embodiment, to which the composition determination block according to an embodiment has been applied.

FIG. 24 illustrates an example of the external configuration of an imaging system according to the present embodiment, as viewed from the front. As shown in this drawing, the imaging system according to the present embodiment is configured of a digital still camera 1 and a platform 10.

The digital still camera 1 generates still image data based on imaging light obtained by performing imaging with a lens unit 3 provided to a main unit front side panel, and can store this in an internally-mounted storage medium. That is to say, the digital still camera 1 has a function that images taken as photographs are stored and saved in the storage medium as still image data. In the event of performing such photography imaging manually, the user presses a shutter (release) button provided to the upper face of the main unit.

The platform 10 can mount the digital still camera 1 such that the digital still camera 1 is fixed to the platform 10. That is to say, the digital still camera 1 and platform 10 both have mechanism portions for enabling mutual attachment. The platform 10 has a pan/tilt mechanism for moving the mounted digital still camera 1 in the panning direction (horizontal direction) and tilting direction.

Figure 25A:
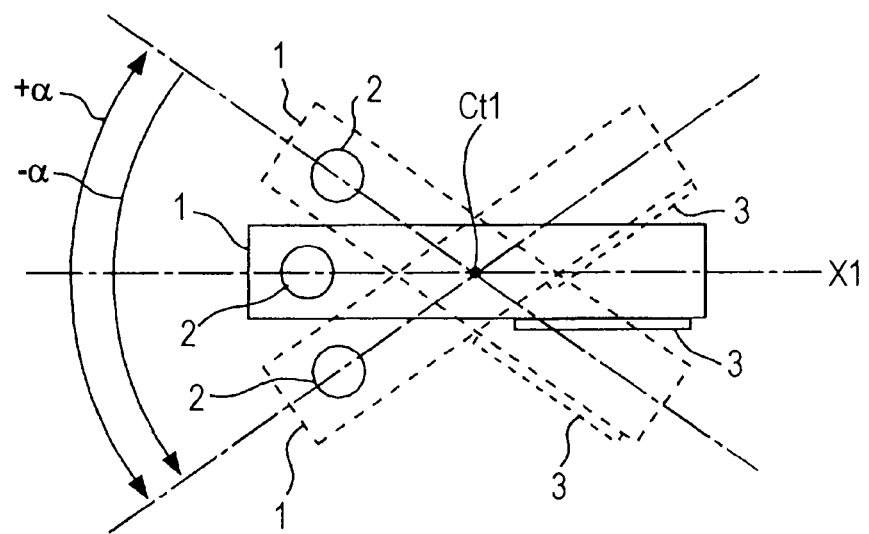
FIGS. 25A and 25B are diagrams schematically illustrating an example of movement of the digital still camera mounted to the platform in the pan direction and tilt direction, as operations of the imaging system according to an embodiment.
Figure 25B:
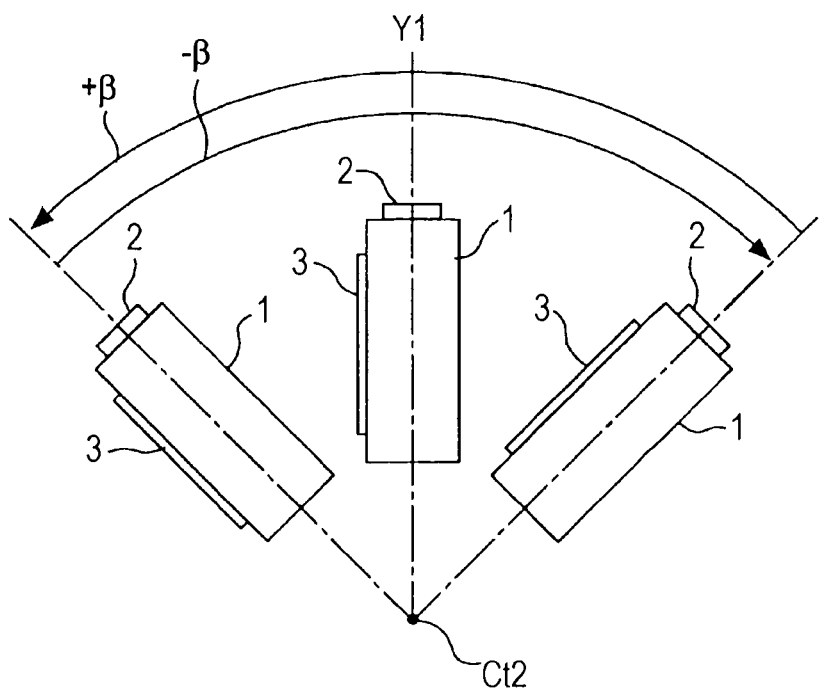

The pan direction and tilt direction motions of the digital still camera 1 enabled by the pan/tilt mechanism of the platform 10 are as shown in FIGS. 25A and 25B, for example. FIGS. 25A and 25B are views of the digital still camera 1 mounted to the platform 10, from the planar and side directions.

First, with regard to the pan direction, with a positional state wherein the sideways direction of the digital still camera 1 and the line X1 in FIG. 25A are the same direction as a reference, turning along the rotational direction +α with a rotational axis Ct 1 as the center of rotation provides panning motion in the right direction. Also, turning along the rotational direction −α provides panning motion in the left direction.

Next, with regard to the tilt direction, with a positional state wherein the vertical direction of the digital still camera 1 and the line Y1 are the same direction as a reference, turning along the rotational direction +β with a rotational axis Ct 2 as the center of rotation provides panning motion in the downward direction. Also, turning along the rotational direction −β provides panning motion in the upward direction.

While the maximum turning angles for the ±α direction and the ±β direction in FIGS. 25A and 25B are not mentioned in particular, it can be said that a maximum turning angle as great as possible is desirable if increasing the opportunity for capturing subjects is to be taken into consideration.

FIG. 26 internally illustrates the imaging system according to the present embodiment, as block configurations corresponding to each functional operation.

In FIGS. 6A through 6D, the digital still camera 1 includes an imaging block 61, a composition determination block 62, a pan/tilt/zoom control block 63, and a communication control processing block 64.

The imaging block 61 is a portion for outputting an image obtained by imaging as image signal data (imaged image data), and includes an optical system for imaging, and imaging device (image sensor), a signal processing circuit for generating imaged image data from signals output from the imaging device, and so forth.

The composition determination block 62 acquires and inputs the imaged image data output from the imaging block 61, and executing processing for composition determination based on the imaged image data. Any of the composition determination blocks 200 shown earlier in FIGS. 1, 2, 7, 8, 14, and 15, as the first through third embodiments, can be applied for this composition determination block 62. That is to say, the composition determination block 62 can execute composition determination regarding just relevant subjects as the object, from subjects existing in an image of imaged image data.

The pan/tilt/zoom control block 63 executes pan/tilt/zoom control (composition control) for obtaining an imaging view angle to obtain an imaged image composition indicated by the information of composition determination results input from the composition determination block 62.

That is to say, the amount of movement is obtained for the pan/tilt mechanism of the platform 10 over which the digital still camera 1 has to move such that the imaging direction agrees with the composition indicated by the determination results, and pan/tilt/zoom control signals are generated for instructing the movement in accordance with the obtained amount of movement.

Also, a zoom position is obtained for obtaining a field angle to obtain the imaged image composition indicated by the determination results, and a zoom mechanism of the imaging block 61 is controlled so as to achieve this zoom position.

The communication control block 64 is a portion for executing communication with a communication control block 71 provided to the platform 10 side in accordance with a predetermined communication protocol. The pan/tilt control signals generated by the pan/tilt/zoom control block 63 are transmitted to the communication control block 71 of the platform 10 by communication performed by the communication control block 64. The platform 10 has this communication control block 71 and a pan/tilt control processing block 72, as shown in the drawing, for example. The communication control block 71 is a portion for communicating with the communication control block 64 of the digital still camera 1 side, and in the event of receiving the above pan/tilt control signals, outputs the pan/tilt control signals to the pan/tilt control processing block 72.

The pan/tilt control processing block 72 corresponds to a mechanism for executing processing relating to pan/tilt control, of the control processing executed by a microcomputer or the like at the platform 10 side (not shown). The pan/tilt control processing block 72 controls a pan driving mechanism unit and tilt driving mechanism unit, which are not shown here, in accordance with the input pan/tilt control signals. Accordingly, panning and titling for obtaining a horizontal view angle and vertical view angle in accordance with the determined composition is performed.

Also, in the event that no subject is detected by the composition determination block 62, the pan/tilt/zoom control block 63 can perform panning/tilting/zooming control for searching for subjects, in accordance with commands, for example.

With the imaging system made up of the digital still camera 1 and platform 10 of the configuration shown in FIG. 26, an arrangement may be made where, handling a person as a subject of composition determination (hereinafter referred to simply as "subject"), a subject is searched, and in the event that existence of a subject is detected, the pan/tilt mechanism of the platform 10 is activated so as to obtain (frame) a composition optimal for an image with the subject being included therein (optimal composition). At the timing that the optimal composition is obtained, the imaged image data at that time can be recorded (imaging recording) in the storage medium.

Figure 27:
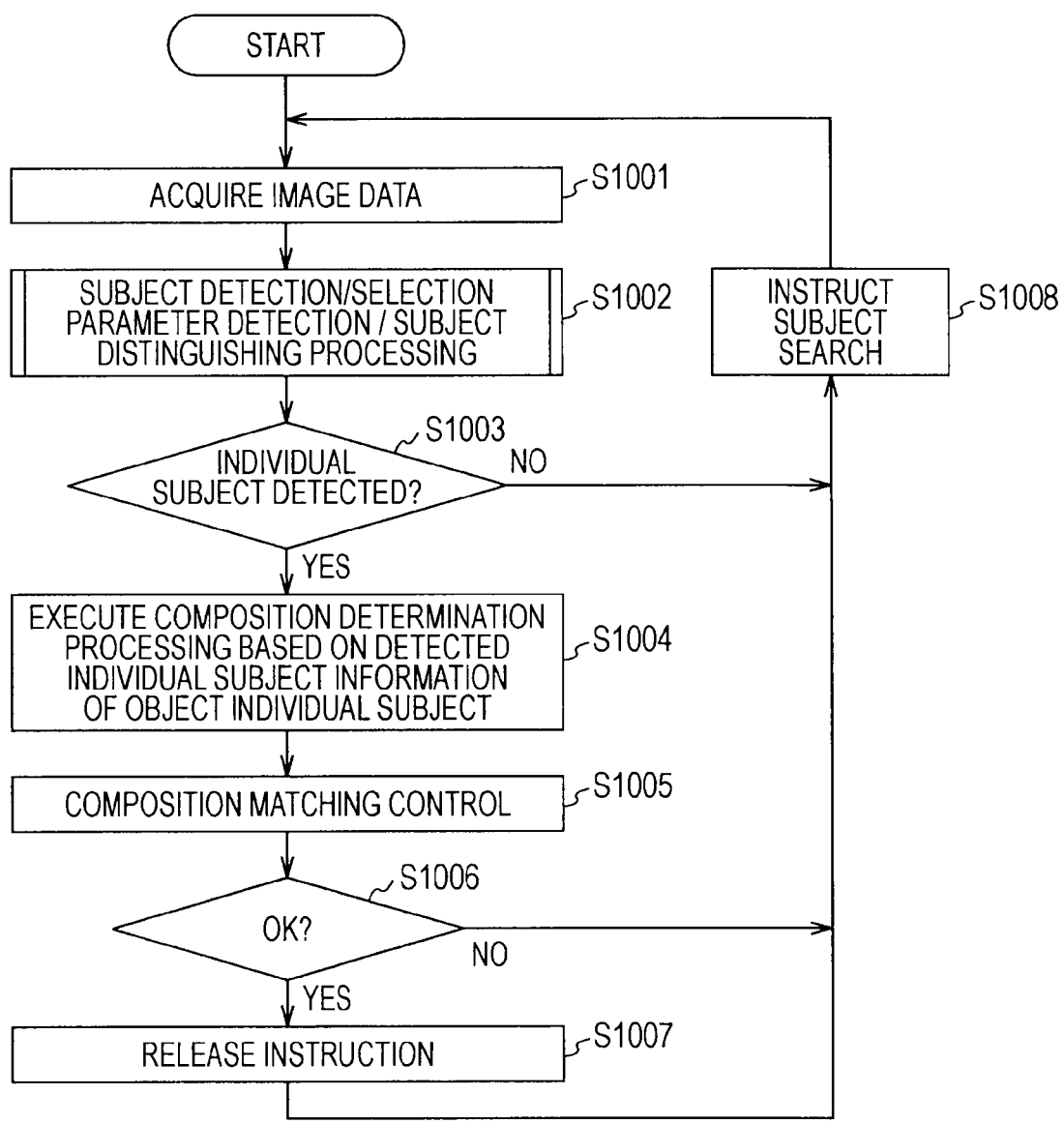
FIG. 27 is a flowchart illustrating a processing example of imaging recording executed by the imaging system in FIGS. 24 through 26.

FIG. 27 is a flowchart illustrating a procedure example for imaging recording with the imaging system shown in FIG. 26 above.

With this drawing, first, the communication control processing block 64 acquires imaged image data in step S1001.

In the next step S1002, the composition determination block 62 executes subject detection processing detection of distinguishing parameters, and subject distinguishing processing. These processes are executed as appropriate by the subject detection processing unit 201, subject distance detecting unit 202A, subject size detecting unit 202B, actual size detecting unit 205, subject distinguishing processing unit 204, composition determination processing unit 203, and so forth, as described in the above first through third embodiments.

In step S1003, the composition determination processing unit 203 in the composition determination block 62 determines whether or not there is an object individual subject (relevant subject), as the results of subject distinguishing processing in step S1002.

The composition determination processing unit 203 reads in detected individual subject information of distinguished detected individual subjects, output in accordance with the subject distinguishing processing in step S1002, and if the result thereof is that there is no valid detected individual subject information existing, this means that there is no object individual subject (real subject) remaining. On the other hand, if there is valid detected individual subject information existing, this means that there is an object individual subject.

Now, in the event that a negative determination result is obtained in step S1003, the flow returns to step S1001 due to the necessity to perform subject detection again, with the composition determination block 62 in this case instructing pan/tilt/zoom control in step S1008 and then returning to step S1001. That is to say, the procedures of steps S1001 through S1003 in this case execute subject detection based on the imaged image data obtained at the time of subject search.

Conversely, in the event that a positive determination result is obtained that at least one individual subject has been detected in step S1003, the flow proceeds to the procedures of step S1004 on.

In step S1004, composition determination processing is executed based on the detected individual subject information of the object individual subjects which the composition determination processing unit 203 has input from the subject distinguishing processing unit 211, and information of the determination result thereof is transmitted to the pan/tilt/zoom control block 63.

Step S1005 is processing executed by the pan/tilt/zoom control block 63. That is to say, the pan/tilt/zoom control block 63 executes control for enabling an imaging view field in accordance with the composition determination result to be obtained, i.e., pan/tilt/zoom control for composition matching.

After the composition matching control in step S1005 is started, determination is made in step S1006 regarding whether the composition actually obtained as the image of the imaged image data at that time can be considered to be in a state which is the same as the composition determined in step S1007 (e.g., whether at a certain level of similarity or higher) or not (whether the composition is OK or not). Note that this determination can be realized by detecting change in position information of the detected individual subject information of object individual subjects obtained following outputting the composition determination result at the composition determination processing unit 203, for example.

Now, in the event that due to one reason or another, the composition is not OK despite have performed sufficient pan/tilt/zoom moving and driving, a negative determination result is output in step S1006. In this case, the flow returns to step S1001 via step S1008, thereby resuming subject searching.

Conversely, in the event that a determination result is obtained in step S1006 that the composition is OK, a release operation, i.e., execution of an operation for recording the imaged image data obtained at that time as a still image, is instructed in step S1007. This release instruction can also be understood as being executed by the composition determination processing unit 203 here, for example.

Note that with the configuration shown in FIG. 26 for example, instruction of imaging recording (instruction of a release operation) can be performed from the pan/tilt/zoom control block 63 as to an appropriate portion such as the imaging block 61 for example, at a timing at which the pan/tilt/zoom control for composition is completed. Alternatively, a release instruction may be made with the composition determination block 62, at a timing where determination is made that the similarity between the actual composition obtained in the image of the imaged image data and the determined optional composition is a certain level or higher.

In this way, with the imaging system in FIG. 26, at the time of performing photography with a digital still camera, first, an optimal composition is decided (determined) regarding a searched subject, and photography and recording is performed, automatically. Accordingly, reasonably high-quality photograph images can be obtained even if the user does not determine a composition and shoot pictures. Also, with such a system, no one person has to hold the camera and shoot, so all who are at that place can be subjects. Also, photographs with all subjects in the picture can be obtained even without the subjects all trying to be in the view angle range of the camera. That is to say, there will be greater opportunities to shoot the people at the place where photography is being performed in a more natural state, so many photographs of a nature which were not readily obtained heretofore can be obtained.

The system as described above performs composition determination according to the above-described first and second embodiments, and accordingly can perform imaging recording of images having appropriate compositions, with only relevant subjects being taken as objects, excluding other objects regarding which taking as subjects is not desirable, which exist around the subjects regarding which taking as subjects is desired, such as face photographs, for example.

Figure 28:
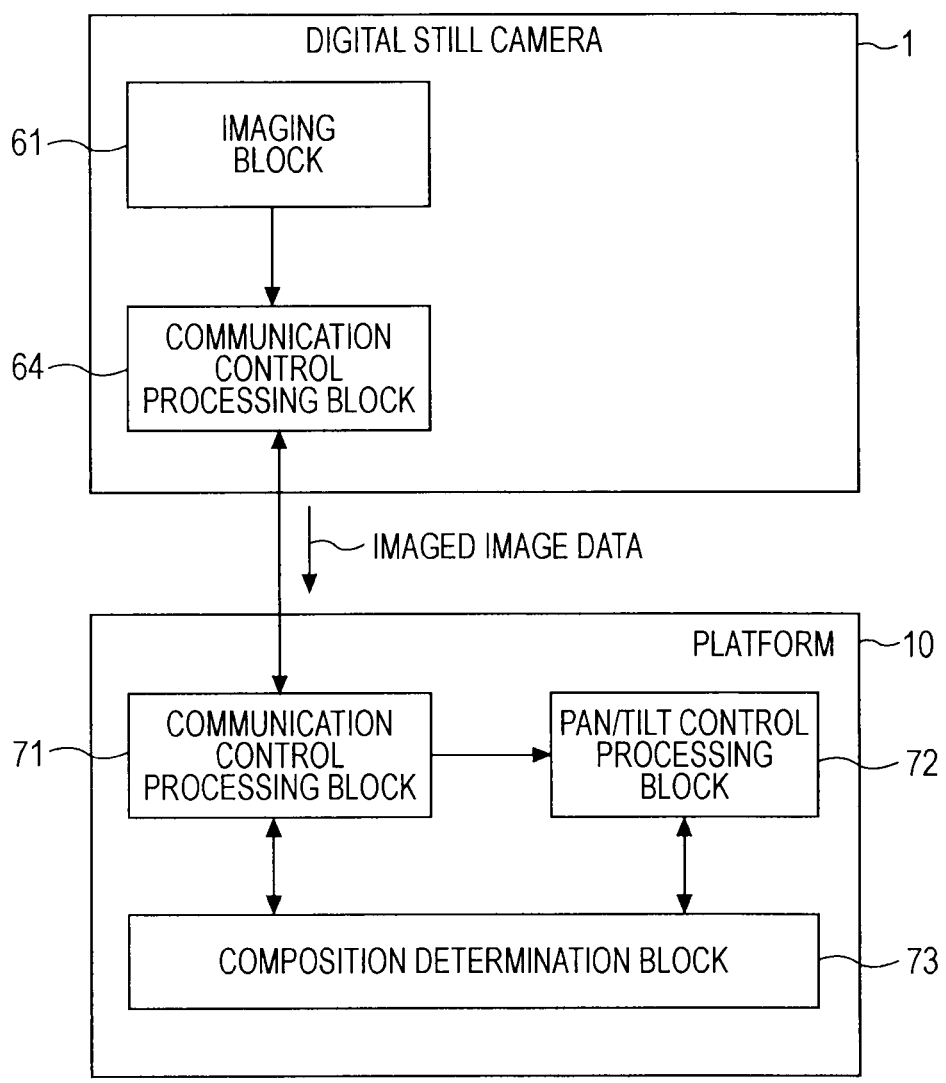
FIG. 28 is a block diagram illustrating another internal system configuration example regarding the imaging system according to an embodiment.

FIG. 28 illustrates a modification of the imaging system according to the present embodiment shown in FIG. 26.

In this drawing, at the digital still camera 1, imaged image data obtained by the imaging block 61 is transmitted from the communication control processing block 64 to the communication processing control block 71 of the platform 10 side.

In this drawing, the platform 10 is shown including the communication control block 71, pan/tilt control processing block 72, and a composition determination block 73.

The imaged image data received by the communication control processing block 71 is output to the composition determination block 73. Any of the composition determination blocks 200 shown earlier in FIG. 1, FIG. 2, FIG. 7, FIG. 8, FIG. 14, FIG. 15, as the first through third embodiments, can be applied for this composition determination block 73, so as to be able to execute composition determination processing with only relevant subjects based on the input imaged image data. In this case, based on the composition determination results, the amount of movement is obtained for the pan mechanism unit and tilt mechanism unit such that the shooting direction matches the determined composition, as with the case of the pan/tilt/zoom control block 63 in FIG. 26, for example, and pan/tilt control signals for instructing the movement in accordance with the obtained amount of movement are generated and output to the pan/tilt control processing block 72. Accordingly, panning and tilting is performed such that the composition determined at the composition determination block 73 can be obtained.

Thus, the imaging system shown in FIG. 28 is configured such that imaged image data is transmitted from the digital still camera 1 to the platform 10 side where the acquired imaged image data is used to perform composition determination, and corresponding pan/tilt control (composition control) is also executed by the platform 10. Also, with the configuration shown in FIG. 28, no zoom (field angle) control is performed in control of the imaging view angle (composition control), indicating that with the present embodiment, control of each of pan/tilt/zoom is not indispensable for composition control. For example, depending on conditions or situations, composition control in accordance with the determined composition may be realized by pan control alone, tilt control alone, or zoom control alone.

Figure 29:
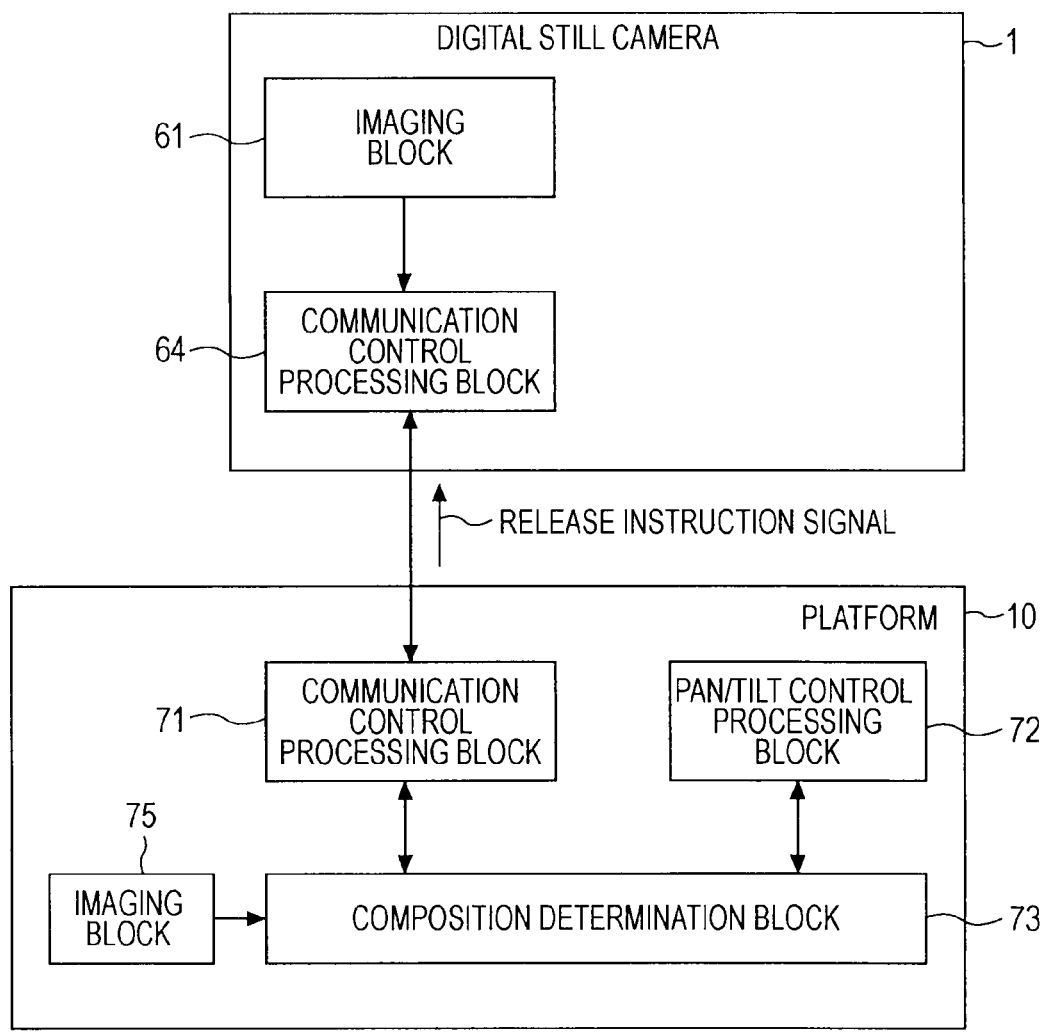
FIG. 29 is a block diagram illustrating another internal system configuration example regarding the imaging system according to an embodiment.

FIG. 29 illustrates a configuration example of another modification of the imaging system according to the present embodiment. Note that components in this drawing which are the same as those in FIG. 28 are denoted with the same reference numerals, and description thereof will be omitted.

This system has an imaging block 75 at the platform 10 side. The imaging block 75 is configured of an optical system and imaging device (image sensor) for imaging, arranged to acquire signals (image signals) based on imaging light, and a signal processing unit for generating imaged image data from the imaged signals, in the same way as the imaging block shown in FIGS. 26 and 28, for example.

The imaged image data generated by the imaging block 75 is output to the composition determination block 73. Note that a preferable arrangement is to have the direction of the imaging block 75 inputting imaging light (imaging direction) matching the imaging direction of the digital still camera 1 mounted on the platform 10, as much as possible.

The composition determination block 73 and pan/tilt control processing block 72 in this case execute composition determination in the same way as with FIG. 28, and driving control of the pan/tilt mechanism in accordance with the composition determination results.

It should be noted that the composition determination block 73 in this case transmits a release instruction signal to the digital still camera 1 via the communication control processing block 71 in accordance with a timing at which the release action is to be executed by the digital still camera 1 (the timing at which the determined composition has been obtained with regard to the image of the imaged image data from the imaging block 75). The digital still camera 1 executes a release operation in response to reception of the release instruction signal, and executes imaging recording of image data based on the imaged image data obtained by the imaging block 75 at that time. With this other embodiment, all control and processing relating to composition determination and composition control, other than that relating to the release operation itself, can be completed at the platform 10 side.

Note that with the above description, pan control and tilt control is performed by controlling movement of the pan/tilt mechanism of the platform 10, but another configuration can be conceived, wherein, instead of the platform 10, imaging light reflected off of a reflecting mirror is input to an optical system 21 of the digital still camera 1 for example, and the reflecting mirror is moved such that panning/tilting results are obtained regarding the image acquired based on the imaging light.

Also, results equivalent to performing panning/tilting can be obtained by shifting the pixel region for acquiring valid imaging signals as an image from the imaging device (image sensor 22) of the digital still camera 1 in the horizontal direction and vertical direction. In this case, a device for panning/tilting other than the digital still camera 1, such as the platform 10 or an equivalent device, does not have to be prepared, and composition control according to the present embodiment can be completed within the digital still camera 1 alone.

Also, with regard to field angle control (zoom control) as well, an arrangement may be made wherein this can be realized by executing image processing of cropping out a partial image region of the imaged image data, instead of driving a zoom lens.

Further, the digital still camera 1 may be provided with a mechanism capable of changing the optical axis of the lens of the optical system of the digital still camera 1 in the horizontal and vertical directions, such that panning and tilting can be performed by controlling the movement of this mechanism.

Next, examples of applying a configuration for composition determination according to the present embodiment (first through third embodiments) to other than the above-described imaging system will be described.

Figure 30:
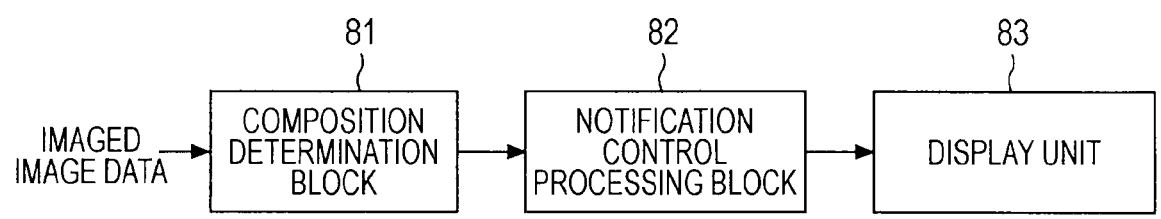
FIG. 30 is a block diagram illustrating an application example for a composition determination block according to an embodiment, other than the imaging system.

First, FIG. 30 illustrates an application of composition determination according to the present embodiment to a stand-alone imaging apparatus such as a digital still camera or the like, with the user being notified by display at a point in time that the image being imaged by the imaging apparatus in a photographing mode attaining a suitable composition in accordance with detection results, for example.

Shown here is a configuration which the imaging apparatus should have to this end, including a composition determination block 81, a notification control processing block 82, and a display unit 83. Any of the composition determination blocks 200 according to the first through third embodiments shown earlier in FIGS. 1, 2, 7, 8, 14, and 15, can be applied for this composition determination block 81.

For example, let us say that a user has set the imaging apparatus to the photography mode, has held the imaging apparatus in hand, and is in a state where the release operation (shutter button operation) can be performed at any time to record the imaged image. In such a state, the composition determination block 81 first acquires the imaged image data obtained at that time by imaging, executes the series of composition determination processing according to the present embodiment, and determines an optimal composition.

Furthermore, the composition determination block 81 at that time obtains the degree of matching and/or the degree of similarity between the composition of the image contents of the imaged image data being actually obtained at that time with the determined optimal composition. If the similarity, for example, reaches a certain level of higher, determination is made that the composition of the image contents of the imaged image data being actually obtained at that time has attained the optimal composition. In actual practice, an arrangement can be conceived where an algorithm is prepared so as to be determined that the optimal composition has been attained at the point that similarity of a certain level or higher is reached, such that the composition of the image contents of the imaged image data and the optimal composition can be viewed as having matched. A wide variety and range of algorithms for determining degree of matching or degree of similarity can be conceived, so specific examples thereof will not be discussed in particular here.

Information of the determination results to the effect that the image contents of the imaged image data have attained the optimal composition is output to the notification control processing block 82. The notification control processing block 82 executes display control in accordance with the input of information so as to notify the user that the image being currently imaged is an optimal configuration, by performing display control of a predetermined form on the display unit 83. Note that the notification control processing block 82 is realized by display control function of a microcomputer (CPU) and so forth included in the imaging apparatus, and a display image processing function for realizing image display as to the display unit 83 and so forth. Notification to the user to the effect that the optimal composition has been achieved may also be performed audibly, such as electronic sound, synthesized voice, or any other sort of sound.

Also, the display unit 83 corresponds to a display unit 33 of the digital still camera 1 according to the present embodiment for example, which is often provided such that the display panel is shown at a predetermined location on the imaging apparatus with an image being imaged at that time being displayed thereupon. Such an image in photography mode is also called a "through image". Accordingly, in actual practice, with the imaging apparatus, an image to the effect that the composition is optimal is displayed superimposed on the through image on the display unit 83. The user performs a release operation when this display notifying the optimal composition comes up. Accordingly, even users who are not highly knowledgeable about photography or highly skilled can easily take photographs with good composition.

Figure 31:
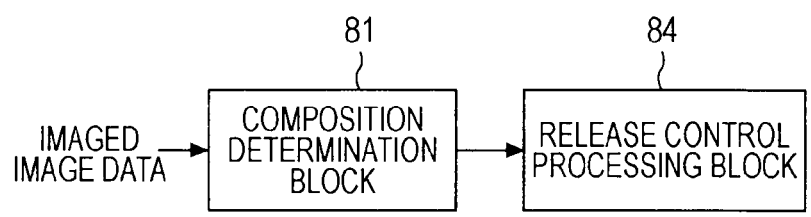
FIG. 31 is a block diagram illustrating an application example for a composition determination block according to an embodiment, other than the imaging system.

Also, FIG. 31 shows a configuration for composition determination according to the present embodiment, applied to a stand-alone imaging apparatus such as a digital still camera 1, as with the case of FIG. 30 described above.

First, with the configuration shown in this drawing, processing is executed by the composition determination block 81 for determining an optimal composition based on the input imaged image data, and determination is made regarding whether or not the image contents of imaged image data obtained at a later timing are the optimal composition.

Upon determination being made that the composition is the optimal composition, notification is made to this effect to a release control processing block 84.

The release control processing block 84 is a portion which executes control for recording the imaged image data, and is realized by control executed by a microcomputer of the imaging apparatus, for example. The release control processing block 84 which has received the above notification executes image signal processing and recording control processing such that the imaged image data obtained at that time is recorded in the recording medium, for example.

With such a configuration, an imaging apparatus can be provided wherein, when an image according to the optimal composition is imaged for example, recording thereof is performed automatically.

The configurations shown in FIGS. 30 and 31 above are applicable to digital still cameras of a configuration such as shown in FIG. 1 for example, and also cameras falling within the scope of still cameras for example, including so-called silver-salt cameras which record imaged images on silver-salt film or the like. In this case, an image sensor for splitting imaged light obtained by the optical system, a digital image signal processing unit for inputting and processing signals from the image sensor, and so forth, will be provided to the silver-salt camera for example.

Figure 32:
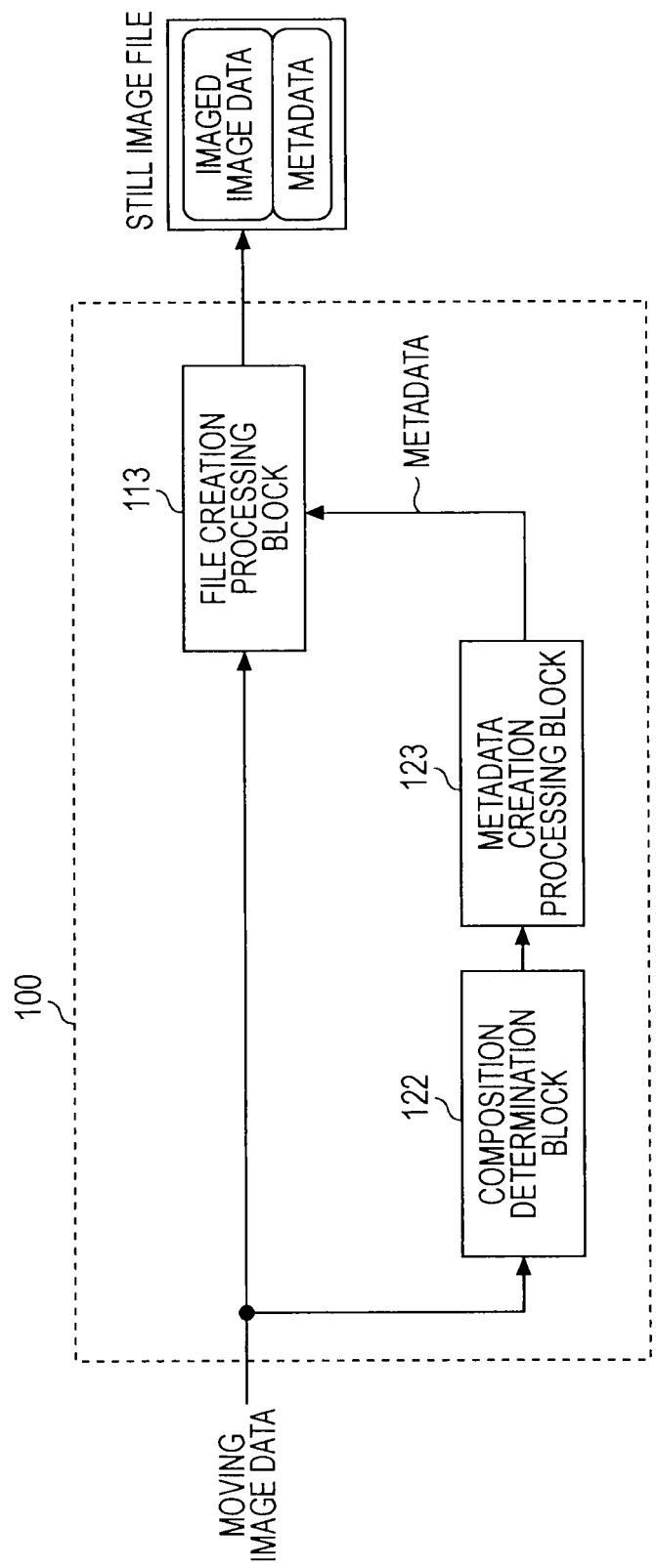
FIG. 32 is a block diagram illustrating an application example for a composition determination block according to an embodiment, other than the imaging system.

FIG. 32 is an example of a configuration wherein the configuration of the composition determination according to the present embodiment has been applied to an imaging apparatus such as a digital still camera. The imaging apparatus 100 shown in FIG. 23 has a composition determination block 101, a metadata creation processing block 102, and a file creation processing block 103. We will say that the composition determination block 101 has a configuration of the composition determination block 200 illustrated in any one of FIG. 1, FIG. 2, FIG. 7, FIG. 8, FIG. 14, FIG. 15, in the first through third embodiments described above.

Imaged image data obtained by imaging with an unshown imaging block is input to the composition determination block 101 and the file creation processing block 103 of the imaging apparatus 100. Note that the imaged image data input to the imaging apparatus 100 is imaged image data which is to be recorded in the recording medium due to a release operation or the like, and is generated based on imaging signals obtained by imaging with an unshown imaging block.

First, the composition determination block 101 performs composition determination with relevant subjects as the objects, with irrelevant subjects (still subjects) having been eliminated. Further, the composition determination processing in this case includes executing processing, performed thereupon, for determining what portion of the entire image region of the input imaged image data is the image portion where the determined optimal composition is obtained, in accordance with a predetermined vertical-horizontal ratio (image portion of optimal composition), based on the composition determination results. Information indicating the identified image portion of the optimal composition is then output to the metadata creation processing block 102.

At the metadata creation processing block 102, metadata made up of information for obtaining an optimal composition from the corresponding imaged image data (composition editing metadata) is created based on the input information, and this is output to the file creation processing block 103. The contents of the composition editing metadata are, for example, positional information which may indicate which image region portion of the corresponding imaged image data to trim, and so forth.

With the imaging apparatus 100 shown in this drawing, the imaged image data is recorded in the recording medium so as to be managed as a still image file according to a predetermined format. Accordingly, the file creation processing block 103 converts the imaged image data into the still image format (i.e., creates a still image file according to the format).

The file creation processing block 103 first performs image compression encoding corresponding to the image file format with regard to the input imaged image data, and creates a file main portion made up of the imaged image data. Also, the composition editing metadata input from the metadata creation processing block 102 is stored in a predetermined storing position, so as to create a data portion made up of a header, added information block, and so forth. The file main portion, header, added information block, and so forth, are used to create a still image file, which is then output. As shown in FIG. 23, the still image file to be recorded in the recording medium has a structure including the imaged image data and the metadata (composition editing metadata).

Figure 33:
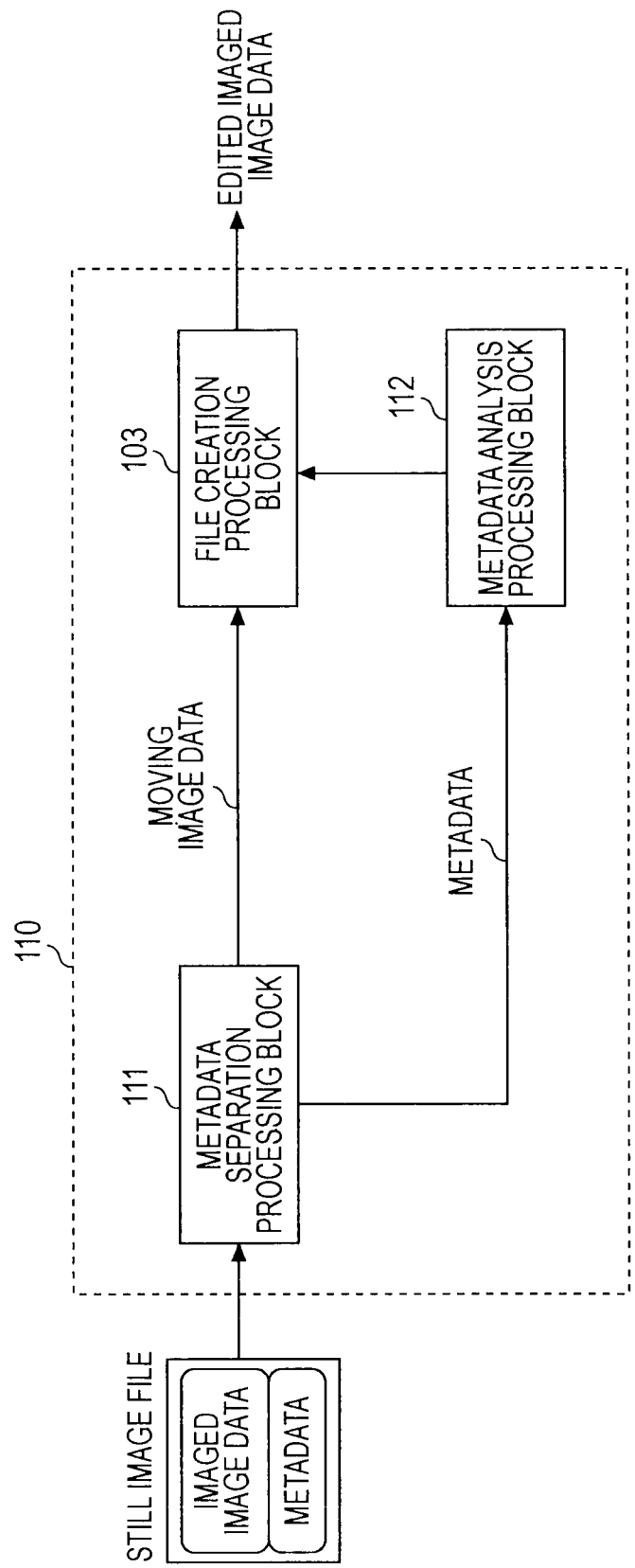
FIG. 33 is a block diagram illustrating an application example for a composition determination block according to an embodiment, other than the imaging system.

FIG. 33 illustrates a configuration example of an editing device for performing editing with regard to the still image file created by the device shown in FIG. 32. The editing device 110 shown in FIG. 33 acquires the data of the still image file, and first inputs this to a metadata separation processing block 111. The metadata separation processing block 111 separates the imaged image data which is equivalent to the file main portion, and the metadata, from the still image file. The metadata separation processing block 111 then outputs the metadata obtained by separation to a metadata analysis processing block 112, and outputs the imaged image data to a trimming processing block 113.

The metadata analysis processing block 112 is a portion which executes processing for analyzing the input metadata. Analyzing processing performed therein regarding the composition editing metadata involves at least identifying an image region regarding which trimming is to preformed on the corresponding imaged image data, from the information for obtaining an optimal composition, which is the contents of the composition editing metadata. Trimming instruction information for instructing trimming of the identified image region is then output to the trimming processing block 113.

In the same way with the trimming processing block 91 in FIG. 32 described earlier, the trimming processing block 113 executes image processing for cropping the image portion indicated by the trimming instruction information input from the metadata analysis processing block 112, from the imaged image data input from the metadata separation processing block 111 side, and outputs the cropped image portion as edited imaged image data, which is independent image data.

With a system configured of the imaging apparatus and editing device shown in FIGS. 32 and 33 above, intended still image data obtained by photography for example (imaged image data) can be saved without image processing, and editing to crop out an image which is the optimal composition can be performed using the metadata from this intended still image data. Also, deciding which image portion to crop corresponding to such an optimal composition is performed automatically, making editing very easy for the user.

Note that arrangements may be conceived wherein the functions of the editing device shown in FIG. 33 are realized by, for example, an application installed in a personal computer for editing image data, an image editing function in an application for managing image data, and so forth.

Figure 34:
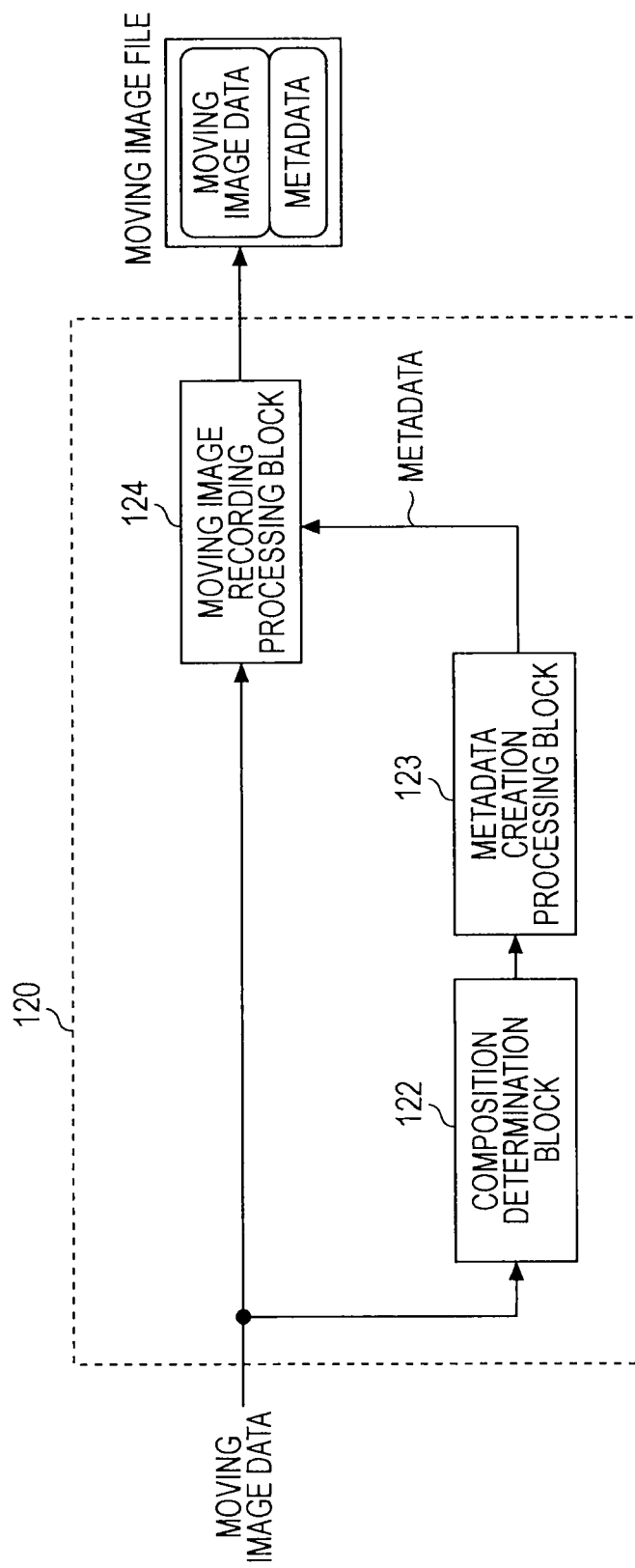
FIG. 34 is a block diagram illustrating an application example for a composition determination block according to an embodiment, other than the imaging system.

FIG. 34 illustrates an example of applying the configuration of composition determination according to the present embodiment to an imaging apparatus capable of shooting and recording moving images, such as a video camera for example. Moving image data is input to an imaging apparatus 120 shown in FIG. 34. The moving image data is generated based on imaging signals obtained by an imaging unit which the imaging apparatus 120 has, performing imaging. The moving image data is input to a composition determination block 122 and a moving image recording processing block 124 which the imaging apparatus 120 includes.

The composition determination block 122 in this case obtains an optimal composition by performing composition determination regarding only relevant subjects in the image of moving image data that is input thereto, based on a configuration of the composition determination block 200 illustrated in any one of FIG. 1, FIG. 2, FIG. 7, FIG. 8, FIG. 14, FIG. 15, above. Thereupon, the composition determination block 122 inspects by comparison the difference between the actual composition of the image of the moving image data, and the determined optimal composition. In the handling performed in a specific example of composition determination described later for example, parameters corresponding to the optimal composition, such as the percentage which the object individual subjects occupy within the image (size), distance between subjects, and so forth, are obtained by the composition determination. Accordingly, all that has to be done in actual comparison is to compare these parameters corresponding to the optimal composition with parameters currently manifested in the image of the moving image data.

In the event that the parameters both are determined to have similarity of a certain level or high as a result of the comparison, determination is made that the composition is good, and in the event that the similarity is below the certain level, determination is made that the composition is not good.

In the event that the composition determination block 122 has determined that a good composition has been obtained regarding the moving image data as described above, the composition determination block 122 outputs information to a metadata creation processing block 123 regarding where the image section regarding which determination has been made above that a good composition has been obtained (good composition image section) is (good composition image section instruction information). This "good composition image section" is, for example, information indicating such as the starting position and ending position of the good composition image section in the moving image data, and so forth.

The metadata creation processing unit 123 in this case generates metadata to be used by the later-described moving image recording processing block 124 to record moving image data as a file in the recoding medium. Upon good composition image section instruction information being input from the composition determination block 122, the metadata creation processing unit 123 generates metadata indicating that the image section indicated by the input good composition image section instruction information is a good composition, and outputs this to the moving image recording processing block 124.

The moving image recording processing block 124 executes control for recording the input moving image data in the recording medium so as to be managed as a moving image file according to a predetermined format. In the event that metadata is output from the metadata creation processing block 123, the moving image recording processing block 124 executes control such that this metadata is included in the metadata attached to the moving image file.

Accordingly, the moving image file recorded in the recording medium has contents where metadata, indicating the image section where a good composition has been obtained, is attached to the moving image data obtained by imaging.

Note that the imaging section where a good composition has been obtained, as indicated by the metadata as described above, may be an image section in the moving image having a time span of a certain degree, or may be in a still image extracted from the moving image data. Another arrangement which can be conceived is to generate moving image data or still image data of the image section where a good composition has been obtained, instead of the above metadata, and recording thus as secondary image data to be attached to the moving image file (or as a file independent from the moving image file).

Also, with the configuration where the imaging apparatus 120 has the composition determination block 122 as shown in FIG. 34, a configuration can be conceived wherein only sections of moving images determined by the composition determination block 122 to be good composition image sections are recorded as moving image files. Further, an arrangement may be conceived wherein image data corresponding to image section as determined by the composition determination block 122 to be good compositions are externally output to an external device by way of a data interface or the like.

Figure 35:
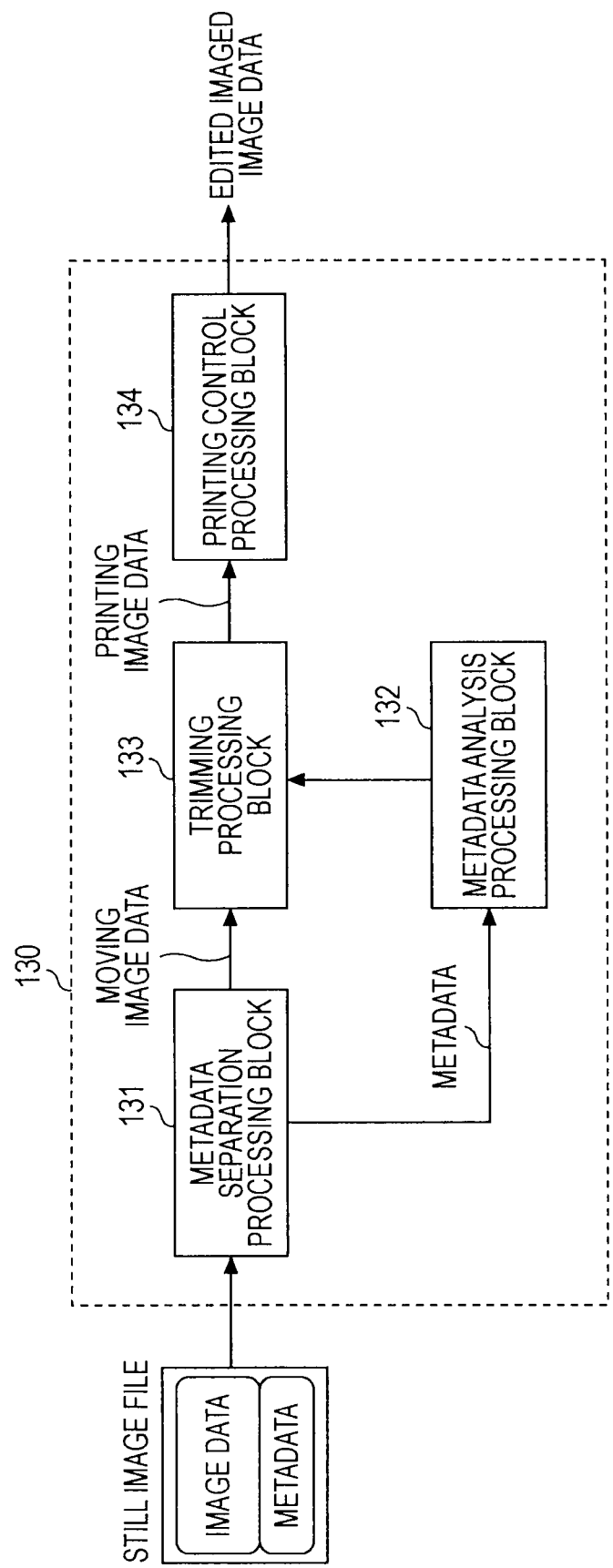
FIG. 35 is a block diagram illustrating an application example for a composition determination block according to an embodiment, other than the imaging system.

Also, a printing device 130 shown in FIG. 35 can be conceived as an example of a device corresponding to the imaging apparatus 100 shown in FIG. 32 besides the editing device shown in FIG. 33. In this case, the printing device 130 is arranged to acquire still image files as images to be printed. The still image files include still image files generated by the imaging apparatus 100 for example, and have a structure of including the actual image data which is the still image, and the metadata as shown in this drawing. Accordingly, this metadata includes the composition editing metadata of equivalent contents to the still image files shown in FIGS. 32 and 33.

Files thus input acquired are input to a metadata separation processing block 131. The metadata separation processing block 131 separates image data equivalent to the file main portion, from the metadata attached thereto, out of the still image file data, in the same way as with the metadata separation processing block 111 in FIG. 33. The separated and obtained metadata is output to a metadata analysis processing block 132, and the image data is output to a trimming processing block 133.

The metadata analysis processing block 132 executes analysis processing on the input metadata in the same way as with the metadata separation processing block 111 in FIG. 33, and outputs trimming instruction information to the trimming processing block 133.

The trimming processing block 133 performs image processing for cropping out the image portion from the image data input from the metadata separation processing block 131, indicated by the trimming instruction information input from the metadata analysis processing block 132, in the same way as with the trimming processing block in FIG. 33. Image data of a printing format generated from this cropped image portion is then to a printing control processing block 134, as printing image data. The printing control processing block 134 uses the input printing image data to execute control for causing an unshown printing mechanism to operate.

Due to such operations, with the printing device 130, an image portion where an optimal composition is obtained is automatically cropped out of the image contents of the input image data, and printed as a single image.

Next, a more specific configuration example of a device and system to which the composition determination according to the present embodiment has been applied will be described. An example will be given here regarding the imaging system made up of the digital still camera 1 and the platform 10 having the system configuration illustrated and described by way of FIGS. 24 through 26 earlier.

Figure 36:
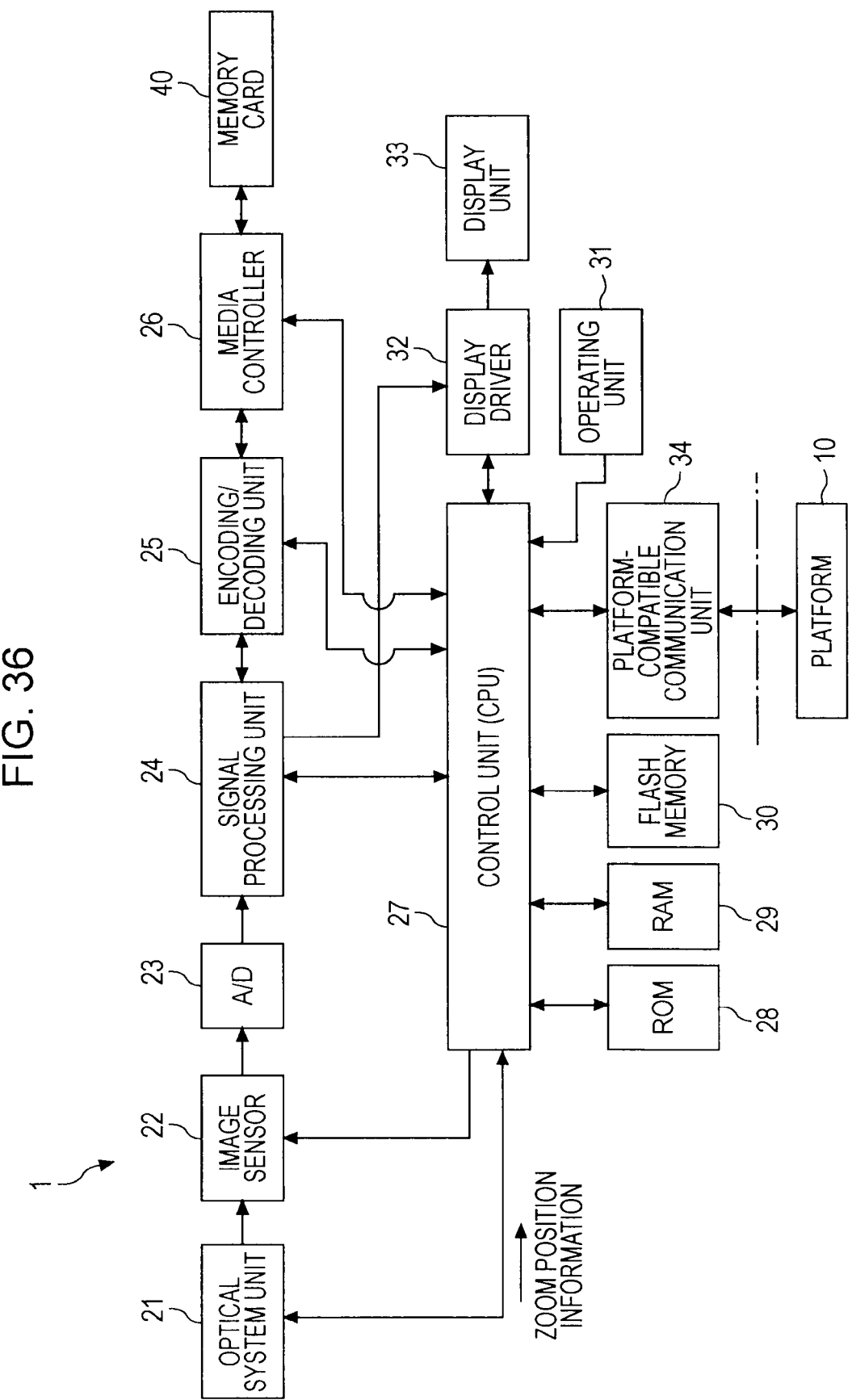
FIG. 36 is a block diagram illustrating an internal configuration example of the digital still camera making up the imaging system according to an embodiment.

First, a block illustration is shown in FIG. 36 of an actual internal configuration example regarding the digital still camera 1. In FIG. 36, an optical system 21 is made up of for example, an imaging lens group including multiple imaging lenses such as a zoom lens, focus lens, and the like, and a diaphragm and the like, and images incident light as imaging light on a photoreception face of an image sensor 22.

The optical system 21 also has driving mechanisms for driving the zoom lens, focus lens, diaphragm, and so on. The operations of the driving mechanisms, are controlled by so-called camera control executed by a control unit 27 for example, such as zoom (field angle) change control, auto focus adjustment control, automatic exposure control, and so forth.

The image sensor 22 performs so-called photoelectric conversion wherein imaging light obtained at the optical system 21 is converted into electric signals. Accordingly, the image sensor 22 is configured so as to receive imaging light from the optical system 21 at the photoreception face at a photoelectric conversion device, and sequentially output signal charges accumulated in accordance with the intensity of the received light at predetermined timings. This outputs electric signals (imaging signals) corresponding to the imaged light. Note that examples of photoelectric conversion devices (imaging devices) employed as the image sensor 22 may include, at the current state, CMOS sensor or CCD (Charge Coupled Device) or the like, though not restricted in particular. Also, in the case of using a CMOS sensor, an A/D converter equivalent to a later-described A/D converter 23 may be included in the structure as a device (part) equivalent to the image sensor 22.

Imaging signals output from the image sensor 22 are input to the A/D converter 23, and thus converted into digital signals and input to a signal processing unit 24. The signal processing unit 24 inputs the digital imaging signals output from the A/D converter 23 in increments equivalent to single still images (frame images) for example, and subjects the input image signals in increments of still image to predetermined signal processing, thereby generating imaged image data (imaged still image data) which is image signal data equivalent to a single still image.

In the event of recording imaged image data generated at the signal processing unit 24 as image information in a memory card 40 which is a recording medium (recording medium device), imaged image data corresponding to a single still image for example is output from the signal processing unit 24 to an encoding/decoding unit 25.

The encoding/decoding unit 25 subjects the imaged image data output from the signal processing unit 24 in increments of still images to compression encoding according to a predetermined still image compression encoding method, adds a header in accordance with control of the control unit 27 for example, and converts into an imaged image data format compressed according to the predetermined format. The imaged image data generated in this way is transferred to a media controller 26. The media controller 26 follows the control of the control unit 27 to write and record the imaged image data transferred thereto in the memory card 40. The memory card 40 in this case is a storage medium having an external shape of a card, in accordance with a predetermined standard for example, and having a non-volatile semiconductor storage device such as flash memory within. Note that storage media for storing image data is not restricted to the above memory card, and may be of other types, formats, and so forth.

Also, the signal processing unit 24 according to the present embodiment can use the imaged image data acquired as described above to execute image processing of subject detection. What the subject detection processing according to the present embodiment is will be described later.

Also, the digital still camera 1 can use the imaged image data obtained by the signal processing unit 24 and displays an image on the display unit 33, so as to display a so-called "through image", which is an image currently being imaged. For example, the signal processing unit 24 acquires the imaging signals output from the A/D converter 23 and generates imaged image data equivalent to one still image worth as described earlier, a process which is continuously performed, thereby sequentially generating imaged image data equivalent to frame images of the moving image. The imaged image data thus sequentially generated is transferred to a display driver 32 under control of the control unit 27. Thus, a through image is displayed.

At the display driver 32, driving signals for driving the display unit 33 are generated based on the imaged image data input from the signal processing unit 24 as described above, and output to the display unit 33. Accordingly, images based on the imaged image data in increments of the sill images are sequentially displayed on the display unit 33. The user can thus dynamically view the images being imaged at that time on the display unit 33, i.e., a through image is displayed.

Also, the digital still camera 1 can play imaged image data recorded in the memory card 40 and display the image on the display unit 33. For this, the control unit 27 specifies the imaged image data and commands the media controller 26 to read out the data from the memory card 40. In response to this command, the media controller 26 accesses the address on the memory card 40 where the specified imaged image data is recorded and reads out the data, and transfers the data which has been read out to the encoding/decoding unit 25.

The encoding/decoding unit 25 extracts the actual data which is compressed still image data from the imaged image data transferred from the media controller 26, under control of the control unit 27 for example, executes decoding processing on the compression encoded data with regard to the compressed still image data, and obtains imaged image data corresponding to a single still image. The imaged image data is then transferred to the display driver 32. Accordingly, the image of the imaged image data recorded in the memory card 40 is played by being displayed on the display unit 33.

Also, a user interface image can also be displayed on the display unit 33 along with the above-described monitor image or played image of imaged image data. In this case, the display image data serving as a user interface image is generated by the control unit 27 in accordance with the operating state at that time for example, and output to the display driver 32. Accordingly, a user interface image is displayed on the display unit 33. Note that the user interface image can be displayed on the display screen of the display unit 33 separately from the monitor image or played image of imaged image data, as with the case of a particular menu screen, for example, or may be displayed so as to be partially superimposed on or synthesized with a part of the monitor image or played image of imaged image data.

In actual practice, the control unit 27 includes a CPU (Central Processing Unit) for example, and along with ROM 28, RAM 29, and so forth, make up a microcomputer. The ROM 28 stores programs of the CPU serving as the control unit 27 to execute for example, and also various types of setting information or the like relating to the operations of the digital still camera 1. The RAM 29 is a main storage device for the CPU.

Also, flash memory 30 in this case is provided as a nonvolatile storage region to be used for storing various types of setting information and so forth which are to be updated (rewritten) in accordance with user operations, operation history, and so forth, for example. Note that in the case of employing non-volatile memory such as flash memory or the like for the ROM 28, a partial storage region of the ROM 28 may be used instead of the flash memory 30.

The operating unit 31 encompasses various types of operating elements provided to the digital still camera 1, and operation information signal output parts for generating operation information signals in accordance with operations performed at the operating elements and outputting to the CPU. The control unit 27 executes predetermined processing in accordance with the operation information signals input from the operating unit 31. Thus, the digital still camera 1 executes operations in accordance with user operations.

A platform-compatible communication unit 34 is a portion for executing communication between the platform 10 side and the digital still camera 1 side following a predetermined communication format, and is made up of a physical layer configuration enabling cable or wireless communication signals to be exchanged between the digital still camera 1 and the communication unit to the platform 10 side in a state where the digital still camera 1 is mounted to the platform 10, and an upper-layer configuration for realizing communication processing corresponding thereto.

Figure 37:
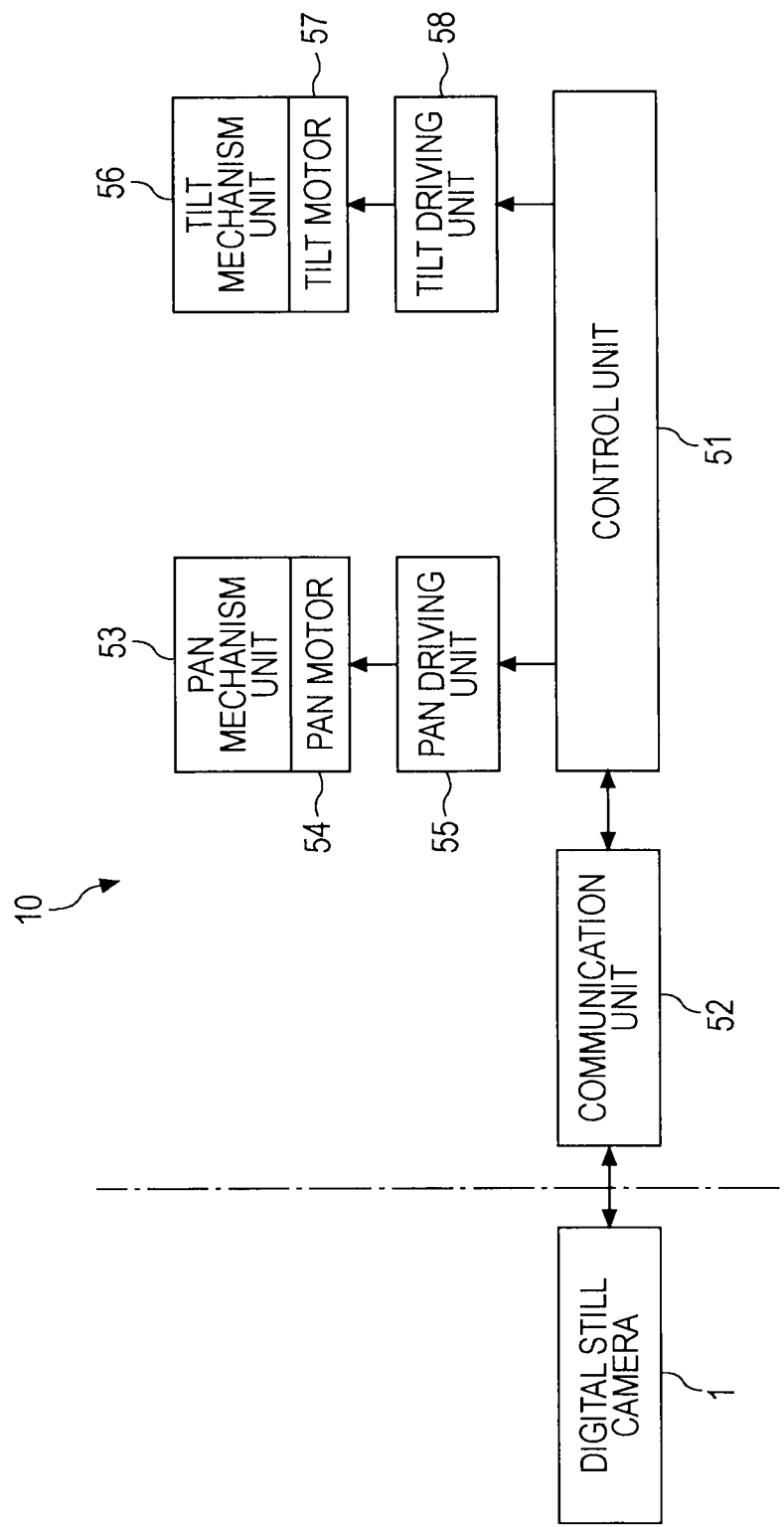
FIG. 37 is a block diagram illustrating an internal configuration example of the platform making up the imaging system according to an embodiment.

FIG. 37 is a block diagram illustrating a configuration example of the platform 10. As described earlier, the platform 10 has a pan/tilt mechanism, to which a pan mechanism unit 53, pan motor 54, tilt mechanism unit 56, and tilt motor 57, correspond.

The pan mechanism unit 53 is of a configuration having a mechanism for providing the digital still camera 1 mounted to the platform 10 with movement in the panning (horizontal) direction shown in FIG. 25A, and the movement is obtained by rotating the pan motor 54 in the forward and reverse directions. In the same way, the tilt mechanism unit 56 is of a configuration having a mechanism for providing the digital still camera 1 mounted to the platform 10 with movement in the tilting (vertical) direction shown in FIG. 25B, and the movement is obtained by rotating the tilt motor 57 in the forward and reverse directions.

A control unit 51 is configured having a microcomputer formed of a combination of a CPU, ROM, RAM, and so forth, for example, and controls the movement of the pan mechanism unit 53 and tilt mechanism unit 56. At the time of the control unit 51 controlling the movement of the pan mechanism unit 53, control signals corresponding to the amount of movement and direction of movement for the pan mechanism unit 53 are output to the pan driving unit 55. The pan driving unit 55 generates motor driving signals corresponding to the input control signals, and outputs the generated motor driving signals to the pan motor 54. The motor driving signals cause the pan motor 54 to be rotated in a predetermined rotation direction at a predetermined rotation angle, and consequently, the pan mechanism unit 53 is also driven so as to be moved in the corresponding movement direction by the corresponding movement amount.

In the same way, at the time of the control unit 51 controlling the movement of the tilt mechanism unit 56, control signals corresponding to the amount of moment and direction of movement for the tilt mechanism unit 56 are output to the tilt driving unit 58. The tilt driving unit 58 generates motor driving signals corresponding to the input control signals, and outputs the generated motor driving signals to the tilt motor 57. The motor driving signals cause the tilt motor 57 to be rotated in a predetermined rotation direction at a predetermined rotation angle, and consequently, the tilt mechanism unit 56 is also driven so as to be moved in the corresponding movement direction by the corresponding movement amount.

A communication unit 52 is a member performing communication, according to a predetermined communication format, with the platform-compatible communication unit 34 provided within the digital still camera 1 mounted to the platform 10, and in the same way as with the platform-compatible communication unit 34, is made up of a physical layer configuration enabling cable or wireless communication signals to be exchanged with the communication unit on the other side, and an upper-layer configuration for realizing communication processing corresponding thereto.

Now, the correlation between the configuration of the imaging system shown in FIG. 26 and the configuration of the digital still camera 1 and platform 10 shown in FIGS. 36 and 37 is as follows, for example. Note that the correlation described below should be understood to be only one straightforwardly conceived example, and other correlations can be conceived and employed.

The imaging block 61 of the digital still camera 1 in FIG. 26 corresponds to the portions of the optical system 21, image sensor 22, A/D converter 23, and signal processing unit 24 in FIG. 36, for example, up to the stage of obtaining imaged image data.

The composition determination block 62 in the digital still camera 1 in FIG. 26 corresponds to image signal processing functions corresponding to predetermined processing such as subject detection (also including attribute determination processing such as adult/child determination here), still detection, subject distinguishing, masking, and so forth, and the signal processing unit 24 in FIG. 36 for example, and the processing functions relating to composition determination which the control unit (CPU) 27 thereof executes.

As described earlier, the optical system 21 has a zoom lens and a driving mechanism unit for driving thereof. The control unit 27 is arranged to obtain zoom position information indicating the current position of the zoom lens from the optical system 21 for zoom control. In the event that the zoom power value Z is provided to the conditional expression in the subject distinguishing processing in the second and third embodiments above, the zoom power value Z can be obtained from the zoom position information which the control unit 27 as obtained as described above.

The pan/tilt/zoom control block 63 of the digital still camera 1 in FIG. 26 corresponds to the processing functions which the control unit 27 in FIG. 36 for example executes for pan/tilt/zoom control.

The communication control processing block 64 in FIG. 26 corresponds to the platform-compatible communication unit 34 in FIG. 36 for example, and to the processing functions which the control unit 27 in FIG. 36 for example executes for communication using the platform-compatible communication unit 34.

The communication control block 71 of the platform 10 in FIG. 26 corresponds to the communication unit 52 in FIG. 37 for example, and to the processing which the control unit 51 executes for communication using the communication unit 52.

The pan/tilt control processing block 72 in FIG. 26 corresponds to the execution functions for processing relating to pan/tilt control which the control unit 51 in FIG. 37 for example executes, and outputs signals to the pan driving unit 55 and tilt driving unit 58, for controlling movement of the pan mechanism unit 53 and tilt mechanism unit 56 in accordance with input control signals.

Next, a more specific example of composition determination processing and composition matching (composition control) by the imaging system (digital still camera 1 and platform 10) according to the embodiment so far, will be described. It should be noted that the examples given here are only examples. This is because a wide variety of actual composition determination algorithms and controls can be conceived.

First, a specific example of subject detection processing which the subject detection processing unit 201 performs will be described with reference to FIGS. 38A and 38B. Note that subject detection will be performed here based on face detection.

Figure 38A:
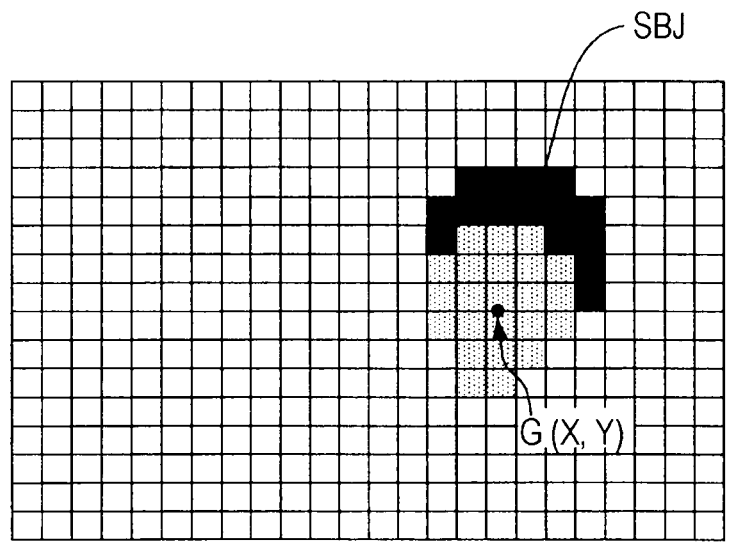
FIGS. 38A and 38B are diagrams describing an example of how to obtain the center of gravity of a detected individual subject and the total subject center of gravity of multiple individual subject, along with a specific method of how to detect individual subjects.

Now, let us say that the subject detection processing unit 201 has input imaged image data of the image contents shown in FIG. 38A. The image contents of the imaged image data here is a single person subject existing in the image which has been imaged. Note that FIGS. 38A and 38B are shown as the images having been sectioned into matrix form, schematically illustrating that images serving as imaged image data are made up of a predetermined number of horizontal and vertical pixels.

By the image contents of the imaged image data shown in FIG. 38A being subjected to subject detection (face detection), the face of the one individual subject SBJ shown in the drawing is detected. That is to say, one face being detected by face detection processing means that one individual subject has been detected. Further, information of the number of individual subjects, orientation, position, and size in the image, is obtained as the results of having detected the individual subject.

The number of individual subjects can be obtained in accordance with the number of faces detected by face detection, for example. With the case in FIG. 38A, the number of detected faces is one, thereby yielding the result that the number of individual subjects is also one.

Also, position information of each individual subject is either in-imaged-image position information or absolute position information as described above, with the position information specifically indicating the center of gravity of the individual subject SBJ.

Figure 39:
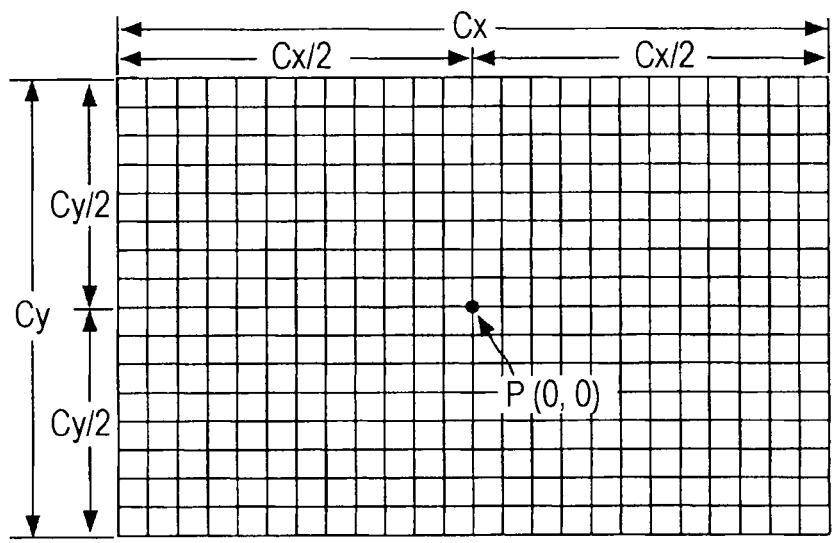
FIG. 39 is a diagram for describing an origin coordinate set within the image frame of the imaged image data.

For example, the center of gravity G of the individual subject SBJ in the image frame of the imaged image is expressed by (X, Y), as described earlier. Note that the origin coordinate P (0, 0) on the X, Y coordinates system of the screen of imaged image data, which serves as a reference for the center of gravity G (X, Y) in this case, is for example, the intersection of the center point of the width (horizontal image size) Cx in the X-axial direction (horizontal direction) corresponding to the screen size, and the height (vertical image size) Cy in the Y-axial direction (vertical direction) corresponding to the screen size, as shown in FIG. 39.

Also, subject center-of-gravity detection methods according to the related art can be applied to definition of position within the image of the individual subject with regard to the center of gravity G.

Also, the size of each individual subject can be obtained as the number of pixels in the horizontal direction or vertical direction in a partial region identified and detected as being a face position, by face detection processing, for example.

Alternatively, a value equivalent to an area corresponding to horizontal number of pixels×vertical number of pixels may be obtained. Note that with the present embodiment, this size is to be obtained by the functions of the subject size detecting unit 202B.

Also, as described earlier, face orientation for each individual subject is detected as being facing one of the left or right, for example, based on face detection processing.

Further, adult/child attribute information can also be obtained by performing adult/child determination by obtaining features of detected faces, using face recognition technology, for example.

Figure 38B:
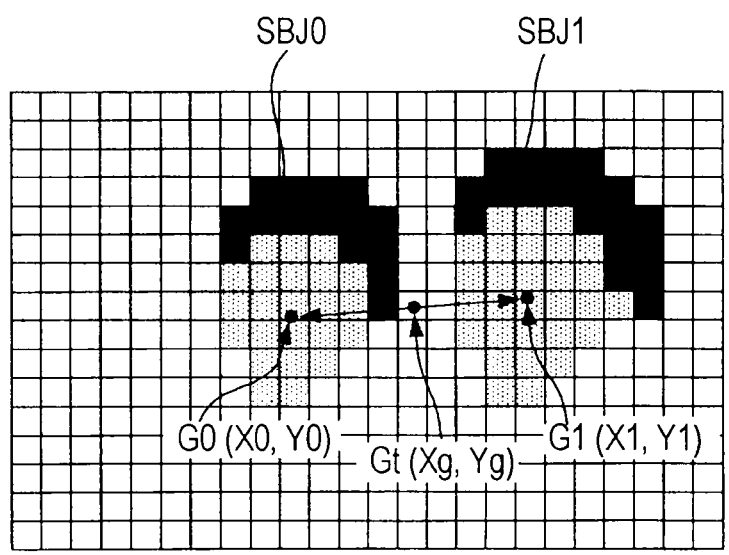

Also, upon the imaged image data shown in FIG. 38B is input and the subject detection processing unit 201 has executed subject detection processing, first, the face detection processing identifies that there are two faces, yielding results that there are two individual subjects. Here, of the two individual subjects, the one to the left will be identified as individual subject SBJ0 and the one to the right as individual subject SBJ1, so as to be identifiable. Also, the coordinates of center of gravity determined for the individual subjects SBJ0 and SBJ1 are G0 (X0, Y0), and G1 (X1, Y1).

Further, in the event that multiple individual subjects are detected in this way, a total subject center of gravity Gt (Xg, Yg), which is the center of gravity of the group of multiple individual subjects (total subject), is obtained.

While various arrangements can be conceived as how to set the total subject center of gravity Gt, the simplest example thereof is illustrated here, wherein a line is drawn between the center of gravity of the leftmost subject and the center of gravity of the rightmost subject, and the center point of this line is taken as the total subject center of gravity Gt of the multiple detected individual subjects. The total subject center of gravity Gt is information which can be used in composition control as described later for example, and is information which can be obtained by computation as long as center of gravity information is obtained for each individual subject. Accordingly, while the total subject center of gravity Gt may be obtained by the subject detection processing unit 201 and output as detected information, an arrangement may be made wherein the composition determination block 62 obtains the total subject center of gravity Gt using the information relating to center of gravity of the leftmost and rightmost subjects having information indicating the position of the center of gravity of the individual subject, obtained as detection information.

Another example of a setting method which can be conceived is to provide each of the multiple individual subjects with weighting coefficients in accordance with the sizes thereof, and use the weighting coefficients to obtain the total subject center of gravity Gt, such that the total subject center of gravity Gt is closer to individual subjects large in size, for example.

Also, the sizes of the individual subjects can be obtained as the number of pixels for each of the individual subjects SBJ0 and SBJ1 in accordance with the area that each face occupies.

With the present embodiment, distinguishing can be performed between relevant subjects and irrelevant subjects (still subjects) with regard to the individual subjects (detected individual subjects) detected as described above, with those distinguished as relevant subjects being set as object individual subjects to serve as objects of composition determination.

Next, description will be made regarding composition obtained by composition control according to a first example of the present embodiment, with reference to FIGS. 40 through 42.

Note that "composition control" as used here is a term referring to control processing wherein composition determination processing, and composition matching for realizing the optimal composition determined by the composition determination processing, are performed.

Figure 40:
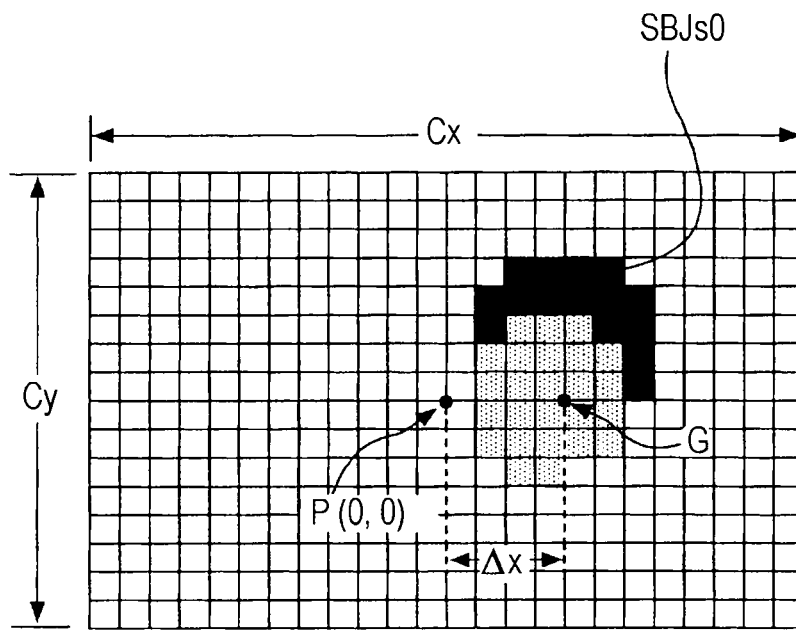
FIG. 40 is a diagram schematically illustrating an example of composition control, with a first example of composition control, in a case wherein the number of individual subjects detected is one.

FIG. 40 illustrates a case in which a single object individual subject SBJs0 has been detected within the image frame of the imaged image data, as a result of the subject detection processing and subject distinguishing processing.

Note that other individual subjects detected as being irrelevant subjects may actually exist within the image frame shown in FIG. 40, but irrelevant subjects have been omitted from the drawing here to facilitate understanding of the drawing.

Also, with the present embodiment, in an arrangement wherein the digital still camera 1 is mounted to the platform 10 in a normal state, the orientation of the digital still camera 1 is set such that a landscape screen is imaged. Accordingly, with this first example and a later-described second example of composition control, we will assume that a landscape screen is obtained by imaging.

In the event that a single object individual subject has been detected as shown in FIG. 40, first, the size of the object individual subject is changed such that the percentage which the object individual subject SBJs0 occupies in the image of the imaged image data is a predetermined value which is viewed as being optimal. For example, at the point that the object individual subject has been detected, if the percentage which the object individual subject occupies in the image is smaller than the above predetermined value, the field angle is narrowed by performing zoom control such that the percentage of the object individual subject is raised to the predetermined value, and if the percentage which the object individual subject occupies in the image is greater than the above predetermined value, the field angle is widened by performing zoom control such that the percentage of the object individual subject is lowered to the predetermined value. Such zoom control optimizes the subject size with regard to composition, in the event here that there is one object individual subject. That is to say, an optimal size is determined for the subject, and composition matching is performed such that the subject is this optimal size.

Next, adjustment of the position of the subject on the screen (subject position) in the event that there is one object individual subject is performed as follows.

As for determination of subject position in the composition determination, the detected face direction information is used.

In the case in FIG. 40, the direction of the face of the object individual subject SBJs0 has been detected as facing the left. At this time, when actually viewing the screen of the image content shown in FIG. 40, the viewer sees the object individual subject SBJs0 in the screen as if it were facing the left side. Incidentally, the actual person serving as the object individual subject SBJs0 is actually facing to the right with the direction facing the imaging apparatus which has performed the imaging as the front thereof.

Also, an imaginary image region division line Ld to serve as a reference for subject position adjustment is set. The image region division line Ld is a straight line matching a vertical line passing through the origin coordinates P (0, 0) in the image, i.e., matching a Y-axial line.

Once the direction of the face has been detected as being toward the left as in this case, the optimal composition is determined in the form of the center of gravity G of the object individual subject SBJs0 having been moved from a position corresponding to the image region division line Ld (X=0) to the right position (horizontal shift position) by a movement expressed in terms of horizontal offset amount Δx. Composition matching is performed such that the center of gravity G is situated at this position. Accordingly, control is executed to drive the pan mechanism of the platform 10 such that the center of gravity G is situated at the horizontal shift position.

Generally, a composition where the subject is situated at the center is considered to be a typical poor composition. Rather, a composition wherein the position of the subject is shifted away from the center in accordance with a certain rule, of which the Rule of Thirds and Golden Section rule are particularly commonly used, for example, is considered to be a good composition. With the present embodiment, in accordance with such a composition determination technique, the position of the individual subject SBJ (center of gravity G) in the horizontal direction of the screen is first moved by a certain amount (horizontal offset amount Δx) as to the center of the screen.

Thereupon, with the present embodiment, if the direction in which the face of the object individual subject is facing is the left as with FIG. 40, the position of the center of gravity G in the horizontal direction is situated in right image region of the image regions (division regions) obtained by the screen being divided into two regions by the image region division line Ld along the Y-axial line, such that the face is situated in the "right" side image region which is opposite to the "left" direction in which the face is facing, thereby obtaining space at the left side of the screen which the face of the individual subject SBJ is facing.

Such a composition enables a better composition to be obtained as compared to compositions wherein the center of gravity G of the object individual subject SBJs of which the face is facing left, for example, is at a subject position corresponding to (matching) the center of the screen in the horizontal direction, or in the image region to the left side of the image region division line Ld.

Various algorithms can be conceived for determining the actual value of the horizontal offset amount Ax with the present embodiment. Here, the so-called "Rule of Thirds" will used as a base. The Rule of Thirds is one of the most basic composition setting techniques, and aims to obtain a good composition by situating the subject upon imaginary lines dividing the square screen into threes vertically and horizontally.

For example, in FIG. 40, the horizontal offset amount $\Delta x$ has been set such that the center of gravity G is situated on the imaginary line to the right, out of the two imaginary lines in the vertical direction of the screen equally dividing the horizontal image frame size Cx into three. Accordingly, one composition can be obtained, which is optimal for the subject position in the horizontal direction in accordance with the face direction of the individual subject.

Also, although omitted from the drawings, in the event that the direction of the face of the one object individual subject SBJs is detected to be in the right direction, the position of the center of gravity G of the object individual subject SBJs in the horizontal direction is situated so as to be linearly symmetrical across the image region division line Ld as to the position shown in FIG. 40. That is to say, the horizontal offset amount Ax in this case is set with an inverted sign for the actual value of that shown in FIG. 40, and pan control is performed based on this horizontal offset amount $\Delta x$.

Figure 41A:
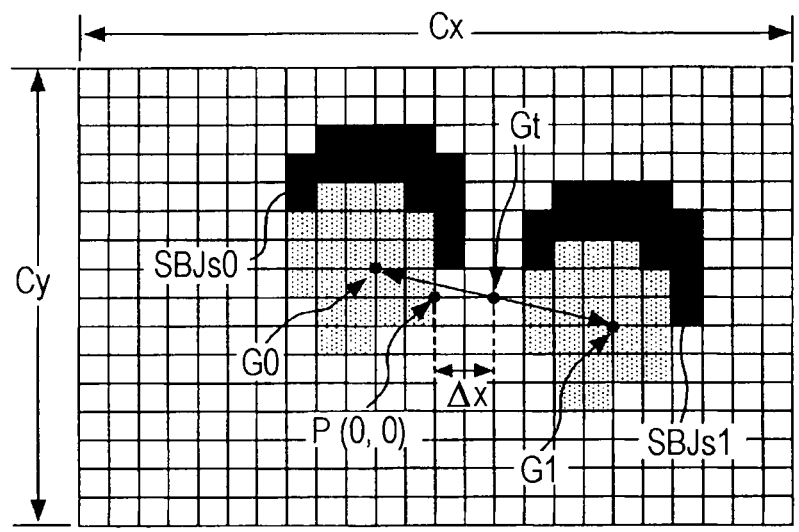
FIGS. 41A and 41B are diagrams schematically illustrating an example of composition control, with the first example of composition control, in a case wherein the number of individual subjects detected is two.

Also, in the event that two object individual subjects SBJs0 and SBJs1 are detected as in FIG. 41A, the first thing performed in the composition control is to perform adjustment (zoom control) regarding the size of the total subject image portion made up of the group of image portions of the object individual subjects SBJs0 and SBJs1 (this can also be understood as the percentage which the subject image portions occupy in the entire screen, for example), so as to be set (determined) to a value optimal in accordance with the number of object individual subjects being two.

While several ways can be conceived to define the total subject image portions and obtain the size thereof, one way would be to add the size of the image portions for each of the multiple detected object individual subjects, for example. Another would be to obtain the size of an image portion within an imaginary line drawn so as to encompass all of the multiple detected individual subjects.

Information regarding the face direction of the two object individual subjects SBJs0 and SBJs1 is used in determining the subject position of the two object individual subjects SBJs0 and SBJs1 in the horizontal direction.

FIG. 41A shows a case wherein the face directions of the two object individual subjects SBJs0 and SBJs1 have been detected to both be toward the left. That is to say, the face directions of the two object individual subjects are all the same, which is left.

In this case, the total subject image portion made up of the object individual subjects SBJs0 and SBJs1 is positioned to the right of the image region division line Ld, which is opposite to the "left" indicated by the face direction, such that space is formed at the left side of the screen in the same way as with the case of the single object individual subject SBJs shown in FIG. 40. That is to say, in this case, this subject placement is determined to be the optimal composition. To this end, for example, a horizontal offset amount $\Delta x$ is set for shifting to the right side by a predetermined amount, as shown in the drawing. Thereupon, pan control is performed such that the total subject center of gravity Gt, i.e., the center of gravity of the total subject image portion made up of the two object individual subjects SBJs0 and SBJs1, is situated at a position shifted from the vertical line (Y-axial line) passing through the origin coordinates P (0, 0), which is the image region division line Ld, by the horizontal offset amount $\Delta x$.

Also, while not shown in the drawings, in the event that the face directions of the two object individual subjects SBJs0 and SBJs1 are both toward the right, the total subject center of gravity Gt of the two object individual subjects SBJs0 and SBJs1 is situated so as to be linearly symmetrical across the image region division line Ld as to the position shown in FIG. 41A (at a position shifted to the left of the Y axial line serving as the reference by an amount corresponding to the absolute value of the horizontal offset amount $\Delta x$), which is determined to be the optimal composition in this case, and pan control is performed so as to achieve this state.

It should be noted though that in such a case wherein there are multiple object individual subjects, an horizontal offset amount $\Delta x$ obtained in the case that the object individual subject is one tends to lead to the subjects being too far to the right (or left) if applied to a case such as this. Accordingly, in a case wherein there are two object individual subjects as shown in FIG. 41A, the horizontal offset amount $\Delta x$ is set (determined) to be a smaller value (absolute value) than that in the case in FIG. 40 where the number of object individual subjects in one, in accordance with a predetermined rule.

Also, FIG. 41A shows a case wherein the face directions of the two object individual subjects SBJs0 and SBJs1 are different, i.e., one to the right and one to the left. This is an example of a case wherein the number of object individual subjects is two and the direction of faces is not the same.

In this case, with regard to the position of the total subject image portion in the horizontal direction, determination is made that an optimal composition is a state wherein the total center of gravity Gt of the two object individual subjects SBJs0 and SBJs1 is positioned on the image region division line Ld as shown in the drawing, and adjustment (pan control) is performed to achieve this state.

With the configuration which can be obtained thereby, the total subject image portion made up of the two object individual subjects SBJs0 and SBJs1 is positioned at the approximate middle of the screen in the horizontal direction. However, in the event that there are multiple subjects and these subjects are not facing in the same direction, the composition thereof is suitable even of the total subject image portion is at the middle.

Figure 42:
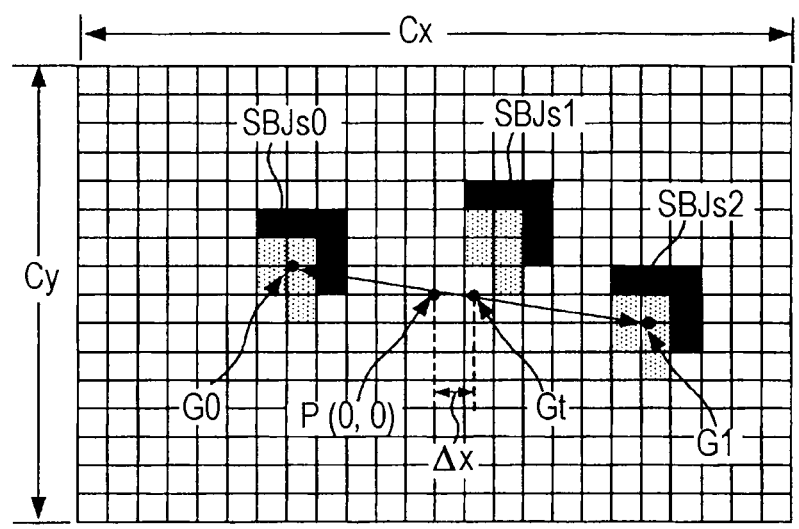
FIG. 42 is a diagram schematically illustrating an example of composition control, with the first example of composition control, in a case wherein the number of individual subjects detected is three.

Also, FIG. 42 shows a case wherein three object individual subjects SBJs0, SBJs1, and SBJs2, have been detected. With the composition control in this case as well, the first thing is to perform adjustment (zoom control) regarding the size of the total subject image portion made up of the object individual subjects SBJs0, SBJs1, and SBJs2, so as to be set to a size optimal in accordance with the number of object individual subjects being three.

In this case as well, information regarding the face direction of each object individual subject is used in determining the subject position of the total subject image portion in the horizontal direction. FIG. 42 shows a case wherein the face directions of the three object individual subjects SBJs0, SBJs1, and SBJs2, have all been detected to both be toward the left.

In this case, as with the case of FIG. 41A, the total subject image portion made up of the object individual subjects SBJs0, SBJs1, and SBJs2 is positioned in the image region to the right of the image region division line Ld, to which end a horizontal offset amount Δx is set for shifting to the image region at the right side, and pan control is performed such that the total subject center of gravity Gt is situated at a certain position determined thereby.

Also, in the event that the face directions of the three object individual subjects SBJs0, SBJs1, and SBJs2, are all the same toward the right, pan control is performed such that the total subject center of gravity Gt is situated so as to be linearly symmetrical in the horizontal direction across the image region division line Ld as to the position shown in FIG. 42. Also, the horizontal offset amount Δx is set to be a smaller absolute value than that in the case in FIG. 41A where the number of object individual subjects is two. Accordingly, the subject position in the horizontal direction is optimal in accordance with the case wherein the number of object individual subjects is three for example, and a good composition can be obtained.

Figure 41B:
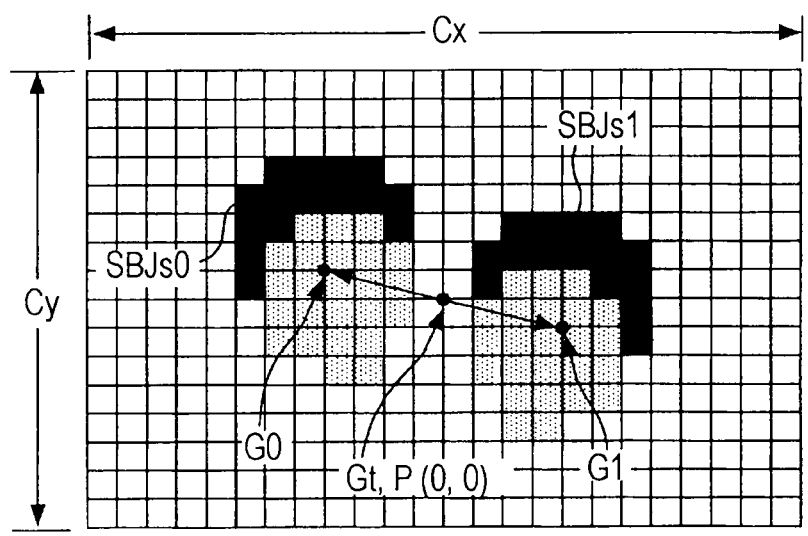

Also, in the composition control according to this first example, in the event that the face directions of the three object individual subjects SBJs0, SBJs1, and SBJs2, are not all the same, a composition is obtained wherein the total subject center of gravity Gt is situated at a position upon the image region division line Ld (Y-axial line) in accordance with FIG. 41B.

With the description so far, it can be understood that position adjustment in the horizontal direction in the composition control according to the first example is first correlated with the face direction detected for each object individual subject. That is to say, as the most basic control, in the event that the number of object individual subjects is one, the center of gravity G is situated so as to be shifted by a predetermined amount to the right side region or left side region of the image region division line Ld (Y-axial line) in accordance to whether the face direction detected for the object individual subject is toward the right or the left, i.e., horizontal offset is performed with regard to the center of gravity G, so as to form space in the direction in which the subject is facing in the image.

In the event that the number of object individual subjects is multiple (two or more) with the composition control, and the face direction of all of the object individual subjects is the same, horizontal offset of the total subject center of gravity Gt is performed in the same way as with the above position adjustment, but if not all the same, horizontal offset is not performed but rather the total subject center of gravity Gt is provided with an X coordinate corresponding to the image region division line Ld, such that the total subject image region is around the middle of the screen (image frame).

Thereupon, at the time of performing horizontal offset of the total subject center of gravity Gt (or the center of gravity G in the case that the number of individual subjects is one), the horizontal offset amount Δx is changed according to the number of object individual subjects, as described with reference to FIGS. 42 through 44. Accordingly, consideration is given regarding the horizontal position of the total subject image portion in the screen such that an optimal position can be obtained in accordance with the number of object individual subjects.

Figures 43, 43A, 43B:
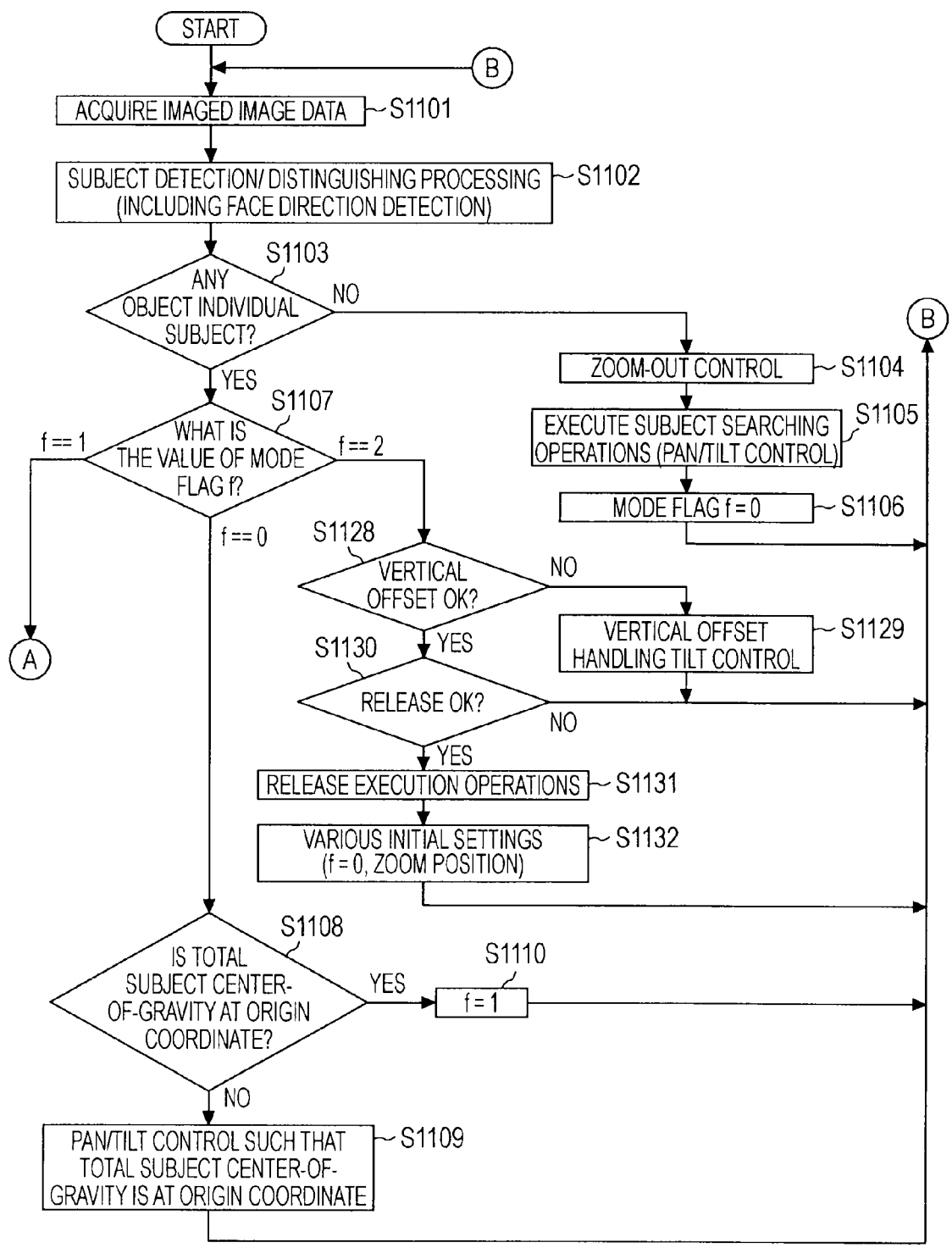
FIG. 43 is a flowchart illustrating an example of processing procedures for the first example of composition control.
Figure 43B:
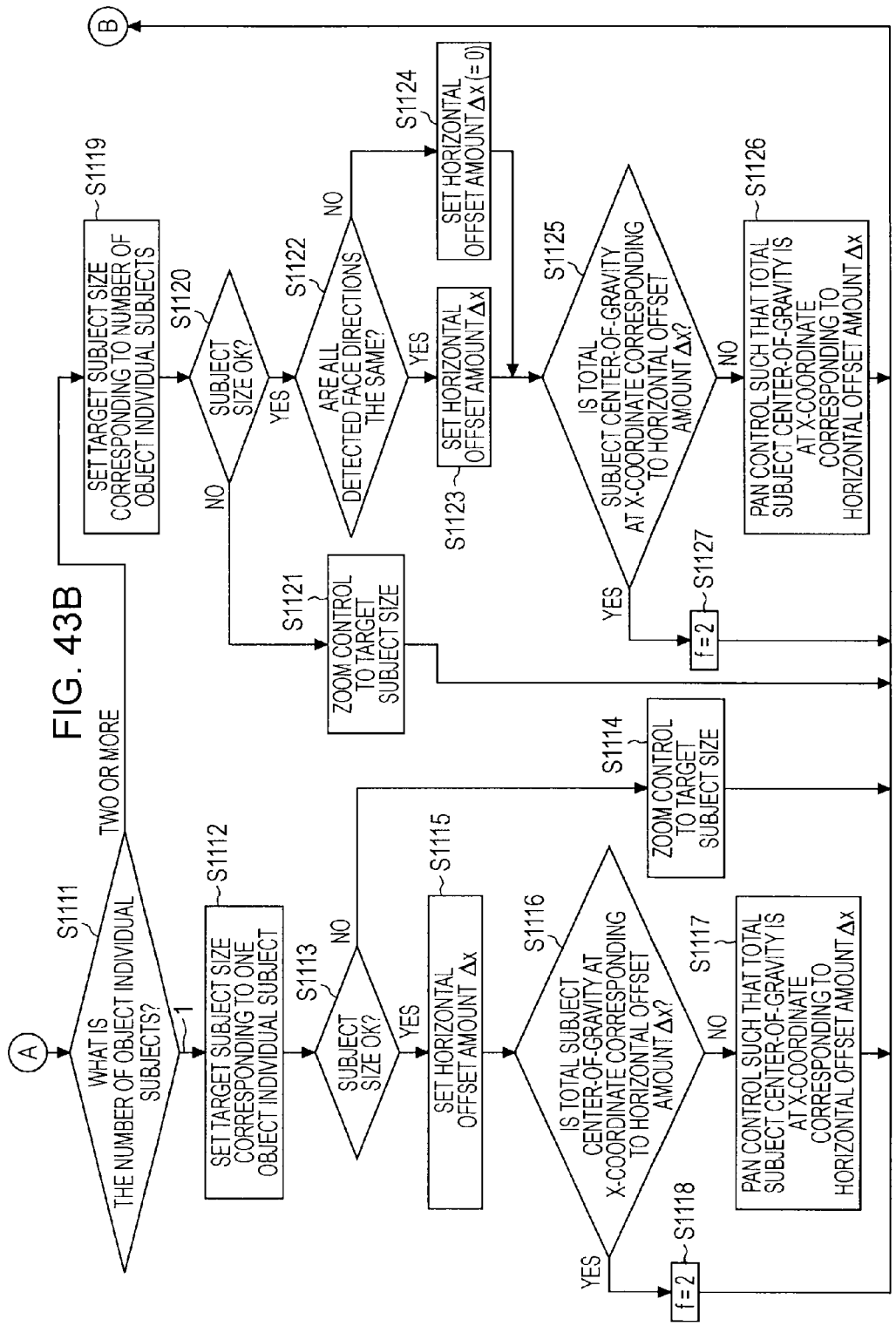
Figure 44:
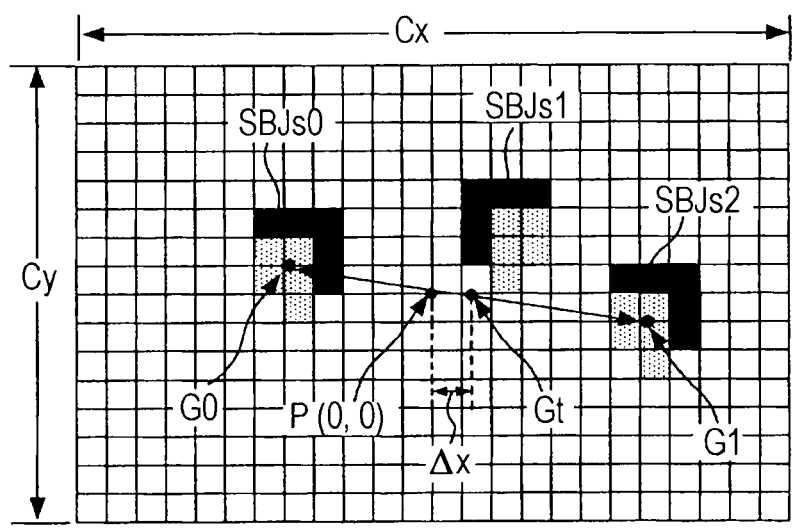
FIG. 44 is a diagram schematically illustrating an example of composition control, with the second example of composition control, in a case wherein the number of individual subjects detected is three.

FIG. 43 illustrates an example of procedures executed by the composition determination block 62 and the pan/tilt/zoom control block 63 in accordance with the composition control according to the first example described with reference to FIGS. 40 through 42 above. It should be noticed that the procedures shown in FIG. 43 can be applied to any of the configurations shown in FIGS. 29, 32, and 34. The processing shown in FIG. 43 can be viewed as being realized by a program being executed by the signal processing unit 24 serving as a DSP and a CPU in the control unit 27.

Also, in the following flowcharts, the terms "total subject center of gravity (Gt)" and "total subject image portion" will no longer be applied to only cases wherein the number of detected individual subjects is two or more, but also to the case wherein the number of detected individual subjects is one. That is, the center of gravity G shown in FIG. 40 might be referred to as the "individual subject center of gravity Gt in a case that the number of detected individual subjects is one", for example, and the image portion made up of the individual subject SBJ alone in FIG. 40 might be referred to as the "total subject image portion in a case that the number of detected individual subjects is one".

First, steps S1101 through S1106 are procedures for searching and detecting subjects, and performing subject distinguishing, primarily executed by the subject detection processing unit 201.

In step S1101, imaged image data based on the imaging signals from the image sensor 22 is input and acquired. In step S1102, subject detection processing and subject distinguishing processing are executed using the imaged image data acquired in step S1101. The subject detection processing here is executed by the subject detection processing unit 201 as described earlier. Also, the subject detection processing involves also detecting the face direction for each detected individual subject, and obtaining the information thereof, as described earlier. Also, subject distinguishing processing is executed by the subject distinguishing unit 211 in accordance with the description made earlier.

In step S1103, determination is made regarding whether or not a relevant subject to take as an object of composition determination exists, i.e., whether an object individual subject exists (has been distinguished), as the result of the subject detection processing and subject distinguishing processing in step S1102. In the event that a negative determination result is obtained here to the effect that no object individual subject exists, i.e., the number of distinguished object individual subjects is zero, the flow proceeds to step S1104, and zoom lens moving control (zoom-out control) for widening the field angle to a predetermined field angle (horizontal/vertical angle) in accordance with subject searching. Thus widening the field angle allows a wider range to be imaged, meaning that subjects are that much easier to capture. Also, in step S1105, pan/tilt control is executed for moving the pan/tilt mechanism of the platform 10 for subject searching. This control is performed by the subject detection processing unit 201 handling the communication control processing block 64 the control signals for pan/tilt control, which are transmitted to the communication unit 52 of the platform 10. The pan/tilt mechanism of the platform 10 should be moved in a pattern which allows searching to be effectively performed for example, as the pan/tilt control for the subject searching.

Also, in step S1106, 0 is set for the mode flag f (f=0), and the flow returns to step S1101.

Thus, the procedures for the steps S1101 through S1106 are repeated until at least one individual subject is detected in the image contents of the imaged image data. At this time, the system made up of the digital still camera 1 and the platform 10 is in a state wherein the digital still camera 1 is moved in the pan direction and tilt direction for subject searching.

In the event that a positive determination result is given in step S1103 to the effect that an object individual subject exists, the flow proceeds to the procedures of step S1107 and on.

In step S1107, determination is made as to the value currently set to the mode flag f.

In the event that determination is made that f=0 holds, this indicates that an initial rough subject capturing mode should be executed as composition control, and procedures starting from step S1108 are executed as shown in FIG. 43.

In step S1108, determination is made regarding whether or not the total subject center of gravity Gt is situated at the origin coordinates P (0, 0) (see FIG. 39) in the screen of the imaged image data (screen obtained when showing the screen contents of the imaged image data). Now, in the event that a negative determination result is obtained to the effect that the total subject center of gravity Gt is not yet situated at the origin coordinates, control is executed in step S1109 to move the pan/tilt mechanism of the platform 10 such that the total subject center of gravity Gt is situated at the origin coordinates, and the flow returns to step S1101. Thus, in the capturing mode which is the initial composition control procedure in a state wherein the presence of an individual subject has been detected, the pan/tilt mechanism of the platform 10 is controlled such that the total subject center of gravity Gt is situated at the origin coordinates which is the initial reference position, so as to display the image region in which a detected object individual subject is shown in the middle of the screen.

An example of an algorithm for performing the pan/tilt control in step S1109 will now be shown. In the state wherein an individual subject has been detected in the state of mode flag f=0, the subject detection processing unit 201 performs computation shown in the following Expression (4), so as to obtain the pan-direction movement amount $S_{pan}$ and tilt-direction movement amount $S_{tilt}$, which are movement amounts of movement that has to be made. In the following Expression (4), n represents the number of object individual subjects distinguished, and p(Xi,Yi) represents the X-Y coordinates to the center of gravity if the i'th object individual subject out of the 0'th through n−1'th object individual subjects, or more specifically, the object individual subjects to which the Nos. of 0 through n−1 have been assigned. Note that, as shown in FIG. 39, the origin coordinates (0, 0) in this case is the intersection between the center point in the horizontal direction of the screen and the center point in the vertical direction thereof.

$$(S_{pan}, S_{tilt}) = \frac{\sum_{i=0}^{n-1} p(x_i, y_i)}{n}$$

Expression (4)

In step S1108 for example, determination is made regarding whether or not the absolute value of the movement amount $S_{pan}$, $S_{tilt}$ is within a predetermined value (more precisely is zero, but may be a value greater than zero), whereby determination can be made regarding whether or not the total subject center of gravity Gt is equivalent to being at the origin coordinates P. In step S1109, pan/tilt control is executed so that the absolute value of the movement amount $S_{pan}$, $S_{tilt}$ is within the predetermined value. The speed of the pan mechanism unit 53 and tilt mechanism unit 56 at the time of the pan/tilt control may be a constant speed, or may be arranged to move faster if the movement amount $S_{pan}$, $S_{tilt}$ is greater, for example. This arrangement would allow the total subject center of gravity Gt to be brought close to the origin coordinates in a relatively short time even if the amount of panning or tilting movement is great.

In the event that a positive determination result is made in step S1108 that the total subject center of gravity Gt is situated at the original coordinates, in step S1110 the mode flag is set to 1 (f=1) and the flow returns to step S1101. The state wherein the mode flag f has been set to 1 in step S1110 indicates that the capturing mode which is the initial procedure in composition control has ended, and the next first adjustment control (composition adjustment mode) should be executed.

In the event that the mode flag is f=1 and the first composition adjustment mode should be executed, the flow proceeds from step S1107 to step S1111. The first composition adjustment mode is for performing zoom (field angle) adjustment and pan control for obtaining an optimal composition in accordance with the number of detected individual subjects and the combination of face directions of the individual subjects. Note that the field angle adjustment and pan control results in change in the size of individual subjects in the screen (image frame) and in the position of the individual subjects.

In step S1111, determination is made regarding how many object individual subjects are currently set, and in the event that this is one, procedures starting from step S1112 are executed.

In step S1112, a target subject size is set in accordance with the number of detected object individual subjects being one. The target subject size here is a size wherein the total subject image portion size in the screen is viewed as being compositionally optimal, and in correspondence with FIG. 40 for example, is equivalent to "a predetermined range of values of occupancy percentage of the (one) object individual subject SBJs0 in the imaged image data which is taken to be optimal".

In step S1113, determination is made regarding whether or not the size of the object individual subject is OK. A state wherein the size of the object individual subject is OK is a state wherein the size of the object individual subject the target subject size set in step S1112. In the event that a negative determination result is obtained in step S1113, the flow proceeds to step S1114, zoom lens driving control (zoom control) is executed such that the size of the object individual subject is the target subject size, and the flow returns to step S1101.

Note that at this time, zoom control is executed so that a position corresponding to the X coordinate set in step S1109 (X=0) is maintained with regard to the position of the total subject center of gravity Gt in the horizontal direction (left-right direction). Accordingly, a state wherein the object individual subject is positioned around the middle in the horizontal direction can be maintained. Also, at the time of executing subject search operations, zoom-out control is performed in step S1104, so it is likely that zoom-in control will be performed for the zoom control in step S1114. However, in the event that the size of the individual subject detected at that time is larger than the target subject size for some reason, and accordingly a negative determination result is obtained in step S1113, zoom-out is executed in step S1114 to execute control such that the actual object individual subject size becomes the target subject size.

In the event that a positive determination result is obtained in step S1113, the flow proceeds to the procedures of steps 1115 and on.

In step S1115, the horizontal offset amount Δx is set. Here, in the composition control according to the first example of the present embodiment, the horizontal offset amount Δx is obtained by the following Expression (5).

$$\Delta x = D \times (Cx/6)/n \quad \text{Expression (5)}$$

In this Expression (5), D represents a coefficient to which one of +1, −1, or 0 has been set based on the face direction or combination (relation) of multiple face directions. Cx represents the horizontal image size. The term Cx/6 corresponds to the X coordinates of imaginary lines in the vertical direction, obtained based on the Rule of Thirds. Also, n indicates the number of object individual subjects that have been distinguished (set).

In the event that the flow reaches step S1115, here, n=1, since the detected object individual subject is one. Also, the face direction is either left or right. The coefficient D is +1 if the face direction is toward the left, and is −1 if toward the right.

Accordingly, in the event that the face direction of the one object individual subject which has been distinguished is to the left, Δx=−Cx/6 holds, indicating a position of a vertical line moved to the right by an amount Cx/6 from a vertical line passing through the origin coordinate P (0, 0) which is the image region division line Ld (Y-axial line). The position of the vertical line is the same of the right imaginary line of the two imaginary lines in the Rule of Thirds.

On the other hand, in the event that the face direction of the one object individual subject which has been distinguished is to the right, horizontal offset amount Δx=Cx/6 holds, indicating a position of a vertical line moved to the left by an amount Cx/6 from a vertical line passing through the origin coordinate P (0, 0) which is the image region division line Ld (Y-axial line). The position of the vertical line is the same of the left imaginary line of the two imaginary lines in the Rule of Thirds.

In step S1116, determination is made regarding whether or not the total subject center of gravity Gt (in this case the center of gravity G in FIG. 40 is the same as the total subject center of gravity Gt since there is only one object individual subject) is positioned on the X coordinate corresponding to the horizontal offset amount Δx set in step S1115 above. In the event that a negative determination result is obtained here, the flow proceeds to step S1117.

In step S1117, pan control is executed such that the total subject center of gravity Gt is positioned at the X coordinate corresponding to the horizontal offset amount Δx, and the flow returns to step S1101.

In the event that the total subject center of gravity Gt is positioned at the X coordinate corresponding to the horizontal offset amount Δx, due to the control in step S1117, a positive determination result is obtained in step S1116. In the event that a positive determination result is thus obtained in step S1116, the center of gravity of the object individual subject (SBJ) is at a position moved to the left or right from the image region division line Ld by the horizontal offset amount Δx in accordance with the face direction thereof, as shown in FIG. 40.

In the event that a positive determination result is obtained in step S1116, the flow proceeds to step S1118, the mode flag f is set to 2, and the flow returns to step S1101. A state wherein the mode flag is f=2 is a state wherein the first composition adjustment has ended, so the next second composition adjustment mode should be executed and then a release operation should be executed, as will become apparent from later description.

Also, in the event that determination is made in step S1111 that the number of object individual subjects is two or more, the procedures starting from step S1119 are executed. In step S1119, processing is performed for setting the target subject size. In the event that the number of object individual subjects is two or more, the target subject size of obtaining an optimal composition differs in accordance with the number of object individual subjects, for example. Accordingly, in step S1119, a predetermined target subject size in accordance with the number of object individual subjects detected in step S1102 is set. Also, it should be noted that the target subject size in the event that the number of object individual subjects is two or more deals with the total subject image portion made up of all detected individual subjects.

In step S1120, determination is made regarding whether or not the size of the object individual subject is OK. That is to say, here, determination is made regarding whether or not the size of the total subject mage portion obtained from the detected information regarding the object individual subjects is the same as the target subject size set in the above step S1120.

In the event that a negative determination result is obtained in step S1120, the flow proceeds to step S1121. In step S1121, zoom lens driving control (zoom control) is executed such that the size of the total subject image portion of the object individual subjects detected at this time is the target subject size, set in step S1119, in the same way as with step S1114, and the flow returns to step S1101.

On the other hand, in the event that a positive determination result is obtained in step S1120, the flow proceeds to step S1122.

In step S1122, determination processing is performed regarding whether or not the face directions detected for each of the multiple object individual subjects are all the same.

First, in the event that a positive determination result is obtained in step S1122, the procedures of step S1123 and on are executed. In step S1123, the horizontal offset amount Δx is set with the above-described Expression (5).

In this case, either +1 or −1 is substituted into the coefficient D in Expression (5) in accordance with whether the same face direction that has been detected is either left or right. Also, a numeral of 2 or greater is substituted into n, in accordance with the number of object individual subjects detected.

As can be understood from this, with Expression (5), the greater the number of object individual subjects, the smaller the absolute value of the horizontal offset amount Δx is. That is to say, as described with reference to FIGS. 40, 41A, and 42, the offset amount of the total subject image portion from the image region division line Ld toward the left or right is smaller as the number of object individual subjects increases.

On the other hand, in the event that a negative determination result is obtained in step S1122, the horizontal offset amount Δx=0 is set in step S1124.

It should also be noted that Δx=0 can also be set here in step S1124 by performing the computation of Expression (5). That is to say, in the event that a negative determination result is obtained in step S1122, i.e., in the event that the multiple face directions are not all the same, in step S1124 the algorithm is configured such that 0 is substituted in to the coefficient D whereupon the computation of Expression (5) is carried out.

After executing the procedures of step S1123 or step S1124, the flow proceeds to the procedures of step S1125 and on.

In steps S1125, S1126, and S1127, pan control is performed until the total subject center of gravity Gt is positioned at the X coordinate corresponding to the horizontal offset amount Δx set in step S1123 or S1124, in the same way as with the processing in steps S1116 through S1118. In the event that the face directions of the multiple object individual subjects are all the same as a result of this control, this means that a state has been achieved wherein the total subject image portion (total subject center of gravity Gt) has been moved to the left or right direction by the horizontal offset amount Δx corresponding to the number of object individual subjects. Upon this state being achieved, a positive determination result is obtained in step S1125, the mode flag f is set to 2 in step S1127, and the flow returns to step S1101.

In this state wherein the mode flag f has been set to 2, the procedures of size adjustment in accordance with the number of object individual subjects, and position adjustment in the horizontal direction in accordance with the face direction for each of the object individual subjects or the combination thereof, described with reference to FIGS. 40 through 42, have been completed as the composition control. Accordingly, in the event that determination is made in step S1107 that the mode flag f is 2, the second composition adjustment mode is executed in the procedures of step S1128 and on.

For example, while no description has been made above in the description of composition control with reference to FIGS. 40 through 42 regarding how to set the position of the center of gravity of the object individual subjects in the vertical direction in the screen, in actual practice, there may be cases wherein a better composition can be obtained by moving vertically (offset) by a certain amount from the center of the screen. Accordingly, with a practical application of the composition control according to the present embodiment, a vertical direction offset amount is also set for the total subject center of gravity Gt so that a better optimal composition can be obtained. The procedures for this are the second composition adjustment mode, executed as step S1128 and the step S1129 which will be described next.

In step S1128, determination is made regarding whether or not the position of the total subject center of gravity Gt (in the event that the number of object individual subjects is one, the center of gravity G of that object individual subject) is offset from a horizontal line (X-axis) passing through the origin coordinates P in the screen by a vertical offset amount Δy (i.e., whether or not the center of gravity offset is OK).

In the event that a negative determination result is obtained in step S1128, in step S1129 tilt control is performed such that the tilt mechanism of the platform 10 moves so as to offset the center of gravity by the set vertical offset amount Δy, and the flow returns to step S1101. At the point that a positive determination result is obtained in step S1128, this means that the position of the total subject image portion in both the horizontal direction and in the vertical direction is in accordance with the optimal composition, and further, the size of the total subject image portion is also in accordance with the optimal composition. That is to say, the optimal composition has been achieved.

Several techniques can be conceived regarding how to set the actual value of the vertical offset amount Δy with regard to steps S1128 and S1129, and accordingly, the present embodiment is not restricted to any in particular. One of the simplest ways of setting is to give a length value equivalent to ⅙ of the vertical image size Cy from the center position in the vertical direction, based on the Rule of Thirds, for example. Of course, a configuration wherein different values are set based on the number of object individual subjects, direction of faces and the combination thereof, for example, can be conceived.

In the event that a positive determination result is obtained in step S1128, processing procedures corresponding to a release action starting from step S1130 is executed. The release action described here is an action for storing the imaged image data obtained at that time as still image data in a storage medium (memory card 40) as described earlier. That is to say, this corresponds to a case wherein the user is performing a manual shutter operation, and the imaged image data obtained at that time is stored in the recording medium as still image data in response to the shutter operation.

In step S1130, determination is made regarding whether or not conditions are currently satisfied for executing a release action. Conditions may include, for example, whether in a focused state (in the event that auto focus control is set to on), whether the pan/tilt mechanism of the platform 10 is in a still state, and so on.

In the event that a negative determination result is obtained in step S1130, the flow returns to step S1101, and a state conditions are satisfied for executing a release action is awaited. On the other hand, in the event that a positive determination result is obtained in step S1130, a release action is executed in step S1131. Thus, imaged image data of an optimal composition can be recorded as still image data with the present embodiment.

Upon the release action ending, initialization setting is performed in step S1132 regarding certain parameters. In this processing, the initial value of the mode flag f is set to zero, and the zoom lens position is also returned to the initial position set beforehand.

After executing step S1132, the processing is returned to step S1101. Returning the processing from step S1132 to step S1101 means that the actions of searching for subjects, obtaining an optimal composition in accordance with the direction in which the object individual subjects detected by this searching are facing, and the number of object individual subjects, and performing imaging recording (release action), are automatically repeatedly performed.

The release action in the case of FIG. 43 described above is an operation for recording a still image to a recording medium from the imaged image, but in a broader sense, the release action according to the present embodiment encompasses acquiring still image data as appropriate from imaged images for example, including recording the still image in a recording medium. Accordingly, an action wherein still image data is acquired from the imaged image by the digital still camera 1 according to the present embodiment for transfer to another recording device or the like via a data interface or the like, for example, is also included in the release action.

With the procedures in FIG. 43 described so far, first, in steps S1108 and S1109, pan/tilt control is performed for capturing, wherein the total subject center of gravity Gt of one or more object individual subjects is positioned at the origin coordinates P in the screen based on the movement amount $S_{pan}$, $S_{tilt}$ obtained with the above Expression (4) in steps S1108 and S1109. At the next stage, the horizontal offset amount Δx is obtained based on the number of object individual subjects, and the relation of face directions detected for each of the object individual subjects, and pan control is performed wherein the total subject center of gravity Gt is moved in the left or right direction by an amount corresponding to the horizontal offset amount Δx, with the vertical line passing through the origin coordinate P which is the image region division line Ld (Y-axial line) as a reference. Further, tilt control is performed wherein the total subject center of gravity Gt is moved up or down by an amount corresponding to the vertical offset amount Δy, with the horizontal line passing through the origin coordinate P as a reference.

In light of the above, it can be said that the pan/tilt control of the procedures in FIG. 43 involves first obtaining movement amount $S_{pan}$, $S_{tilt}$ by $$(S_{pan}, S_{tilt}) = \frac{\sum_{i=0}^{n-1} p(x_i, y_i) + (\Delta_x, \Delta_y)}{n} \quad \text{Expression (6)}$$

and then performing control of the pan mechanism for obtaining movement amount within the screen corresponding to the movement amount $S_{pan}$, and control of the tilt mechanism for obtaining movement amount within the screen corresponding to the movement amount $S_{tilt}$.

Next, composition control according to a second example of the present embodiment will be described. A situation corresponding to the composition control of the second example is shown in FIG. 44, illustrating a state wherein three object individual subjects SBJs0, SBJs1, and SBJs2, have been distinguished. Of these object individual subjects, the face direction detected for the object individual subjects SBJs0 and SBJs2 is left, while the face direction detected for the object individual subject SBJs1 is right. In this case, the face directions of all of the object individual subjects are not the same, so with the first composition control example, the composition would be set such that the total subject center of gravity Gt is set on the vertical line passing through the origin coordinate P which is the image region division line Ld (Y-axial line), as described with FIG. 41B and other drawings.

However, the fact that the two object individual subjects SBJs0 and SBJs2, which are a majority of the three object individual subjects are facing in the same direction (the face direction is the same), might lead us to think that if the object individual subjects are looking at anything of importance, the probability that this would be in the direction in which the two object individual subjects SBJs0 and SBJs2 are facing is greater than the probability that this would be in the direction in which the one object individual subject SBJs1 is facing. Based on this idea, we can say that leaving space in the region toward which the two object individual subjects SBJs0 and SBJs2 are facing will result in greater probability of a good composition being obtained. In this case, the two object individual subjects SBJs0 and SBJs2 are detected facing the left, so the total subject center of gravity Gt of the total subject image portion made up of the three object individual subjects SBJs0, SBJs1, and SBJs2 is moved to the image region which is to the right of the image region division line Ld in the screen, so as to obtain a good composition.

Accordingly, with the composition control according to this second example, in the event that the number of same face directions are a majority of the entire number of object individual subjects by a predetermined percentage, this same face direction is taken as the reference face direction, with regard to the region of face directions detected for each of the multiple individual subjects. The reference face direction can also be said to indicate the direction in which the entirety of the group of multiple object individual subjects is facing as a whole in the screen. The horizontal offset amount Ax is obtained and set based on this reference face direction. In the case shown in FIG. 44, a composition wherein the total subject center of gravity Gt is set to the right of the vertical line passing through the origin coordinates P due to such composition control.

Also, although not shown here, in the event that not enough same face directions are obtained to be a majority by the predetermined percentage, i.e., in the event that the above reference face direction is indeterminate, the idea with the present embodiment is that a composition is preferably set with the total subject image portion being situated around the middle in the horizontal direction. Accordingly, in this case, zero is set for the horizontal offset amount Δx.

Figures 45, 45A, 45B:
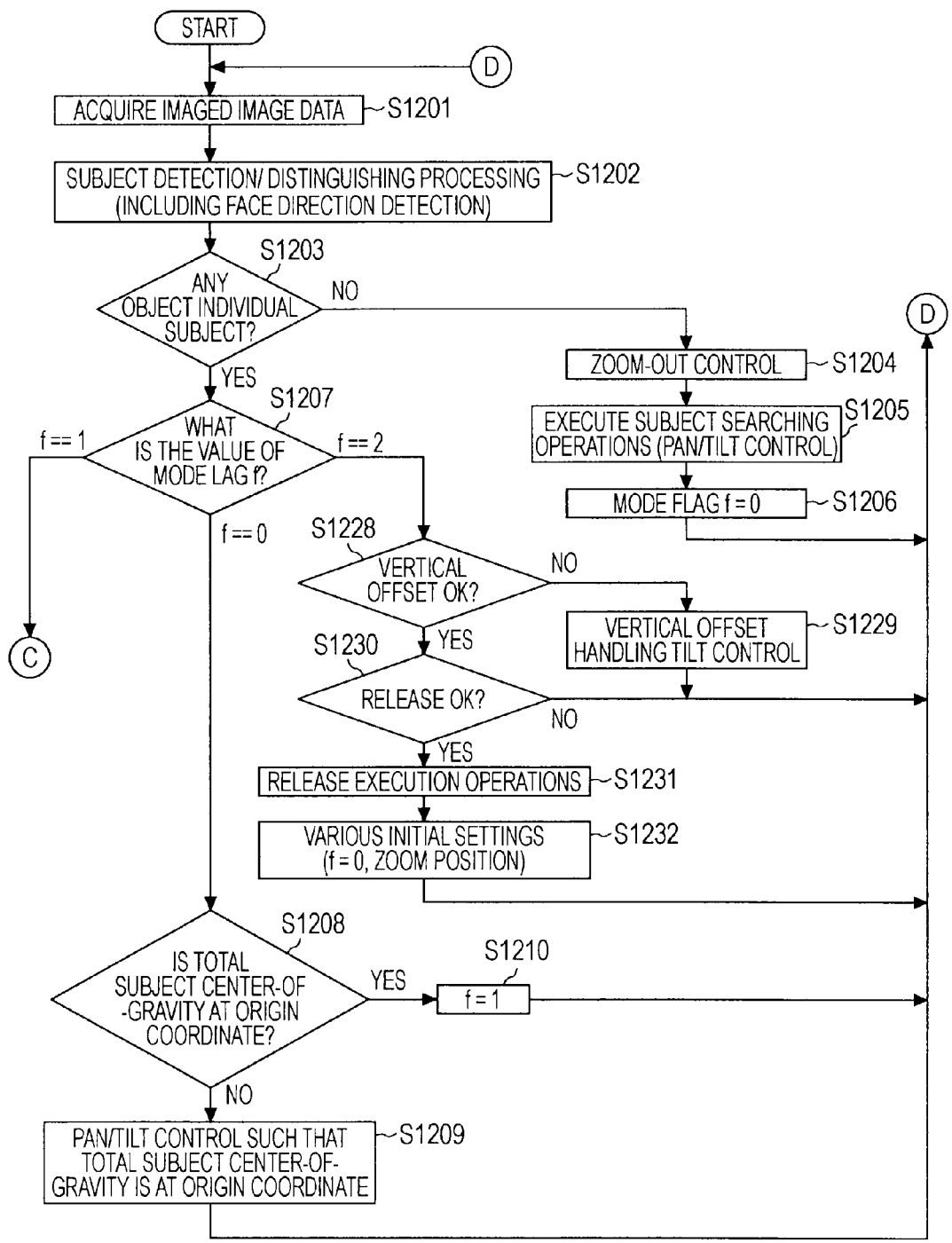
FIG. 45 is a flowchart illustrating an example of processing procedures for the second example of composition control.
Figure 45B:
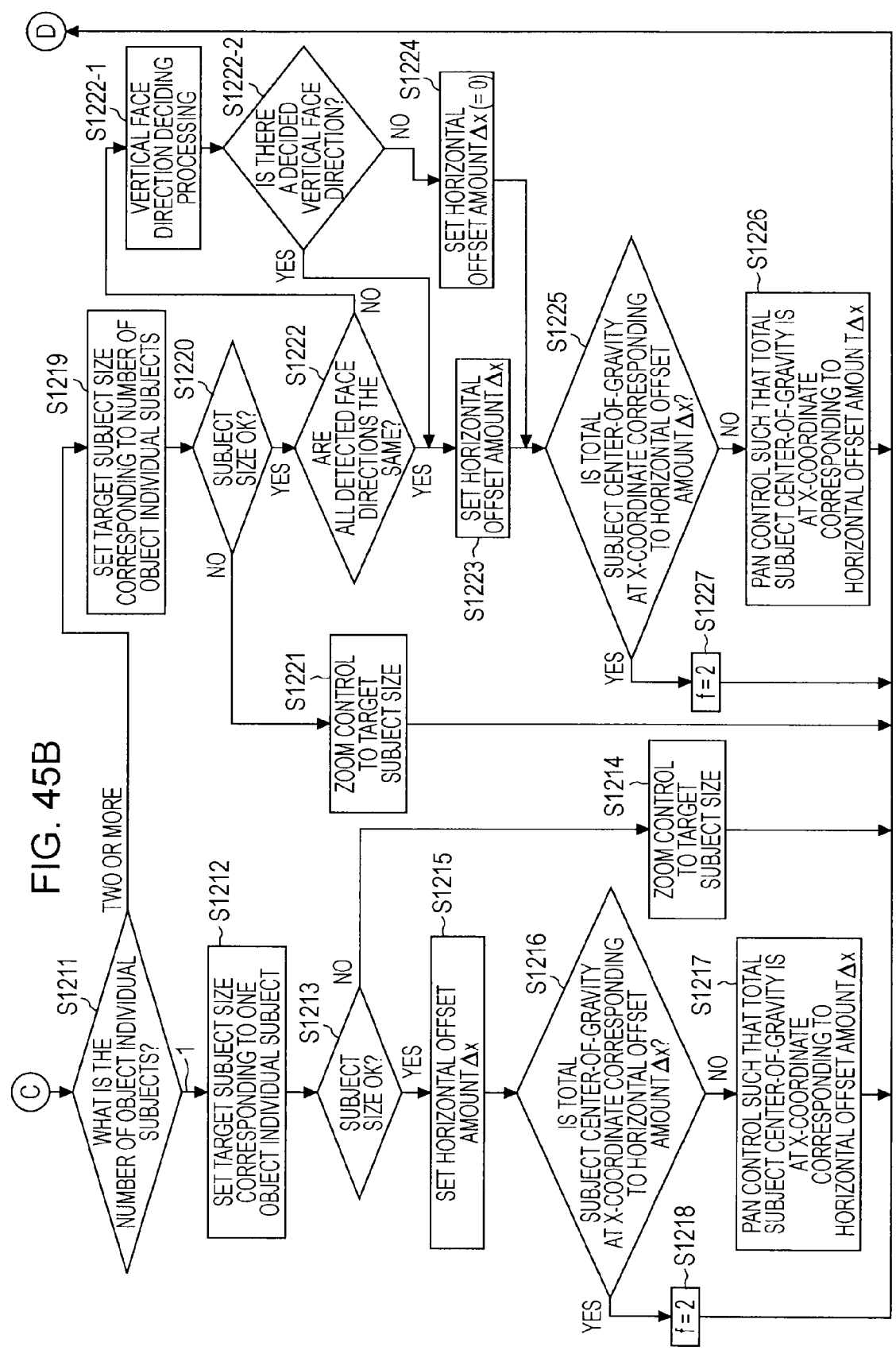

FIG. 45 illustrates a procedure example to be executed by the subject detection processing unit 201, composition determination block 62, and communication control processing block 64 shown in FIGS. 5A through 5D, in accordance with the above-described second example.

Of the procedures shown in FIG. 45, the procedures from step S1201 through S1232 are each the same as the procedures from step S1101 through S1132 in FIG. 43, with the exception of steps S1221-1 and S1222-2.

Step S1221-1 and the subsequent step S1222-2 have been inserted as procedures to execute in the event that a negative determination result has been obtained in step S1222. That is to say, steps S1221-1 and S1222-2 are executed in the event that the number of object individual subjects is a plurality, and the relation of face directions detected for each of the object individual subjects is not all the same face direction at the stage that size adjustment of the total subject image portion has been completed.

In step S1222-1, processing is executed for determining the reference face direction. To this end, as described above for example, determination is made regarding whether or not a set of object individual subjects having the same face direction is made up of a number of object individual subjects great enough to be a majority by a certain percentage or higher of the total number of object individual subjects that have been detected, with regard to the multiple object individual subjects and the relation in face directions. In the event that there is such a set of object individual subjects, the face direction of this set of object individual subjects is determined to be a valid reference face direction. On the other hand, in the event that there is no such set of object individual subjects, determination is made that there is no reference face direction.

With regard to the above predetermined percentage, what sort of value is to be actually set should be determined as appropriate, taking into consideration an appropriate composition with regard to the number of object individual subjects and the relation of face directions of the object individual subjects in actual practice. While one fixed value may be basically set, an arrangement may be made wherein different predetermined values are set in accordance with the number of determined object individual subjects, for example.

Further, other algorithms for reference face direction detection processing may be conceived other than the above. For example, an arrangement may be made wherein the face direction of the greatest set of object individual subjects having the same face direction is simply taken as the value reference face direction, without taking into consideration the percentage thereof as to the total number of object individual subjects, for example. In this case, if the number of object individual subjects in each set having difference face directions is the same, determination is made that there is no reference face direction.

In step S1222-2, determination is made regarding whether or not a valid reference face direction has been determined as the result of the face direction determining processing in step S1222-1.

Now, in the event that a positive determination result has been obtained, the flow proceeds to step S1223. In step S1223 in this case, the coefficient D is determined based on the reference face direction determined in step S1222-1, and the horizontal offset amount Δx is determined and set.

On the other hand, in the event that a negative determination result has been obtained in step S1222-2, this means that a valid reference face direction was not determined in the previous step S1222-1, neither right nor left. In this case, the flow proceeds to step S1224, whereby the horizontal offset amount Δx is set to zero. Thus, inserting the steps S1222-1 and S1222-2 realizes the composition control according to the second example as described with reference to FIG. 44.

Note that the procedures shown in FIGS. 43 and 45 include procedures which can be viewed as composition determination processing, and procedures for controlling composition matching in accordance with the determination results (composition control), in a mixed manner, while some steps perform composition determination and composition matching at the same time. This is due to the procedures shown in FIGS. 43 and 45 being specifically illustrated in accordance with actual practice. The basic concept of the embodiment should be viewed as application of the configurations for composition determination illustrated as the composition determination block 200, composition determination block 62, and so forth, described so far. That is to say, the imaging system according to the present embodiment can be viewed as determining and deciding a composition deemed optimal in accordance with the number of object individual subjects, and appropriately performing zoom control and pan/tilt control such that imaged image data of the determined composition is actually obtained (reflected).

Also, with the specific examples of composition determination and composition control described in the drawings from FIGS. 38A and 38B on, description has been made that face direction detection is in two stages of left or right, but in reality, there may be configurations made for face direction detection processing including facing straight ahead, in addition to left and right. In this case as well, the composition control based on an embodiment of the present invention can be validly applied.

For example, in the event that a single object individual subject is detected as with the case in FIG. 40, and the face is detected to be facing straight ahead, one conceivable arrangement would be to situate the subject position in the horizontal direction at around the middle of the screen, such that the center of gravity G is more or less on the image region division line Ld (Y-axis). However, this composition is often typified as a poor example of composition. Accordingly, an arrangement can be conceived wherein, in the event that the number of detected individual subjects is one, and the face direction is straight ahead, the horizontal offset amount Δx is set such as with the composition in FIG. 40, or a composition so as to be linearly symmetrical across the image region division line Ld as to the composition in FIG. 40. This allows a good composition to be obtained in accordance with the Rule of Thirds.

Also, in the event that two or more object individual subjects are detected, and the face direction of all of the object individual subjects is straight ahead, or the reference face direction is straight ahead, an arrangement can be conceived wherein the horizontal offset amount Δx is set upon having set the coefficient D in Expression (4) to zero, so as to obtain the composition.

Also, in the event that vertical face directions can be detected, the composition control based on an embodiment of the present invention can be performed in accordance with the face direction detection results in the vertical direction. In this case, the total subject center of gravity Gt is moved vertically with the image region division line Ld in the horizontal direction (a horizontal line (X-axis) passing through the origin coordinates, for example, will suffice) as a reference.

Further, in the event that diagonal face directions can be detected, the composition control based on an embodiment of the present invention can be performed in accordance with the face direction detection results in the diagonal direction, which is a composite of the horizontal direction and vertical direction. In this case, a line crossing the screen orthogonally to the detected diagonal face direction (a horizontal line passing through the origin coordinates, for example) is set as the image region division line Ld, and the total subject center of gravity Gt is moved to one of the image regions section by this image region division line Ld.

Further, in the event that face direction detection is enabled in two stages or three or more stages in the horizontal direction of vertical direction for example, an arrangement can be conceived wherein an algorithm is employed in which the horizontal offset amount Δx (or vertical offset amount Δy) is variable in accordance with the degree of stage of direction thus detected.

Also, as shown in FIG. 39, in this case, the reference point through which the reference line passes has been described as being the origin coordinates in the screen, but the position of the reference point may be set to a position other than the origin coordinates for the purpose of obtaining a better composition, for example.

Also, it should be noted that the examples described with reference to FIGS. 24 through 35 earlier are partial examples, and that other devices, systems, application software, and so forth, to which the composition determination according to the present invention can be applied, can be conceived.

Also, with description of the embodiment so far, the subject (object individual subject) has been described as being a person, but the present invention can also be applied to cases of subjects other than people, such as animals, for example.

Also, the composition determined with embodiments of the present invention (optimal composition) is not necessarily restricted to compositions determined by applying composition setting techniques such as the Rule of Thirds to the element of the number of object individual subjects. Even compositions which are generally thought to be poor may be felt by the user to be interesting or even better, depending on how the composition is set. Accordingly, the composition determined with embodiments of the present invention (optimal composition) is not particularly restricted in actual use, and can be optionally set taking into consideration usability, elements of entertainment, and so forth.

Also, with the first through third embodiments described above, subjects which are face photographs for example, or are subjects not within a normal subject distance range or range of size (in-image size, or actual size) are viewed as being irrelevant subjects and eliminated, with subjects within a normal subject distance range or size range being viewed as relevant subjects.

However, it is self-evident from the description so far, that a configuration may be made wherein subjects which have been handled as irrelevant subjects in the first through third embodiments described earlier are distinguished as objects of composition determination, having been viewed as relevant subjects. This is because distinguishing relevant subjects in the first through third embodiments means that it can be viewed that subjects handled as irrelevant subjects in the first through third embodiments have also been distinguished. Such configurations are also applicable as configurations of composition determination based on embodiments of the present invention, and are useful depending on the application thereof.

Also, in relation to this, composition determination based on embodiments of the present invention may be made configured such that the subjects to be taken as the object of composition determination can be switched between relevant subjects and irrelevant subjects, in accordance with user operations or determination made based on predetermined device operation conditions or the like, for example.

Also, as described above, at least a part of the configuration of embodiments of the present invention can be realized by a CPU or DSP executing a program.

Such a program may be written into and stored in ROM for example at the time of manufacturing, or may be stored in a removable storage medium and installed (including updating) from the storage medium so as to be stored in a nonvolatile storage region corresponding to the DSP or flash memory 30 or the like. Also, an arrangement may be conceived wherein the program can be installed by control from another host device via a data interface such as USB or IEEE 1394 or the like. Further, a configuration can be conceived wherein the program is stored in a storage device on a network such as a server, and a digital still camera 1 which has been provided with networking functions can obtain the program by downloading from the server.

The present application contains subject matter related to that disclosed in Japanese Priority Patent Application JP 2008-115298 filed in the Japan Patent Office on Apr. 25, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A composition determination device comprising:
   subject detection means configured to detect a subject in an image based on acquired image data, and to determine a predetermined attribute relating to the difference in size of each detected subject, in actual measurements;
   subject distance detection means configured to detect a subject distance for each subject detected by said subject detection means;
   subject size detection means configured to detect an in-image size which is the size of the subject in said image, for each subject detected by said subject detection means;
   actual subject size detection means configured to detect an actual size which can be viewed as being equivalent to actual measurements, for each subject detected by said subject detection means using at least said subject distance and said in-image size;
   subject distinguishing means configured to distinguish relevant subjects from subjects detected by said subject detection means, based on determination regarding whether or not the actual size detected by said actual subject size detection means is an appropriate value corresponding to a relevant subject after having been corrected using a coefficient corresponding to said determined attribute; and
   composition determination means configured to determine a composition with only relevant subjects, distinguished by said subject distinguishing means, as objects, the composition being determined by shifting a first image frame along a plane corresponding to the plane of the image to set a new image frame in which the relevant subjects are disposed approximately in the middle of the new image frame.

2. The composition determination device according to claim 1, wherein said subject distinguishing means are configured to perform determination regarding whether or not said actual size obtained using at least said subject distance and said in-image size is an appropriate value corresponding to a relevant subject after having been corrected using a zoom power value set in an imaging apparatus configured to acquire said image data by imaging.

3. A composition determination method comprising: first detecting, of a subject in an image based on acquired image data, and determining a predetermined attribute relating to the difference in size of each detected subject, in actual measurements;
   detecting a subject distance for each subject detected in the first detecting;
   detect an in-image size which is the size of the subject in said image, for each subject detected by said first detecting;
   second detecting, of an actual size which can be viewed as being equivalent to actual measurements, for each subject detected in said first detecting, by obtaining said actual size using at least said subject distance and said in-image size;
   distinguishing relevant subjects from subjects detected in said first detecting, based on determination regarding whether or not the actual size detected in said second detecting is an appropriate value corresponding to a relevant subject after having been corrected using a coefficient corresponding to said determined attribute; and
   determining a composition with only relevant subjects, distinguished in said first detecting, as objects, the composition being determined by shifting a first image frame along a plane corresponding to the plane of the image to set a new image frame in which the relevant subjects are disposed approximately in the middle of the new image frame.

4. A non-transitory computer readable storage medium storing a program causing a composition determination device to execute:
   first detecting, of a subject in an image based on acquired image data, and determining a predetermined attribute relating to the difference in size of each detected subject, in actual measurements;
   detecting a subject distance for each subject detected in the first detecting;
   detect an in-image size which is the size of the subject in said image, for each subject detected by said first detecting;
   second detecting, of an actual size which can be viewed as being equivalent to actual measurements, for each subject detected in said first detecting, by obtaining said actual size using at least said subject distance and said in-image size;
   distinguishing relevant subjects from subjects detected in said first detecting, based on determination regarding whether or not the actual size detected in said second detecting is an appropriate value corresponding to a relevant subject after having been corrected using a coefficient corresponding to said determined attribute; and
   determining a composition with only relevant subjects, distinguished in said first detecting, as objects, the composition being determined by shifting a first image frame along a plane corresponding to the plane of the image to set a new image frame in which the relevant subjects are disposed approximately in the middle of the new image frame.

5. A composition determination device comprising:
subject detection means configured to detect a subject in an image based on acquired image data and to determine a predetermined attribute relating to the difference in size of each detected subject, in actual measurements;
subject size detection means configured to detect an in-image size for each subject detected by said subject detection means;
subject distinguishing means configured to distinguish relevant subjects from subjects detected by said subject detection means, based on determination regarding whether or not said in-image size detected by said subject size detection means is an appropriate value corresponding to a relevant subject after having been corrected using a coefficient corresponding to said determined attribute; and
composition determination means configured to determine a composition with only relevant subjects, distinguished by said subject distinguishing means, as objects, the composition being determined by shifting a first image frame along a plane corresponding to the plane of the image to set a new image frame in which the relevant subjects are disposed approximately in the middle of the new image frame.

6. The composition determination device according to claim 5, wherein said subject distinguishing means are configured to perform determination regarding whether or not said in-image size is an appropriate value corresponding to a relevant subject after having been corrected using a zoom power value set in an imaging apparatus configured to acquire said image data by imaging.

7. A composition determination method comprising:
first detecting, of a subject in an image based on acquired image data and determining a predetermined attribute relating to the difference in size of each detected subject, in actual measurements;
second detecting, of an in-image size for each subject detected in said first detecting;
distinguishing relevant subjects from subjects detected in said first detecting, based on determination regarding whether or not said in-image size detected in said second detecting is an appropriate value corresponding to a relevant subject after having been corrected using a coefficient corresponding to said determined attribute; and
determining a composition with only relevant subjects, distinguished in said first detecting, as objects, the composition being determined by shifting a first image frame along a plane corresponding to the plane of the image to set a new image frame in which the relevant subjects are disposed approximately in the middle of the new image frame.

8. A non-transitory computer readable storage medium storing a program causing a composition determination device to execute:
first detecting, of a subject in an image based on acquired image data and determining a predetermined attribute relating to the difference in size of each detected subject, in actual measurements;
second detecting, of an in-image size for each subject detected in said first detecting;
distinguishing relevant subjects from subjects detected in said first detecting, based on determination regarding whether or not said in-image size detected in said second detecting is an appropriate value corresponding to a relevant subject after having been corrected using a coefficient corresponding to said determined attribute; and
determining a composition with only relevant subjects, distinguished in said first detecting, as objects, the composition being determined by shifting a first image frame along a plane corresponding to the plane of the image to set a new image frame in which the relevant subjects are disposed approximately in the middle of the new image frame.

9. A composition determination device comprising:
circuitry configured to act as:
a subject detection unit configured to detect a subject in an image based on acquired image data, and to determine a predetermined attribute relating to the difference in size of each detected subject, in actual measurements;
a subject distance detection unit configured to detect a subject distance for each subject detected by said subject detection unit;
a subject size detection unit configured to detect an in-image size which is the size of the subject in said image, for each subject detected by said subject detection unit:
an actual subject size detection unit configured to detect an actual size which can be viewed as being equivalent to actual measurements, for each subject detected by said subject detection unit, using at least said subject distance and said in-image size;
a subject distinguishing unit configured to distinguish relevant subjects from subjects detected by said subject detection unit, based on determination regarding whether or not the actual size detected by said actual subject size detection unit is an appropriate value corresponding to a relevant subject after having been corrected using a coefficient corresponding to said determined attribute; and
a composition determination unit configured to determine a composition with only relevant subjects, distinguished by said subject distinguishing unit, as objects, the composition being determined by shifting a first image frame along a plane corresponding to the plane of the image to set a new image frame in which the relevant subjects are disposed approximately in the middle of the new image frame.

10. A composition determination device comprising:
circuitry configured to act as:
a subject detection unit configured to detect a subject in an image based on acquired image data and to determine a predetermined attribute relating to the difference in size of each detected subject, in actual measurements;
a subject size detection unit configured to detect an in-image size for each subject detected by said subject detection unit;
a subject distinguishing unit configured to distinguish relevant subjects from subjects detected by said subject detection unit, based on determination regarding whether or not said in-image size detected by said subject size detection unit is an appropriate value corresponding to a relevant subject after having been corrected using a coefficient corresponding to said determined attribute; and
a composition determination unit configured to determine a composition with only relevant subjects, distinguished by said subject distinguishing unit, as objects, the composition being determined by shifting a first image frame along a plane corresponding to the plane of the image to set a new image frame in which the relevant subjects are disposed approximately in the middle of the new image frame.

* * * * *